United States Patent
Singh et al.

(10) Patent No.: US 12,205,224 B2
(45) Date of Patent: Jan. 21, 2025

(54) COMPUTER GRAPHICS INTERFACE USING VISUAL INDICATOR REPRESENTING OBJECT GLOBAL VOLUME AND/OR GLOBAL VOLUME CHANGES AND METHOD THEREFORE

(71) Applicant: Unity Technologies SF, San Francisco, CA (US)

(72) Inventors: Karan Singh, Wellington (NZ); Stephen Cullingford, Wellington (NZ); Byung Kuk Choi, Wellington (NZ); Haekwang Eom, Wellington (NZ)

(73) Assignee: Unity Technologies SF, San Francisco, CA (US)

( * ) Notice: Subject to any disclaimer, the term of this patent is extended or adjusted under 35 U.S.C. 154(b) by 222 days.

(21) Appl. No.: 18/069,950

(22) Filed: Dec. 21, 2022

(65) Prior Publication Data

US 2023/0215094 A1    Jul. 6, 2023

Related U.S. Application Data

(60) Provisional application No. 63/295,088, filed on Dec. 30, 2021.

(51) Int. Cl.
*G06T 17/10* (2006.01)
*G06T 17/20* (2006.01)

(52) U.S. Cl.
CPC .............. *G06T 17/10* (2013.01); *G06T 17/20* (2013.01)

(58) Field of Classification Search
CPC ...................................... G06T 17/10
See application file for complete search history.

(56) References Cited

U.S. PATENT DOCUMENTS

| 2006/0290695 A1* | 12/2006 | Salomie | G06T 17/20 |
| | | | 345/423 |
| 2021/0056748 A1* | 2/2021 | Pritchett | G06T 15/06 |
| 2024/0096016 A1* | 3/2024 | Driscoll, III | G06T 15/04 |

* cited by examiner

*Primary Examiner* — Shivang I Patel
(74) *Attorney, Agent, or Firm* — Haynes and Boone, LLP

(57) ABSTRACT

A computer-implemented method and interface provides visualization for a volume and/or a change in a volume of a virtual object, the representation usable in a user interface, comprising a first representation of the virtual object represented by a surface positioned in a three-dimensional (3D) virtual space, a bounding object input that defines a bounding object relative to the 3D virtual space, a plurality of local volumes of the virtual object, wherein a local volume of the plurality of local volumes is computed for geometry based on a bounding object feature associated with the bounding object and based on at least some vertices of the corresponding face, wherein at least some of the plurality of local volumes are aggregated to determine a global volume for the set of polygonal faces, and providing for display of a first visual indicator representing a value of the global volume.

19 Claims, 25 Drawing Sheets

COMPUTER GRAPHICS INTERFACE USING VISUAL INDICATOR REPRESENTING OBJECT GLOBAL VOLUME AND/OR GLOBAL VOLUME CHANGES AND METHOD THEREFORE

CROSS-REFERENCES TO PRIORITY AND RELATED APPLICATIONS

This application is a non-provisional of, and claims the benefit of and priority from, U.S. Provisional Patent Application No. 63/295,088 filed Dec. 30, 2021, entitled "User Interface Tools for Presenting Localizing of Deformations and Deformation Details."

The entire disclosure of the application recited above is hereby incorporated by reference, as if set forth in full in this document, for all purposes.

FIELD

The present disclosure generally relates to methods and apparatus for virtual object editing and user interface elements to depict quantitative changes or target quantities related to edits to virtual objects.

BACKGROUND

For computer-generated imagery, computer-enhanced imagery, or other computer graphics, the ability to deform three-dimensional geometry is critical for the modeling and animation of objects as most organic or natural objects are neither rigid in construction nor in motion. Deformations can roughly be classified as spatial (surface-agnostic) or surface-aware. Spatial deformations, in their most general form, are a functional mapping of points to points in space, and any object embedded in this space is deformed by independently deforming points on the surface of the object based on the functional mapping. Common examples include squash/stretch, twist, taper, and other free-form deformations based on lattices, cages, and/or points, curves (wires) and surface (wrap) proxies. Brush-based sculpting (e.g., Zbrush) is another technique to interactive modeling using deformation. Further, exploiting the deformation trajectory of spatial deformations to define specific fold-over free and volume preserving deformations using divergence-free vector fields has been used in spatial deformations.

Surface-aware deformations use local or global properties of the geometry being deformed to additionally inform the deformation mapping of points on the geometry. A simple example of a locally surface-aware deformation could be to deform surface points by moving them a specified distance along the surface normal at the point. An example of a global surface-aware deformation might uniformly scale a closed object, so that its overall volume equals a specified value. Unlike the spatial deformations, the same spatial point can be deformed to different points in space, depending on the properties of the surface partially represented by the point.

Thus, artists use a wide range of deformation tools and algorithms in the modeling and animation of three-dimensional objects. The majority of these techniques are focused on providing intuitive deformation handles for artists, where handle manipulation results in minimal and smooth deformation over artist-controlled regions of the object. However, these techniques do not provide any definition of shape volume or notion of volume control upon deformation. Volume control and volume conservation of objects when making deformation is important in computer graphics for some artists and in certain scenarios. While some specific deformation algorithms have an ability to control the volume of a deforming object, those deformation algorithms require the exclusive use of those techniques. The inability of most deformation tools to account for volume and other geometric attributes slows the computer graphics generation process and may result in multiple revisions of a work by an artist.

A method and apparatus for volume and other attribute control and visualization in computer graphics is desirable.

BRIEF DESCRIPTION OF THE DRAWINGS

Various implementations in accordance with the present disclosure will be described with reference to the drawings, in which.

DETAILED DESCRIPTION

In the following description, various implementations will be described. For purposes of explanation, specific configurations and details are set forth in order to provide a thorough understanding of the implementations. However, it will also be apparent to one skilled in the art that the implementations may be practiced without the specific details. Furthermore, well-known features may be omitted or simplified in order not to obscure the implementation being described.

In computer-generated imagery or computer-enhanced imagery, generally referred to herein as computer graphics, editable objects are often created. An editable object may refer to a virtual object that can be visually represented by a mesh such as an animated character, an inanimate element, a portion of a body part of an actual actor, and/or any other virtual object that would be apparent to one of skill in the art in possession of the present disclosure. A mesh can be represented by data stored in memory where the data includes an array of vertices, each stored as a three-dimensional coordinate point, an array of edges, each stored as an ordered pair of vertices of the array of vertices, and an array of faces, each stored as an ordered list of three or more vertices. These vertices, edges, and faces may be referred to as mesh elements herein. Editing or manipulating a mesh might be such that a mesh is well-formed (e.g., there is always an edge in the edge array for any two adjacent vertices in a face's ordered list of vertices and for the first and last vertices in a face's ordered list of vertices, each edge appears in one or two faces, and when an edge appears in two faces, one edge is $(v_i, v_j)$ and the other is $(v_j, v_i)$).

Figure 1:
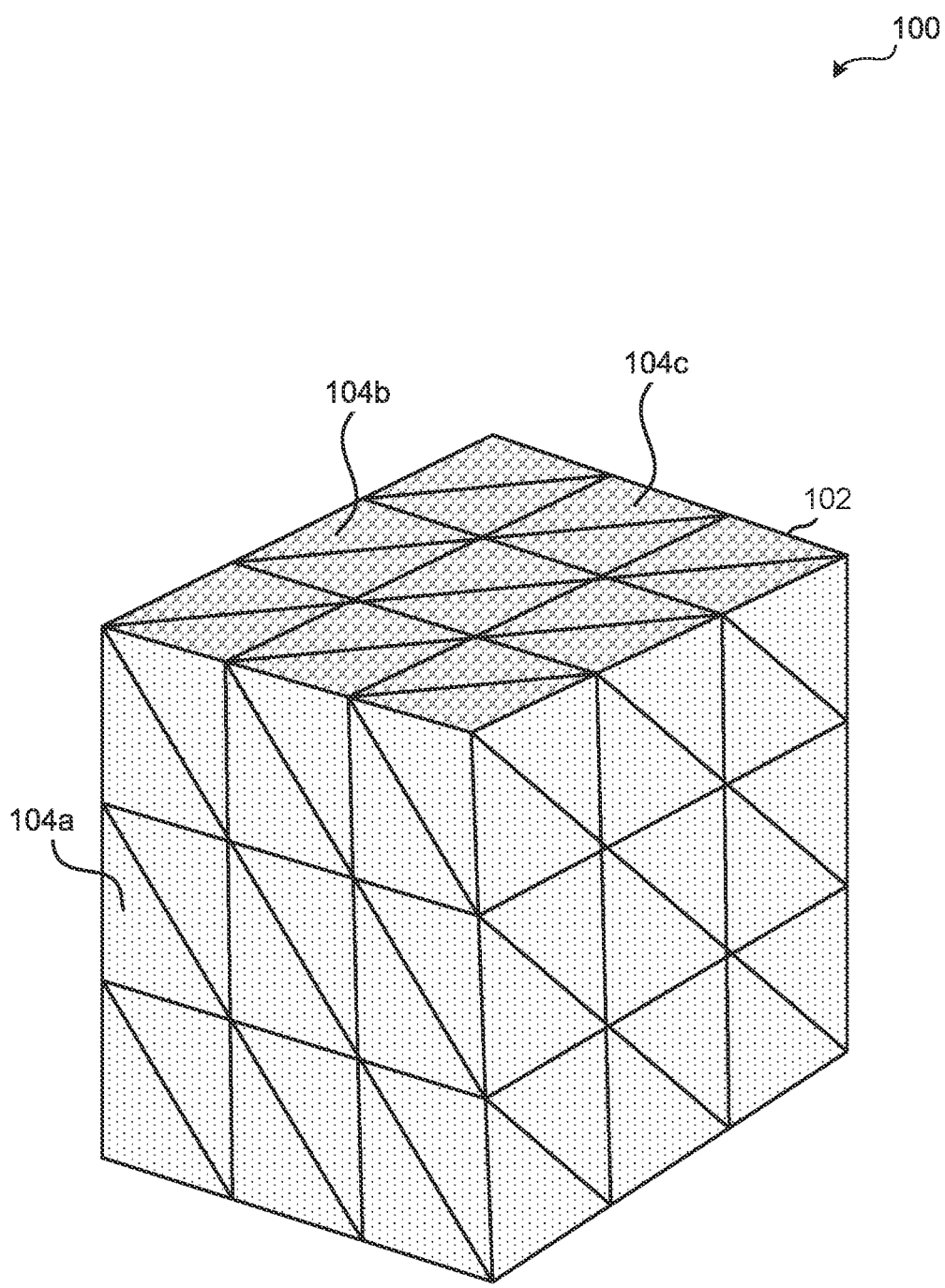
FIG. 1 illustrates faces of a mesh of a virtual object, of which a volume might be determined.

FIG. 1 illustrates an example 100 of a mesh 102 as might be used to represent a cube object. In the view given, there are three hidden sides to the cube that are not shown. In a typical arrangement, a mesh comprises faces such as triangles 104a, 104b, and 104c. Mesh 102 may include a plurality of faces, only some of the faces are labeled with reference numbers for clarity of the figures. Each of the plurality of faces may be defined by a plurality of edges. Each edge may be defined by an ordered pair of vertices.

In the example shown, mesh 102 defines a closed mesh in that there is an "inside" volume and an outside volume. In the illustrated example, mesh 102 is a closed triangle mesh where each face includes a triangle. However, other polygon meshes are contemplated where the faces include quadrilaterals, pentagons, and/or other n-sided polygons that would be apparent to one of skill in the art in possession of the present disclosure.

In a general case, processing that is performed on a mesh might also be performed on a set of one or more faces where faces in the set might have edges that do not regularly align with edges of other faces. In the general case, there is a set of faces that may be defined by vertices and edges. In the specific case, the edges of the faces are shared among faces. Where each face edge other than at an object edge is shared among exactly two faces, the set of faces forms a well-defined mesh. Where all of the face edges are each shared by exactly two faces, where faces each have an inside side and an outside side, and where a curve drawn across over two adjacent faces and an edge between those two adjacent faces would be on the outside side of both faces or the inside side of both faces, the set of face edges might define a closed mesh having a well-defined inside volume. Thus, unless it is indicated otherwise or is not mathematically sound, it should be understood that a description of processing a mesh could be applied as well more generally to processing a set of faces that do not necessarily form a well-defined mesh.

Figure 2:
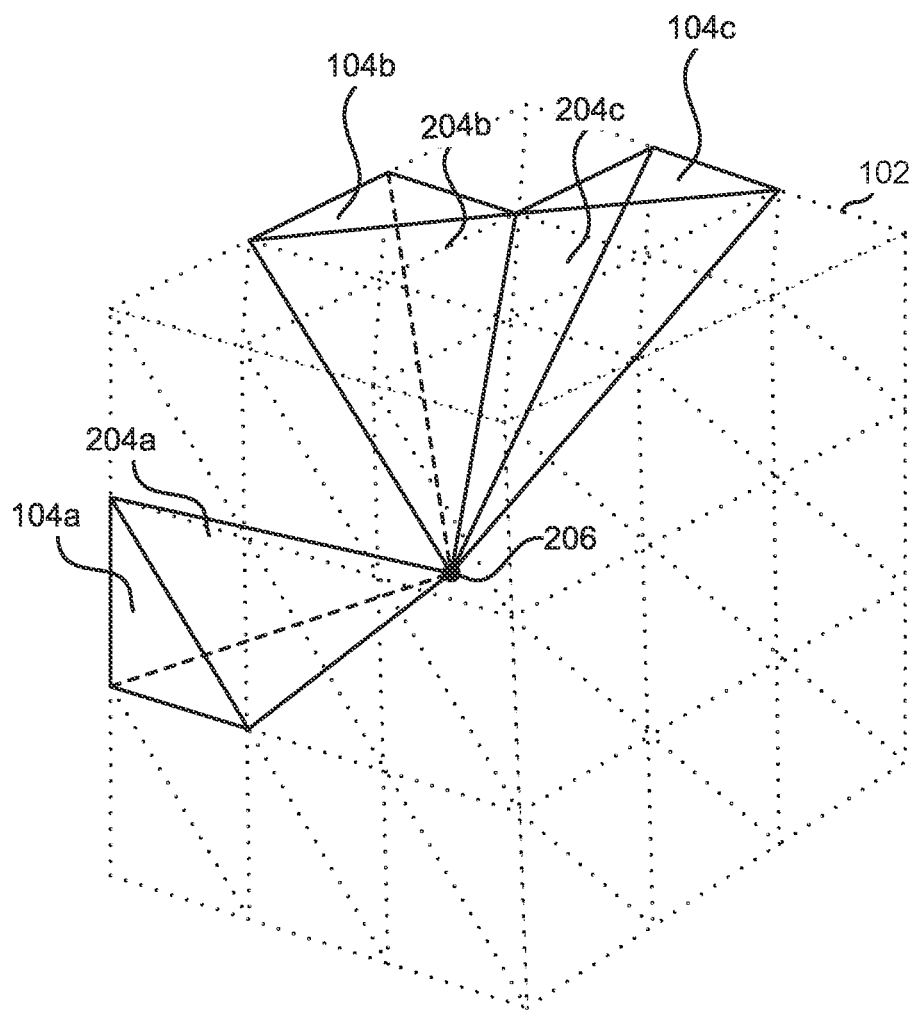
FIG. 2 illustrates examples of volume elements that can correspond to mesh elements of the virtual object, as might be used to compute a local volume.

FIG. 2 illustrates examples of volume elements that can correspond to faces of the virtual object. Each of volume elements 204a, 204b, and 204c are determined from a corresponding face (104a, 104b, and 104c) and an origin point 206. As illustrated, origin point 206 is near the center of the cube, but that is not required. As should be apparent from the figure, if each of the faces of the virtual object has a corresponding tetrahedron, the sum of the volumes of the tetrahedrons would be independent of where origin point 206 is inside the cube (and it can even be outside the cube as long as the signs of tetrahedron volumes are accounted for). If faces with more than three edges are used, some volume elements would not be tetrahedrons but would instead be elements with more than four sides. Each face 104a-104c may be considered a face of a tetrahedron that also includes edges defined by each of the vertices of the mesh faces and origin point 112 when mesh 102 is provided by a closed triangle mesh.

Figure 3:
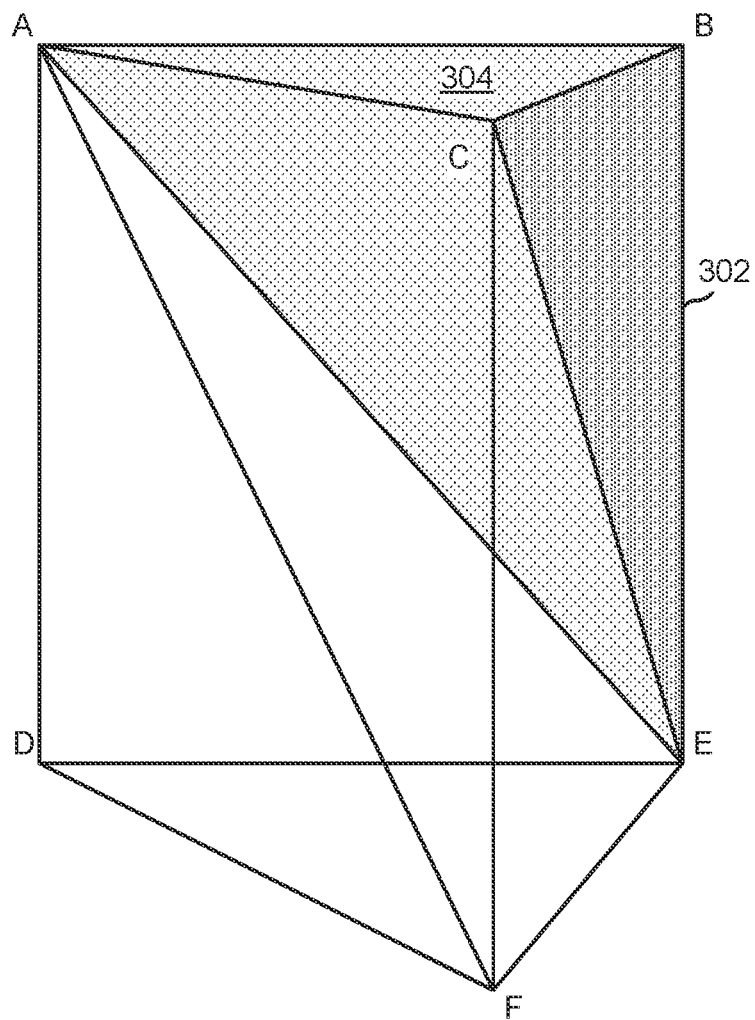
FIG. 3 illustrates a simplified example of a tetrahedral volume element, as might be used to compute a local volume.

FIG. 3 illustrates a simplified example of a tetrahedral volume element 302, as might be used to compute a local volume. Each edge of a face and its corresponding volume element can be defined by vertices, which in turn define edges. For example, as shown in FIG. 3, edge AB might be defined by a vertex A and a vertex B, edge BC defined by vertex B and a vertex C, edge AC defined by vertex C and vertex A, etc. Suppose face ABC 304 is a face of a mesh and vertex E is an origin point. In that case, faces ABC, ABE, ACE, and BCE define a tetrahedron. In this example, face ABC and DEF might be similar and lie on parallel planes, in which case the vertices A through F define a triangular prism, but that is not required.

Tetrahedral volume element 302 defines a local volume that can be calculated using Equation 1.

$$V = \frac{1}{6}\left|(\vec{a} \times \vec{b}) \cdot \vec{c}\right| \quad \text{(Eqn. 1)}$$

In Equation 1, $\vec{a}$, $\vec{b}$, and $\vec{c}$ are vectors of the tetrahedron. For example, $\vec{a}$ may be a vector of origin point E and vertex A, $\vec{b}$ may be the vector of origin point E and vertex B, and vector $\vec{c}$ may be the vector of origin point E and vertex C. Since the vectors are all a function of vertex locations, a volume of tetrahedral volume element 302 may be found using known vertices of face 304 and origin point E. As such, each face of a closed mesh such as mesh 102 (shown in FIGS. 1-2) can be associated with a tetrahedron and a local volume for that tetrahedron that can be calculated using the vertices of each face and the origin point. The combined values of the local volumes of the tetrahedrons are equal to the volume of the object.

A mesh may be provided as a closed mesh and/or an open mesh. A closed mesh may be a mesh that defines space into an "inside" and an "outside." For example, if every edge of the mesh is incident to two faces, that mesh may be defined as a closed mesh. In a specific example, an object, such as sphere, may be defined by a closed mesh such that the "inside" of the sphere defines a volume. An open mesh would be one with some edges having only one incident face. A graphics processing system might treat a collection of faces as being a closed mesh, as needed, based on its face connectivity, or be agnostic to the connectivity of the mesh or the faces. If every edge is incident to exactly two faces, that mesh can be treated as a closed mesh topologically. With this connectivity, the graphics processing system can also handle self-intersecting configurations of shape. In part, this can be done by processing computations local to each face and having those computations signed, e.g., defining negative volumes or positive volumes. "Inside" and "outside" might be based on local surface orientation.

An editable object might be a virtual object that can be visually represented by a mesh, such as a character, an inanimate element, a portion of a human face (not to be confused the face/polygon of a mesh) (which might be represented by an open mesh). A mesh element might be a vertex of a mesh, an edge of a mesh, or a face of a mesh. A reference mesh might be a mesh as it existed when an editing session began and was loaded from memory, but that need not be the case, possibly referred to as $M^r$. A deformed mesh might be a mesh following at least one editing action. Some editing actions could be in response to artist inputs and some could be in response to procedural edits, such as AI outputs. A deformed or edited mesh might be referred to herein as M. A computed mesh might be the output of a procedural edit. For example, a reference mesh might be loaded into an editing system, an artist might deform it to form a deformed mesh, and then a program is executed with M and $M^r$ as inputs that outputs a mesh $M^o$ that results from the program execution. An example would be a procedure might modify M to a new, distinct mesh, $M^o$, so that $M^o$ has a volume closer to the volume of $M^r$ (e.g., a process that seeks to maintain a constant volume). As explained herein, processes that operate on meshes can operate on collections of faces that might not form a mesh, partially or wholly.

A user interface element might depict volumetric changes to an object being edited. The object being edited can be represented in memory by a mesh and edits result in changes to the mesh. The object can have a volume, defined by its mesh, and editing the object can change its volume. The user interface can include a display of a "depicting element." The depicting element can be a cube or any other element that can visually convey a quantity. The quantity conveyed by the depicting element corresponds to volumetric changes to an object being edited. As the object is being edited, the depicting element changes accordingly. The volumetric changes are determined by comparing the reference mesh to the deformed mesh. The absolute volume of the mesh being deformed itself can also be defined locally and visualized with the same color maps, depicting elements etc.

Where the quantity is volume, the changes to the depicting element are a change of volume of the depicting element. The volume of the depicting element at any given time could be equal to the volume gained or lost in the object being edited or proportional to the gain/loss. An attribute of the depicting element, such as its color, might change to correspond to different volume change thresholds.

A user interface and computation might be provided for determining, possibly with user input, an effective volume for a non-closed surface. A user might have a user interface in which to deform a mesh, which might define a closed shape or an open shape. The user might specify a bounding object, such as a cube, a sphere, an affine transformation of a cube or sphere, or some other closed 3D shape. The faces of the mesh (the reference mesh, and/or the deformed mesh) can then be assigned local volumes based on local volumes between the faces and faces of the bounding object and/or an origin point.

An entire bounding object is not needed. If local volume is defined with respect to an origin point, tetrahedra can be defined and measured. The faces can be selected in a number of ways typical in 3D modeling software. In another implementation, an origin of a bounding volume can provide an origin point, the bounding volume extent implicitly selects the mesh faces within it to visualize, and the bounding volume can be a useful depictive reference, as it could depict what is visible and provide a reference to proportions that are "inside" a mesh object. An analytic equation can be used to determine inside/outside. For a sphere with a center, C, and a radius, R, for example, a vertex is inside the volume if the distance from the vertex to C is less than R. The volume of the sphere can be computed using the sphere volume equation $V=(4/3)*\pi R^3$.

By a possibly arbitrary designation of sign, the local volumes swept out by tetrahedra (or other shapes in case the mesh is not exclusively triangle) define one element of a volume change, a local volume change, and the local volume changes can be summed to determine an overall volume. If only volume changes are of interest, bounding object is not needed at all, as explained elsewhere herein.

If a bounding object is used, it might be selected to have a particular effect of distributions of local volume element volumes, such as tetrahedra. A user might be specifically interested in how a volume change is distributed over individual local volume elements. Considering the example in FIG. 1, the computed volume computed as the sum of volumes of local volume elements would be the same regardless of where the origin point is inside the volume. However, a particular origin point might be chosen by the user and the graphical editing system might provide an interface for moving the origin point around. This can result in a different distribution of volumes of local volume elements. For example, if the origin point used as a bounding object were moved to near the front upper right corner of the cube object shown in FIG. 1, the local volumes corresponding to faces in the front upper right corner of the cube object would be much smaller than the contributions to the overall volume of faces in the rear lower left corner of the cube object. In such a case, if a distribution of local volumes over local volume elements is of interest to a user in creating or editing a particular surface, the user can be provided with the option of specifying a particular origin point or other bounding object that would provide a useful distribution of local volumes.

A bounding surface might be used even if the virtual object is a closed object, so as to isolate volume changes. For example, with an articulated character a closed surface might be defined already. A bounding surface could nonetheless be used to define just a portion of interest of the closed object. For example, with the articulated character an artist might want to modify the surface but only consider volume changes to the head of the articulated character. If the artist specifies a bounding surface between the head and the torso of the articulated character, the measured enclosed volume would be just the head volume as the artist modifies the surface of the articulated character.

A user interface and computation can be provided for separating sources of local volumetric changes and selectively using a subset of the sources when depicting local volumetric changes. In a specific case, global translations and rigid transformation can be ignored when computing local volume changes. Rigid and deformable behavior can be decoupled and locally defined by one or more reference frames. If no frame is defined, then an overall change of the object might be viewed as a deformation. In one implementation, a best-fit rigid transform to the overall deforming object can also be automatically computed and set to be this frame, if desired.

The depiction could be by color-mapped points on the object surface. Sources of volume change might be rigid transformations, translations, or compressions/expansions and the depiction might only use compressions/expansions and not rigid transformations, translations.

In some instances, a mesh element is associated with a reference frame that might not apply to all of the mesh elements (e.g., a face on a character's arm would be associated with an arm reference frame but a face on the character's leg would not be) and there might be a global reference frame that all the mesh elements are associated with. A translation or rotation of the editing object as a whole could be treated as a translation or rotation of the global reference frame, so that those edits do not contribute to changes in local volumes. In a user interface, the artist can select whether to move mesh elements or to move reference frames. There might be some energy relationships/constraints that would result in other parts of the mesh moving because a non-global reference frame moved.

A user interface that depicts local volumetric changes to an object being edited might be provided. The depiction might be color-mapped points on the object being edited, where different colors correspond to different amounts of local volume change. Signed local volume changes can be computed as a signed prismatic volume between corresponding faces of the mesh and a reference mesh.

A user interface and processing method wherein a user makes edits to an object and the processing method performs steps to bias towards a user-specified target quantity might be provided. The user-specified quantity might be volume and the target might be a maintenance of an object volume within a narrow range around an initial volume. In a specific implementation, the user might specify object edits, which would define a reference mesh and an edited mesh, and the processing method adjusts each vertex to be on the line between the vertex in the reference mesh and the same vertex in the edited mesh. This might be used where the mesh represents a creature or virtual object and it is expected that the volume of the creature or object should not noticeably change as it is being edited.

Various user interface elements described herein can be used separately or in combination.

One method for computing a mesh $M^o$ as something close to M with a volume relationship to $M^r$ (e.g., some percentage of the targe volume, to allow for some expansion or contraction), might treat both M and $M^r$ as meaningful meshes and use a linear blend space of the two. This can provide a rich, yet constrained subspace of shapes, in which to efficiently search for $M^o$. An alternate solution might be to randomly perturb vertices of M with small but increasing displacements to define a candidate $M^o$, to compute its volume and compare it to the desired target volume, keeping track of the best candidate until a given tolerance or maximum number of iterations is reached.

A user interface element might be used that depicts local changes to mesh elements other than volume. Local changes to some function of a mesh element can be determined and depicted at the particular mesh element (or a face, in the case of a change to a vertex or an edge). The local change might be displacement of a vertex, a change in edge length (strain), a change in face angles (shear), etc. As the object is being edited, the local changes can be indicated. A degree of change might be depicted using color. Changes to the vertices or edges of a given face might be combined and the depiction is a color assigned to the texture of a face.

Figure 4:
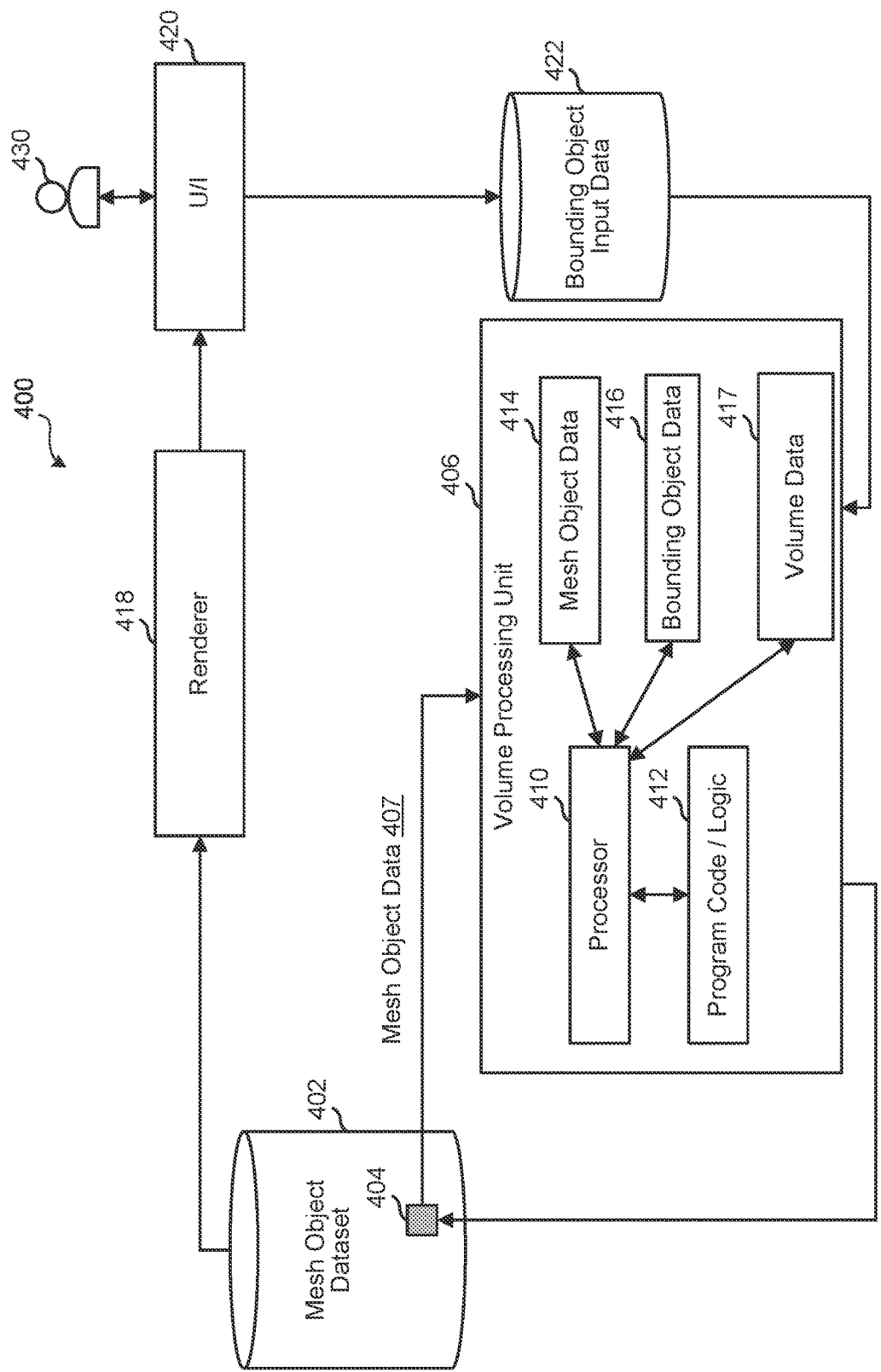
FIG. 4 is a block diagram of a graphics processing system that might be used to compute a bounding object and corresponding volume parameters or representations.

FIG. 4 illustrates a system 400 for computing a volume of a mesh object, in an implementation. The system includes a mesh object dataset 402, a volume processing unit 406, a renderer 418, a user interface (UI) 420, and bounding object input data 422.

A user 430 may interact with UI 420 that is displaying an object (e.g., object 100 of FIG. 1) provided by mesh object dataset 402 to define a bounding object that is to be used to determine a volume at least a portion of the object or a local volume that is associated with the faces of the object. This bounding object may therefore correspond to a reference point, a closed three-dimensional shape (e.g., a cube, a sphere, an affine transformation of a cube or sphere and/or any other three-dimensional shape), a reference mesh that may also be an open mesh or a closed mesh, and/or any other bounding object that would be apparent to one of skill in the art in possession of the present disclosure. Bounding object data 422 may indicate, for example, the criteria for the bounding object, such as the curvature, polynomials, placement, vertices, shape, and/or any other criteria that would be apparent to one of skill in the art in possession of the present disclosure. Mesh object dataset 402 may store data for mesh objects that are bound by the bounding object, such as characters, creatures, inanimate elements, and/or other objects. Mesh object dataset 402 may be loaded with data from a source of an animation, such as a mesh (e.g., an open mesh or a closed mesh) used to define a character, a creature, an inanimate element, and/or any other object. In some implementations, bounding object data 422 may include face selections of one or more faces of the mesh object in the mesh object dataset 402 that may be bound by the bounding object of bounding object data 422. Volume processing unit 406 may utilize the methods and processes described herein to take bounding object data 422 and incorporate the bounding object of bounding object data 422 in mesh object dataset 402, compute a local volume for each face of the mesh object that is bound by the bounding object, and/or compute a global volume of the plurality of faces of the mesh object by aggregating the local volumes together for each face. Volume processing unit 406 may compute volume using the vertices of the mesh object with corresponding vertices of faces of the bounding object or the reference point (e.g., an origin point of the bounding object), as described herein.

Volume processing unit 406 includes a processor 410 that executes program code 412 to depict a bounding object and compute the local and/or global volume of faces of a mesh object designated in bounding object input data 422 using mesh object data 414 from mesh object data 407. Volume processing unit 406 may further store bounding object, mesh object, and volume data 408 to dataset 402 so that the corresponding bounding object and mesh object may be rendered by renderer 418 for a visualization using the bounding object and the mesh object and also visualization of the volume of the mesh object or local volume of some or all of the faces of the mesh object. For example, volume processing unit 406 may initiate the process by taking bounding object input data 422 with mesh object data 414 from the mesh object data 407 and incorporating bounding object data 416 relative to the mesh object data 414. Volume processing unit 406 may also compute volume data 417 for the faces of the mesh object selected by user 440 and indicated in bounding object input data 422. Based on mesh object data 414, bounding object data 416, and volume data 417, volume processing unit 406 may then output bounding object, mesh object, and volume data 408, which may include mesh object and bounding object parameters 404 stored by dataset 402 as well as other required data to reproduce the bounding object and the mesh object. The resulting mesh object, bounding object, and volume values may be rendered by renderer 418 and/or output to user 430 to inspect the results.

Figure 5:
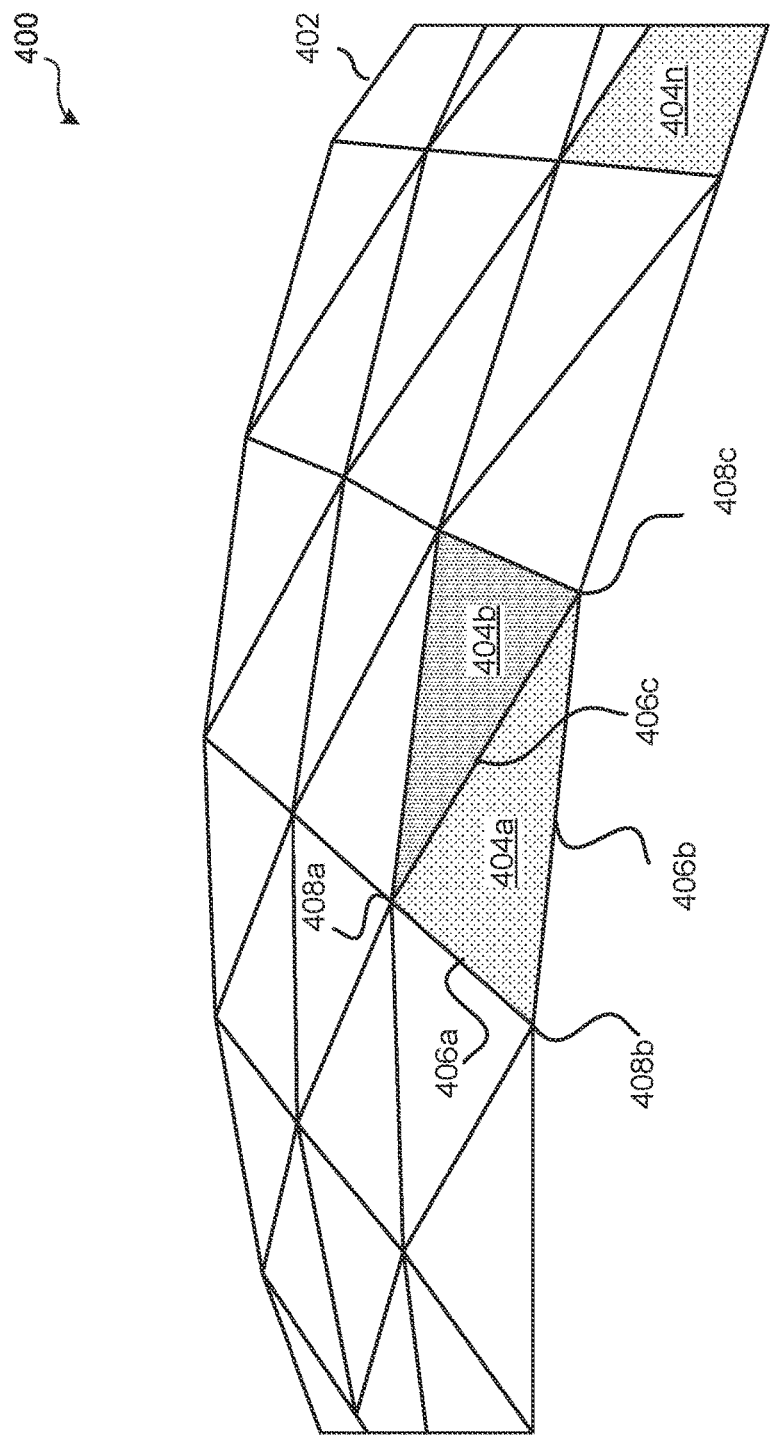
FIG. 5 illustrates an open mesh, for which a volume might be defined despite the mesh not entirely enclosing a volume.

FIG. 5 illustrates an open mesh, for which a volume might be defined despite the mesh not entirely enclosing a volume. FIG. 5 illustrates an example object 500 that is defined by an open mesh 502. Open mesh 502 does not define a particular volume. Open mesh 502 may include a plurality of faces (e.g., a face 504*a*, a face 504*b*, and up to a face 504*n*). For clarity of FIG. 5, only some of the faces are labeled with reference numbers. Each of the plurality of faces may be defined by a plurality of edges. For example, face 504*a* may be defined by an edge 506*a*, an edge 506*b*, and edge 506*c* (only edges of face 504*a* are labeled with reference numbers for clarity of FIG. 5). Each edge may be defined by an ordered pair of vertices. For example, edge 506*a* may be defined by a vertex 508*a* and a vertex 508*b*, edge 506*b* may be defined by vertex 508*b* and a vertex 508*c*, edge 506*c* may be defined by vertex 508*c* and vertex 508*a*. For clarity of FIG. 5, only vertices of face 504*a* are labeled with reference numbers.

In the illustrated example, open mesh 502 is a triangle mesh where each face includes a triangle. However, other polygon meshes are contemplated where the faces include quadrilaterals, pentagons, and/or other n-sided polygons that would be apparent to one of skill in the art in possession of the present disclosure. As can be seen from FIG. 5, object 500 does not include an origin point nor does object 500 define a volume for open mesh 502. However, in some situations an artist that is editing object 500 may want to visualize how deformations or other changes to object 500 are affecting "volume" of open mesh 502 or local volumes associated with any of faces 504*a*-404*n*.

Figure 6:
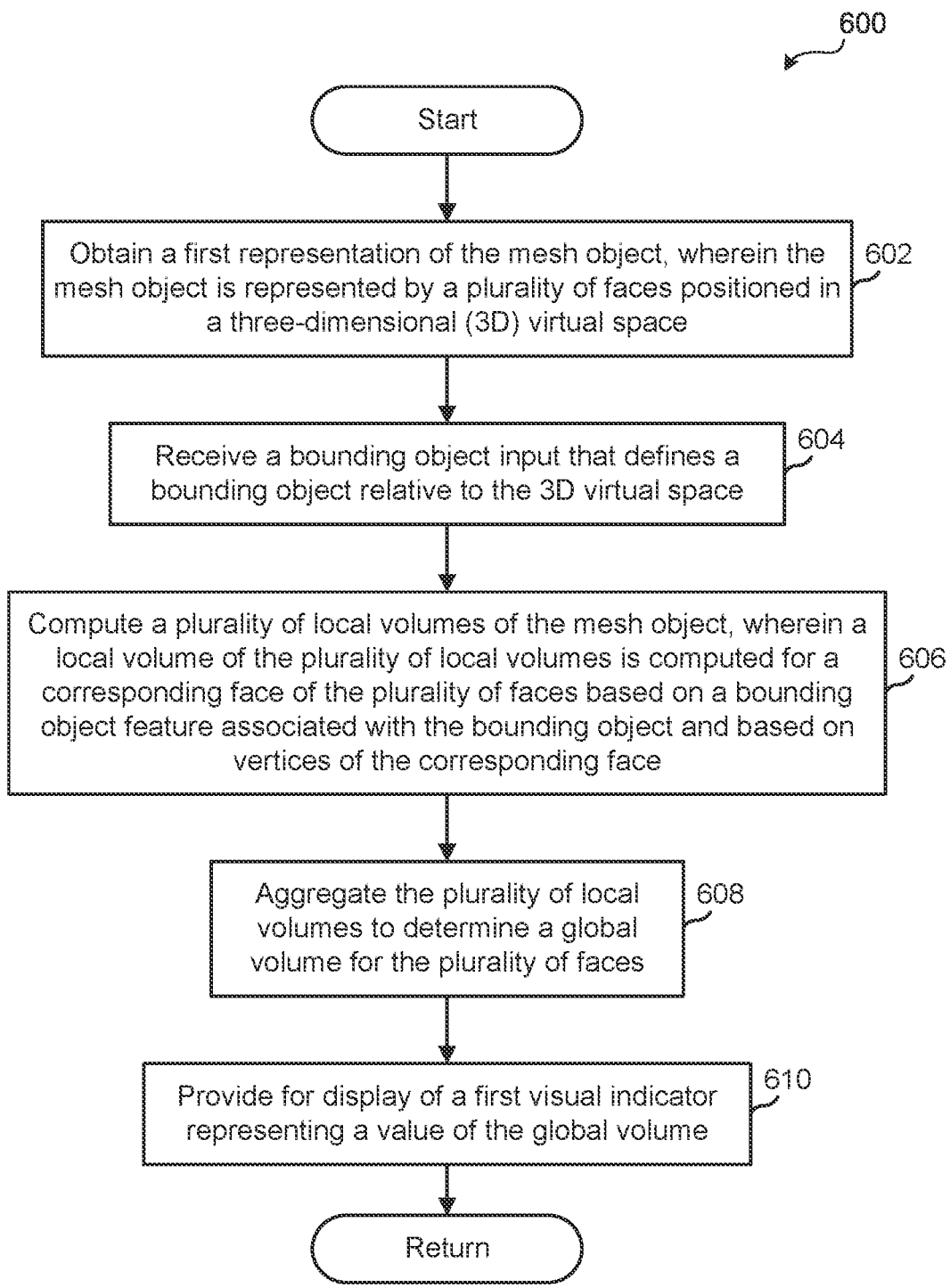
FIG. 6 is a flowchart of a method for determining local volumes, aggregating local volumes in presenting visual indicators of a global volume.

FIG. 6 is a flowchart illustrating an example of a process 600 for procedurally computing a volume of a mesh object in accordance with various implementations. Process 600 can include a series of operations where a bounding object is generated and visualized with a mesh object and local volume of faces of the mesh object and/or a global volume of the mesh object is computed using a bounding object feature of the bounding object and the vertices of the faces of the mesh object. The local and/or global volumes may be presented for display as a visual indicator.

Figure 7:
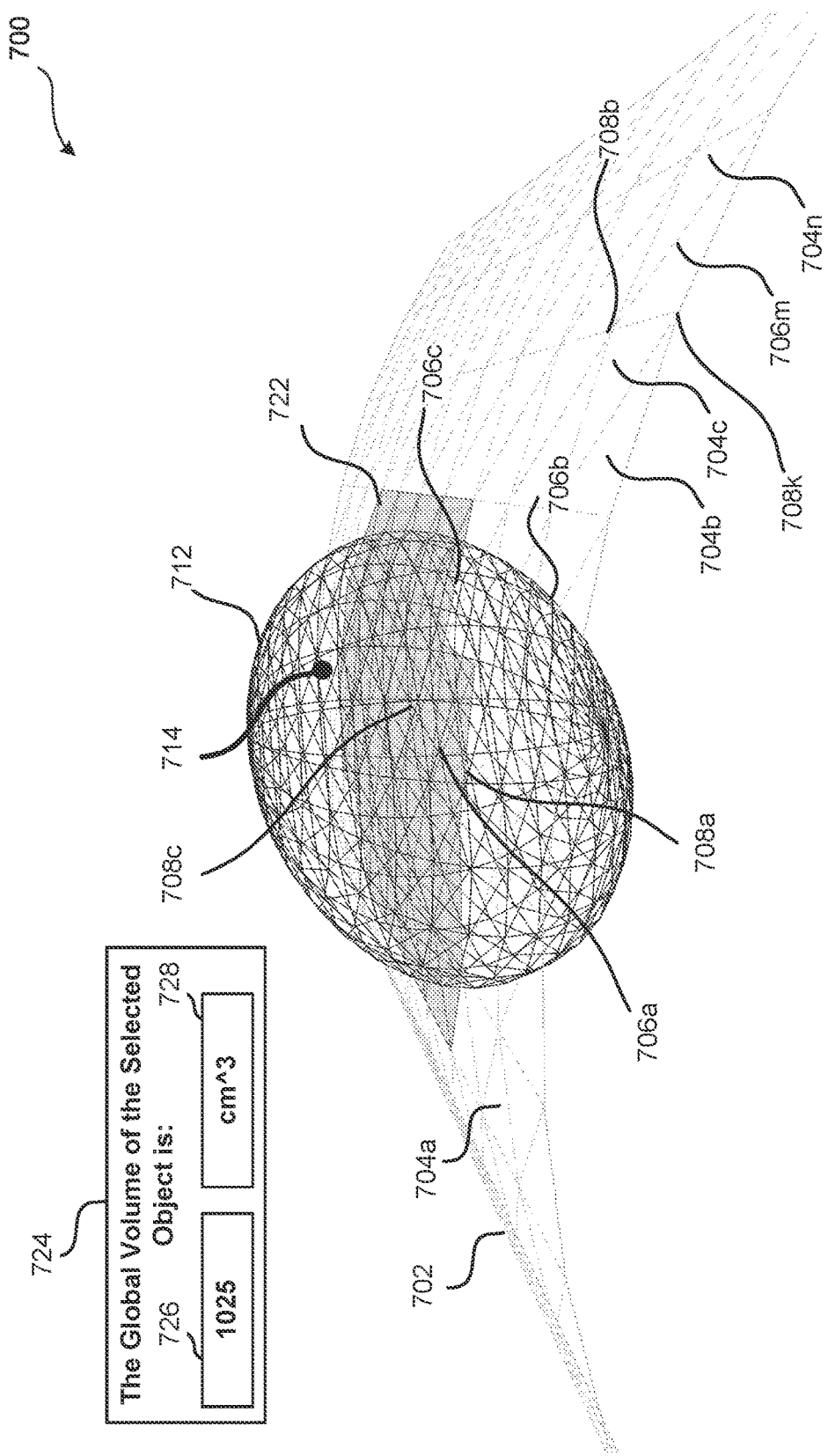
FIG. 7 illustrates bounding an open mesh and deforming an open mesh, as well as a bounding object defined about a portion of a closed meshed object with reference to method of FIG. 6.

FIG. 7 illustrates bounding an open mesh and deforming an open mesh, as well as a bounding object defined about a portion of a closed meshed object with reference to method of FIG. 6. In the illustrated example of FIG. 7, mesh object 702 is an open mesh. However, process 600 can be performed on open meshes and closed meshes.

Referring again to FIG. 6, in step 602, a graphics system (not shown) performing process 600 obtains a first representation of the mesh object. The mesh object may be represented in memory by a plurality of faces positioned in a three-dimensional (3D) virtual space, and can be in turn represented by a set of vertices such as points defined in the 3D virtual space and indications of which pairs of vertices have edges between them. In an implementation, at step 602, the system performing process 600 may obtain an object 700 that may be provided by mesh object 702 (see FIG. 7). Mesh object 702 is shown including a plurality of faces 704*a*-704*n* (only some of which are labeled with references numbers to provide clarity to the FIG. 7). Each face includes edges 706*a*-706*m* (only some of which are labeled with references numbers to provide clarity to the FIG. 7) defined by vertices 708*a*-708*k* (only some of which are labeled with references numbers to provide clarity to the FIG. 7). With reference to system 400 of FIG. 4, the object 700 may be represented as rendered mesh object dataset 402 at U/I 420 before bounding object input data 422 is received.

In step 604 of FIG. 6, the system performing process 600 may receive a bounding object input that defines a bounding object relative to the 3D virtual space. In an implementation, at step 604 and with reference to system 400 of FIG. 4, user 430 may define a bounding object at UI interface 420 that causes bounding object input data 422 to be generated and provided to volume processing unit 406. For example, and with reference to FIG. 7, user 430 may define bounding object 712 (e.g., an ellipsoid as illustrated in FIG. 7). However, other bounding objects may be contemplated such as, for example, a reference point, other 3D closed mesh shapes, or open mesh shapes. Bounding object 712 may include one or more bounding object features such as a bounding object origin point 714, and one or more faces that each are defined by a plurality of edges that might in turn be defined by a plurality of vertices.

In step 606, the system performing process 600 may compute a plurality of local volumes of the mesh object. A local volume of the plurality of local volumes is computed for a corresponding face of the plurality of faces based on a bounding object feature associated with the bounding object and based on vertices of the corresponding face. In an implementation, at step 606 and with reference to FIG. 4 and FIG. 7, volume processing unit 406 may compute a plurality of local volumes included in volume data 417 using mesh object data 414 associated with mesh object 702 and bounding object data 416 associated with bounding object 712. The system can compute s local volume of the plurality of local volumes for a corresponding face of the plurality of faces of mesh object 702 based on a bounding object feature associated with the bounding object and based on vertices of the corresponding face. For example, volume processing unit 406 can compute a local volume associated with each face of mesh object 702. Using Equation 1 above, volume processing unit 406 can use the vertices of each face in mesh object 702 and bounding object origin point 714 of bounding object 712 or any other bounding object feature to compute a local volume of each face of mesh object 702.

In other implementations, the local volume might be determined for only selected faces of mesh object 702. For example, volume processing unit 406 may determine local volumes of only those faces of mesh object 702 that are intersected by bounding object 712 (e.g., a set of faces 722, shown with darker shading that is a subset of the faces of mesh object 702). In other implementations, bounding object input data 422 may include a selection of faces of mesh object 702 for which local volumes are to be determined. The selection may be made by user 430 via U/I 420.

In various implementations, bounding object 712 may include a reference mesh object of mesh object 702 prior to edits to that reference mesh object that results in mesh object 702. The computed volume for any of the faces of mesh object 702 may be the signed prismatic volume between corresponding faces of mesh object 702 and the reference mesh object. Such a definition does not require the notion of a volume to be attached to mesh object 702, but may only be concerned with volume as a measure of the change in shape of the faces, as a volumetric slab between mesh object 702 and the reference mesh object. For a single face of mesh object 702, the volume change corresponding to the change in shape is that of the prism bounded by the face on mesh object 702 and reference mesh, respectively.

In step 608, the system performing process 600 may aggregate the plurality of local volumes to determine a global volume for the plurality of faces. In an implementation, at step 608 and with reference to FIG. 4 and FIG. 7, volume processing unit 406 may aggregate the plurality of local volumes to determine a global volume (e.g., total volume) for the plurality of faces of mesh object 702. The global volume may be provided in volume data 417. The global volume and the plurality of local volumes may be provided in the bounding object, mesh object, and volume data 408 to update mesh object and bounding object parameters 404.

In step 610, the system performing process 600 may provide for display of a first visual indicator representing a value of the global volume. In an implementation, at step 610 and with reference to FIG. 4 and FIG. 7, renderer 418 might use mesh object dataset 402 (which includes bounding object, mesh object, and volume data 408) to display mesh object 702, bounding object 712, and a visual indicator 724 representing a value of the global volume for set of faces 722. Visual indicator 724 might comprise a value field 726 and a units field 728 that together indicate that the computed volume is 1025 cm$^3$.

Subsequently, any edits made to mesh object 702 may result in volume processing unit 306 receiving those edits and updating visual indicator 724 with new global volume computations and mesh object edits to mesh object 702. Value field 726 might be updated in real time as a user manipulates mesh object 702 and/or the bounding object. Units field 728 might change as the user selects an option for a different unit of volume for display.

Note that one or more of the operations performed in steps 602-610 may be performed in various orders and combinations, including in parallel. While steps 602-610 describe one possible implementation of techniques of the present disclosure, one of skill in the art in possession of the present disclosure will recognize that other implementations are possible. Some or all of process 600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 600 may be performed by any suitable system, such as by an application server, by multiple computing devices in a distributed system of a computing resource service provider, or by any electronic computing device such as computer system 400 of FIG. 4, which may be a member of an animation creation system, such as animation system 2530 component of the of visual content generation system 2500 depicted in FIG. 25.

Figure 8:
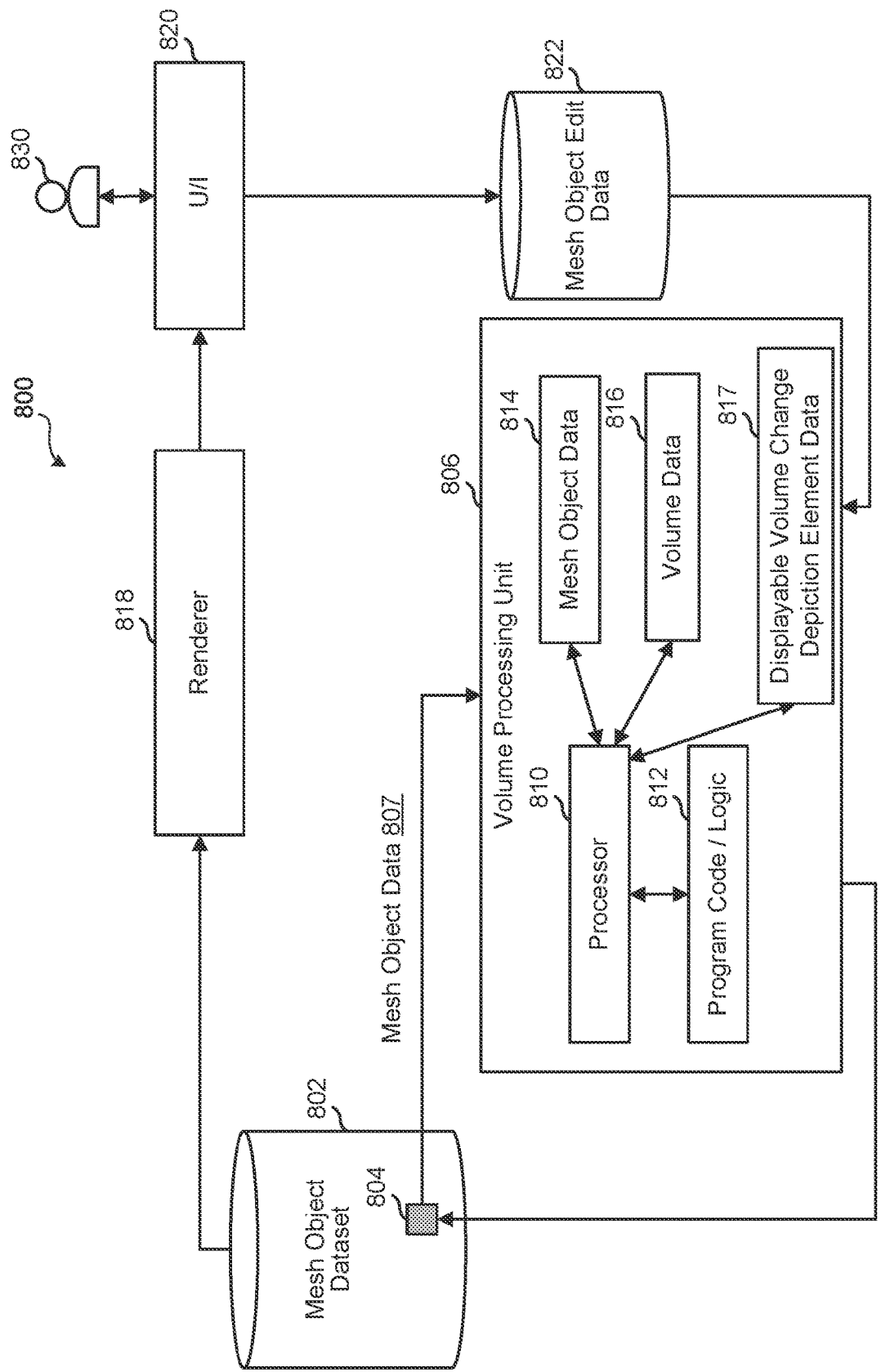
FIG. 8 is a block diagram of a graphics processing system that might be used to compute volumes and volume parameters or representations that are displayable in the user interface to represent volume, volume changes, and/or other attribute changes as might result from object editing.

FIG. 8 is a block diagram of a graphics processing system that might be used to compute volumes and volume parameters or representations that are displayable in the user interface to represent volume, volume changes, and/or other attribute changes as might result from object editing. As shown in FIG. 8, a system 800 for generating a displayable volume change depiction element that represents a mesh object volume change is illustrated. The system includes a mesh object dataset 802, a volume processing unit 806, a renderer 818, a user interface (UI) 820, and mesh object edit data 822.

A user 830 may interact with the UI 820 that is displaying an object (e.g., object 100 of FIG. 1) provided by the mesh object dataset 802 to perform an editing action to a mesh object that defines the object where the editing action creates a deformed mesh object. Mesh object dataset 802 may store data for mesh objects, such as characters, creatures, inanimate elements and/or any other objects. Mesh object dataset 802 may be loaded with data from a source of an animation, such as a mesh (e.g., an open mesh or a closed mesh) used to define a character, a creature, an inanimate element, and/or any other object. Mesh object edit data 822 may include selections of one or more faces of the mesh object in the mesh object dataset 802 and changes to the position of one or more vertex of each face. Volume processing unit 806 may utilize the methods and processes described herein to take mesh object edit data 822 and incorporate mesh edits included in mesh object edit data 822 with mesh object dataset 802 to produce a second representation of the mesh object associated with the mesh object dataset 802, compute a local volume for each face of the second representation of the mesh object, and/or compute a global volume of the plurality of faces of the second representation of the mesh object by aggregating the local volumes associated with each face. Volume processing unit 806 may compute volume using the vertices of the mesh object with corresponding vertices of faces of a bounding or the reference point (e.g., an origin point of the bounding object), as described above. However, if the object represented by the mesh object dataset 802 is a closed mesh object, then that mesh object may have its own reference point which may be used to compute a local volume associated with each face.

More specifically, volume processing unit 806 includes a processor 810 that executes program code 812 to generate the second representation of the mesh object using the mesh object edit data 822, compute local volume of faces of the mesh object designated in mesh object edit data 822 using mesh object data 814 provided by mesh object data 807 that is based on mesh object and displayable volume change depiction element parameters 804 from mesh object dataset 802, and determine any changes in the local volume of the mesh object, compute a global volume of the mesh object, and generate a displayable volume change depiction element computed based on the difference between the global volume of the first representation of the mesh object and the global volume of the second representation of the mesh object.

Volume processing unit 806 may further store displayable volume change depiction element and mesh object edits data 808 to dataset 802 and update mesh object and displayable volume change depiction element parameters 804 so that the corresponding second representation of the mesh object and the displayable volume change depiction element may be rendered by renderer 818 for a visualization using the mesh object and also visualization of the volume of the mesh object or local volume of some or all of the faces of the mesh object. For example, volume processing unit 806 may initiate the process by taking mesh object edit data 822 with mesh object data 814 and incorporating mesh object edit data 822 relative to the mesh object data 814. The volume processing unit 806 may also compute the volume data 816 for the faces of the mesh object selected by the user 830 and indicated in the mesh object edit data 822 and update displayable volume change depiction element data 817.

Based on the mesh object data 814, mesh object edit data 822, volume data 816 and displayable volume change depiction element data 817, volume processing unit 806 may then output displayable volume change depiction element, mesh object, and volume data 808, which may include mesh object and displayable volume change depiction element parameters 804 stored by dataset 802 as well as other required data to reproduce the displayable volume change depiction element and the mesh object. Volume processing unit 806 may then be ready to receive additional mesh object edit data 822 to repeat the process and update the mesh object and the displayable volume change depiction element. The resulting second representation of the mesh object and the displayable volume change depiction element may be rendered by renderer 818 and/or output to user 830 to inspect the results via U/I 820. Displayable volume change depiction element can be a display element such as is shown in FIG. 7 or other volume change depiction element described herein.

Figure 9:
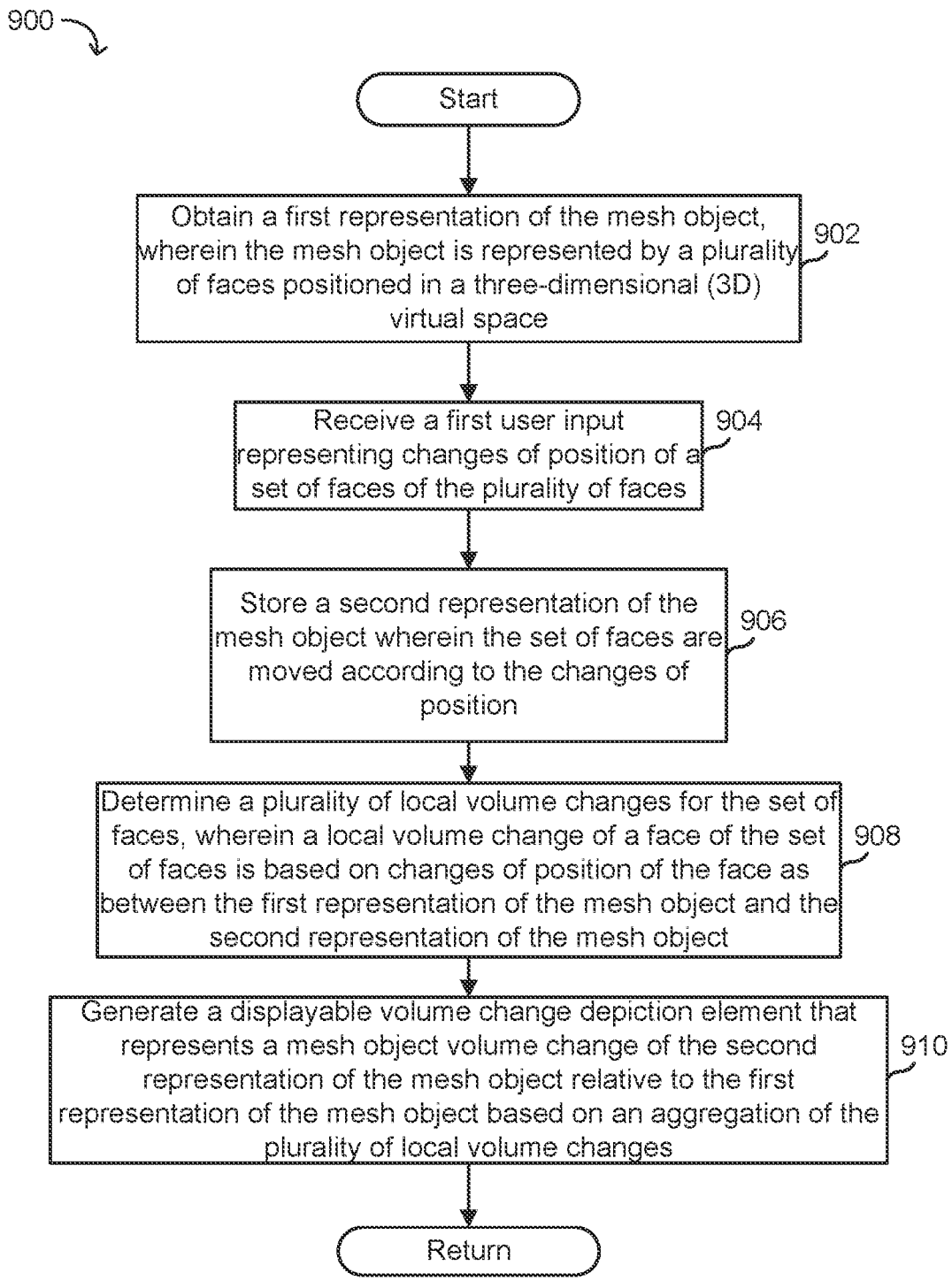
FIG. 9 is a flowchart of a method for generating a volume change depiction element.

FIG. 9 is a flowchart illustrating an example of a process 900 for procedurally generating a representation of a change in a volume of a mesh object, the representation usable in a user interface in accordance with various implementations. Some or all of process 900 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 25:
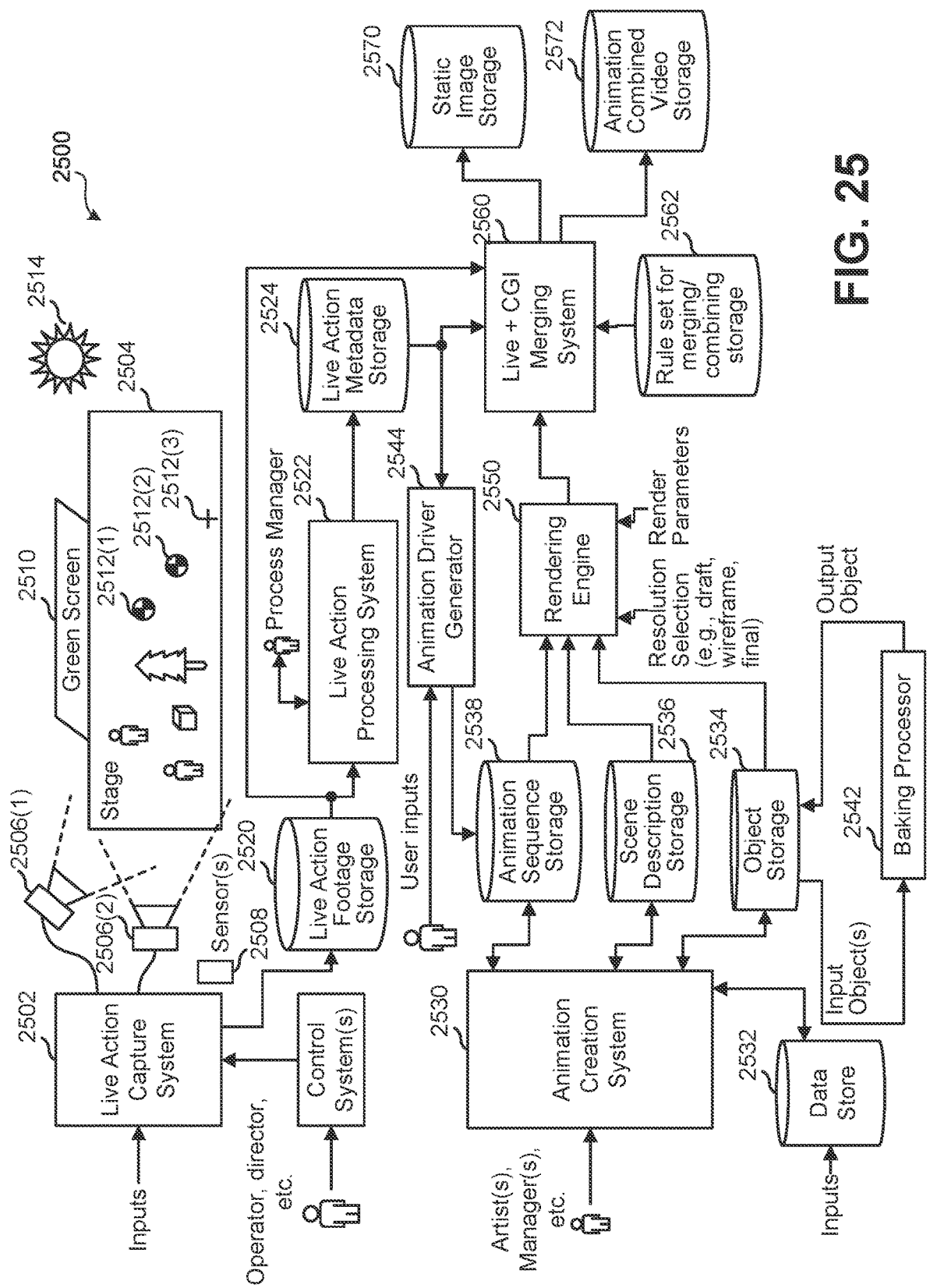
FIG. 25 illustrates an example visual content generation system as might be used to generate imagery in the form of still images and/or video sequences of images, according to various implementations.

For example, some or all of process 900 may be performed by any suitable system, such as by an application server, by multiple computing devices in a distributed system of a computing resource service provider, or by any electronic computing device such as computer system 800 of FIG. 8, which may be a member of an animation creation system, such as the animation system 2530 component of the of visual content generation system 2500 depicted in FIG. 25. Process 900 includes a series of operations where a local volume of faces of the mesh object and/or a global volume of the mesh object is computed and a displayable volume change depiction element is generated that represents a mesh object volume change.

Figure 10:
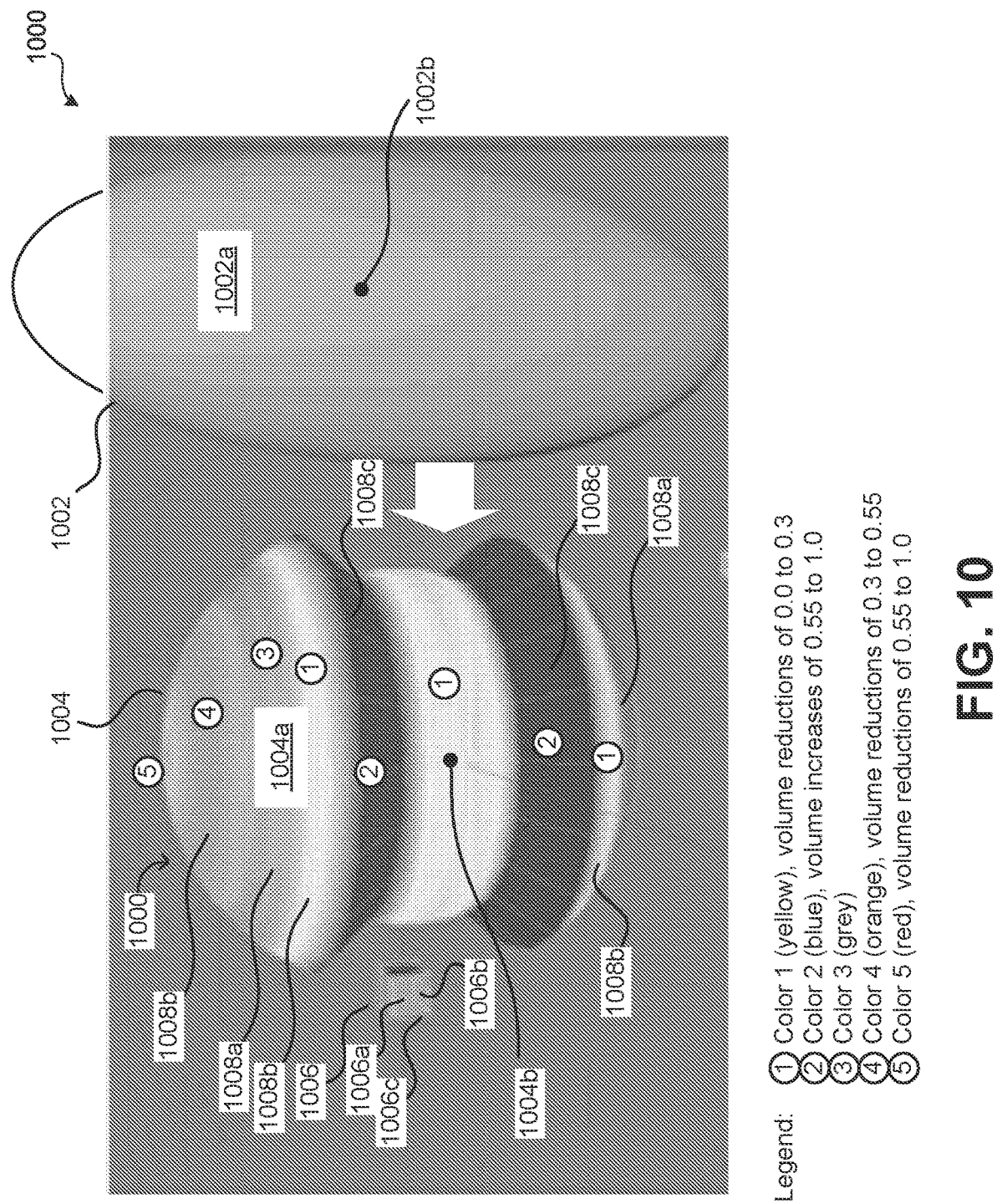
FIG. 10 illustrates a volume change depiction element that represents an amount of volume lost or gained as a result of object editing, where the volume change depiction can include coloration to indicate local changes, and the volume change depiction element having a characteristic, such as a size, that corresponds to the volume change.
Figure 11:
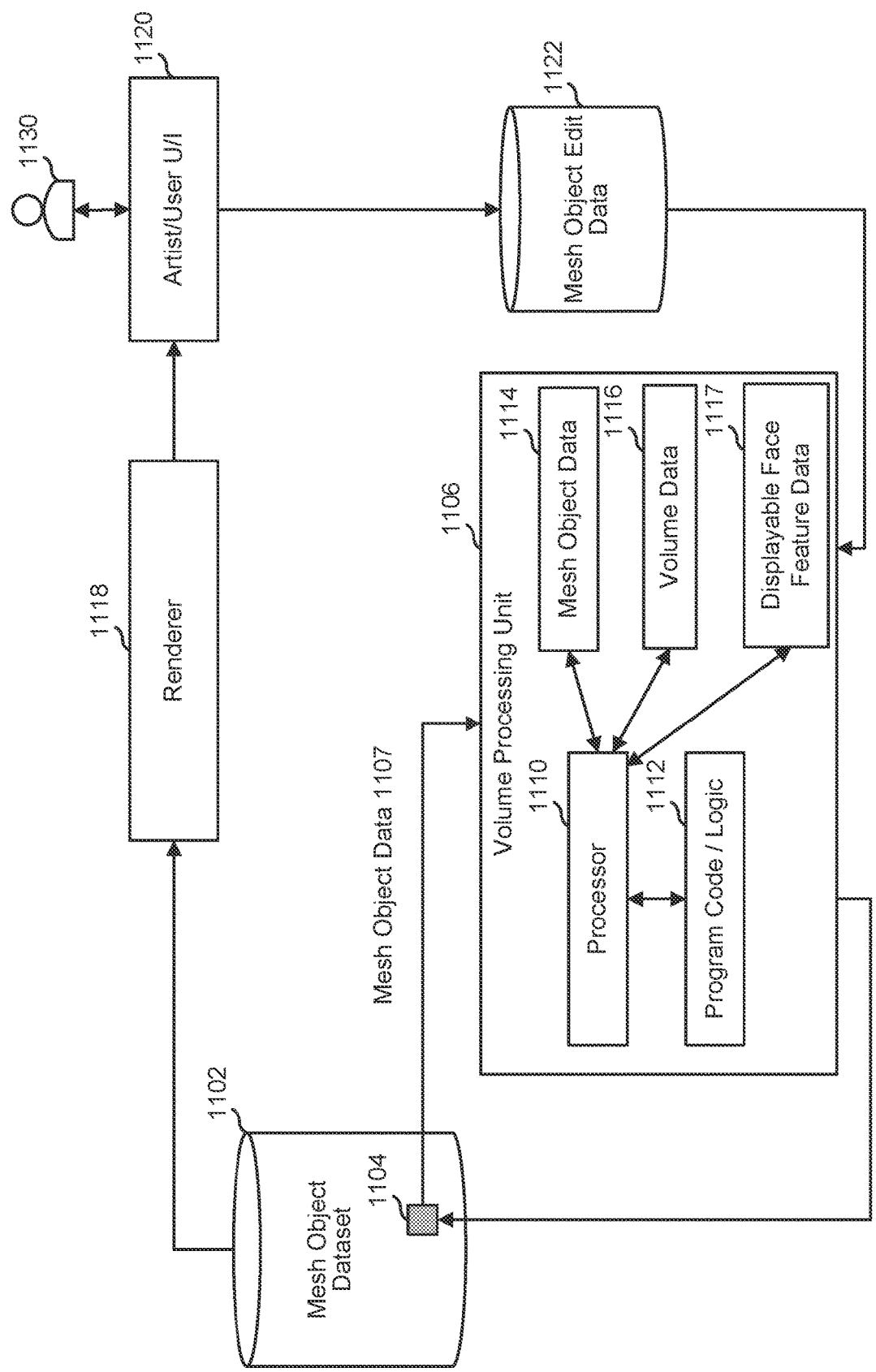
FIG. 11 is a block diagram of a graphics processing system that might be used to compute face feature data and provide representations of face features based on volume changes and/or other changes.

FIG. 10 illustrates a volume change depiction element that represents an amount of volume lost or gained as a result of object editing, where the volume change depiction can include coloration to indicate local changes, and the volume change depiction element having a characteristic, such as a size, that corresponds to the volume change.

Referring again to FIG. 9, in step 902, the system performing the process 900 obtains a first representation of the mesh object. The mesh object may be represented by a plurality of faces positioned in a three-dimensional (3D) virtual space. In an implementation, at step 902 and with reference to FIG. 10, the system performing process 900 may obtain an object that may be provided by a mesh object dataset 1002. In the illustrated example of FIG. 10, mesh object 1002 may be a closed mesh having an origin point. However, it is contemplated that process 900 may be performed on closed meshes or open meshes that that associated with a volume defined by a bounding object. The mesh object 1002 includes a plurality of faces (not illustrated). Each face includes edges (not illustrated) defined by vertices. With reference to system 800 of FIG. 8, the object 1000 may be rendered mesh object data 802 as a first representation at the user U/I 820 before mesh object edit data 822 is received. The mesh object 1002 may define a global volume 1002a that may be calculated based local volumes computed using the vertices of the faces of the mesh object and an origin point 1002b.

In step 904 of FIG. 9, the system performing process 900 may receive a first user input representing changes of position of a set of faces of the plurality of faces. In an implementation, at step 904 and with reference to system 800 of FIG. 8, user 830, via U/I 820, may input an edit to at least one face of mesh object 1002 (e.g., moving at least one vertex of at least one face to a different position within the 3D virtual space) that causes mesh object edit data 822 to be generated and provided to the volume processing unit 806. For example, and with reference to FIG. 10, user 830 may edit mesh object 1002 to become mesh object 1004 defining a volume 1004a and including an origin point 1004b. In lieu of human user input, the input representing changes of position of a set of faces of the plurality of faces might be programmatically generated, generated by AI, etc.

In step 906, the system performing process 900 may store a second representation of the mesh object where the set of faces are moved according to the changes of position. In step 908, the system performing process 900 may determine a plurality of local volume changes for the set of faces. A local volume change of a face of the set of faces is based on changes of position of the face as between the first representation of the mesh object and the second representation of the mesh object. In step 910, the system performing process 900 may generate a displayable volume change depiction element that represents a mesh object volume change of the second representation of the mesh object relative to the first representation of the mesh object based on an aggregation of the plurality of local volume changes.

In an implementation, at steps 906, 908, and 910, as discussed above in the discussion of FIG. 8, volume processing unit 806 might use mesh object edit data 822 and mesh object data 814 of the mesh object and displayable volume change depiction element parameters 804 associated with mesh object 1002 and the mesh object edit data 822 to generate the mesh object 1004. Volume processing unit 806 may also use the volume data 816 that includes local volume computations for mesh object 1002 and local volume computation for mesh object 1004 to compute a local volume change for each face of the set of faces as between mesh object 1002 and mesh object 1004. Volume processing unit 806 may also update displayable volume change depiction element data 817 such that displayable volume change depiction element 1006 is generated. The volume processing unit 806 outputs displayable volume change depiction element, mesh object, and volume data 808 displayable to update the mesh object and displayable volume change depiction element parameters 804. Renderer 818 may use the mesh object dataset 802 that includes displayable volume change depiction element, mesh object, and volume data 808 to display mesh object 1002 (optionally), mesh object 1004, and displayable volume change depiction element 1006 representing a value of a change in volume between mesh object 1002 and mesh object 1004.

In various implementations, volume processing unit 806 may determine a degree of volume change for each local volume change using volume data 816. Volume processing unit 806 may also determine a volume degree range of a plurality of volume degree ranges that each degree of volume change for each local volume change satisfies. Volume change depiction element 1006 may include one or more volume change depiction sub-elements 1006a, 1006b, and/or 1006c for each of the plurality of volume degree ranges that represent a net volume change associated with the faces associated with that particular volume degree range. In various implementations, displayable volume change depiction element 1006 is a 3D object and one or more volume change depiction sub-elements 1006a, 1006b, and/or 1006c that are included in the 3D object are nested versions of the 3D object.

For example, a first set of faces 1008a of mesh objects 1002 and 1004 might undergo a ±0-5% volume change (e.g., a first volume degree range), a second set of faces 1008b of mesh objects 1002 and 1004 might undergo a ±5-10% volume change (e.g., a second volume degree range), and a third set of face 1008c of mesh objects 1002 and 1004 might undergo a ±10-15% volume change (e.g., a third volume degree range). The volume ranges need not be symmetric about zero. Each volume degree range may be represented by a volume change depiction sub-element. For example, the first volume degree range that includes first set of faces 1008a may be represented by volume change depiction sub-element 1006a, the second volume degree range that includes second set of faces 1008b may be represented by volume change depiction sub-element 1006b, and the third volume degree range that includes second set of faces 1008c may be represented by volume change depiction sub-element 1006c.

Volume change depiction sub-element 1006a might be sized to represent the net volume change of first set of faces 1008a. Volume change depiction sub-element 1006b might be sized to represent the net volume change of second set of faces 1008b. Furthermore, volume change depiction sub-element 1006c might be sized to represent a net volume change of third set of faces 1008c. As such, the displayable volume change depiction element 1006 might be sized to represent the volume change in global volumes 1002a and 1004a between mesh object 1002 and mesh object 1004, or portions thereof. In a specific example, first set of faces 1008a might have experienced a net volume gain of one cubic units, second set of faces 1008b might have experienced a net volume gain of six cubic units, and third set of faces 1008c might have experienced a net volume gain of seven cubic units. As such, volume change depiction element 1006 might be sized at 14 cubic units. Volume change depiction sub-element 1006a might be one cubic unit nested in volume change depiction sub-element 1006b that when combined with volume change depiction sub-element 1008a is seven cubic units. Volume change depiction sub-elements 1006a and 1006b might be nested in volume change depiction sub-element 1006c that when combined with volume change depiction sub-element 1006a is fourteen cubic units.

In the illustrated implementation, volume change depiction element 1006 is a cube and the sub-elements 1006a-1006c are nested cubes. However, other 3D shapes (e.g., spheres, pyramids, and the like) are contemplated. Furthermore, the volume change depiction sub-elements 1006a, 1006b, 1006c, and volume change depiction element 1006 may be separate representations such that those sub-elements 1006a, 1006b, and 1006c and element 1006 are not nested and displayed as a single representation. Volume change depiction element 1006 and/or its volume change depiction sub-elements 1006a-1006c may provide a visualization to user 830 (in FIG. 8) that represents a difference between volume 1002a of reference mesh object 1002 and volume 1004a of mesh object 1004. Volume change depiction element 1006 might help an artist/user visualize an amount of volume gain and loss because of edits as well as where those gains and losses are located.

In various implementations, volume processing unit 806 of FIG. 8 might receive a selection input of one or more volume degree ranges of the plurality of volume degree ranges to be represented by volume change depiction element 1006 in FIG. 10. The mesh object volume change represented by displaying volume change depiction element 1006 includes only the volume changes associated with the one or more volume degree ranges selected by the selection input. For example, mesh object edit dataset 822 of FIG. 8 might include a selection input from user 830 via U/I 820. User 830 may have selected to ignore changes in the first volume degree range while presenting changes in the second volume degree range and the third volume degree range. As such, the volume change depiction sub-element 1006a may not be displayed while the volume change depiction sub-element 1006b and the volume change depiction sub-element 1006c are displayed. Volume change depiction element 1006 can be resized to ignore the volume change associated with the first volume degree range but in other implementations, volume change depiction element 1006 might still take the changes into account. In yet other implementations, user 830 may make changes to the values of the volume change ranges.

In various implementations, volume processing unit 806 might determine that the mesh object volume change of the second representation of the mesh object satisfies a volume change threshold and causes for display a feature (e.g., a color, a texture, a transparency, a gradient) of the volume change depiction element according to a rule associated with the volume change threshold. For example, the volume change depiction element 1006 might be displayed having a first color if mesh object 1004 has a volume change gain or might be displayed having a second color that is different than the first color if mesh object 1004 has a volume change loss. If the volume change gain or loss is greater than a predetermined threshold value such as a value identified by a user that does not want the volume of the mesh object to change by particular amount, then the volume change depiction element 1006 might be displayed having a third color that indicates to user 830 that the volume change threshold has been satisfied. While specific displayable volume change depiction elements are discussed, one of skill in the art in possession of the present disclosure will recognize that other displayable volume change depiction elements, features of displayable volume change depiction elements, and/or rules for displayable volume change depiction elements may be contemplated without depart from the scope of the present disclosure. For example, loss or gain may be associated with a color feature of the displayable volume change depiction element 1006 while volume change threshold being satisfied or not satisfied may be associated with a transparency feature of displayable volume change depiction element 1006.

With reference to process 900, subsequent to the displayable volume change depiction element being generated for display, any edits made to the mesh object 1004 might result in volume processing unit 806 receiving those edits and updating volume change depiction element 1006 as a result of new global volume computations and mesh object edits. As such, the process 900 might be repeated based on the second representation of the mesh object (e.g., mesh object 1004) or the first representation of the mesh object (e.g., mesh object 1002). Mesh object 1002 might be defined as a reference mesh such that any subsequent change to the mesh object 1004 will result in the change in volume of any subsequent mesh object to be calculated using mesh object 1002 rather than mesh object 1004. Note that one or more of the operations performed in steps 902-910 may be performed in various orders and combinations, including in parallel. While steps 902-910 describe one possible implementation of techniques of the present disclosure, one of skill in the art in possession of the present disclosure will recognize that other implementations are possible.

Referring now to FIG. 9, a system 900 for generating a displayable face feature for a face of a mesh object where the displayable face feature represents a local volume change for that face is illustrated. The system includes a mesh object dataset 902, a volume processing unit 906, a renderer 918, a user interface (UI) 920, and mesh object edit data 922.

A user 1130 might interact with UI 1120 that is displaying an object (e.g., object 100 of FIG. 1) provided by mesh object dataset 1102 to perform an editing action to a mesh object that defines the object and where the editing action creates a deformed mesh object. Mesh object dataset 1102 might store data for mesh objects, such as characters, creatures, inanimate elements, and/or other objects. Mesh object dataset 1102 might be loaded with data from a source of an animation, such as a mesh (e.g., an open mesh or a closed mesh) used to define a character, a creature, an inanimate element and/or any other object. Mesh object edit data 1122 might include selections of one or more faces of the mesh object in mesh object dataset 1102 and changes to the position of at least one vertex of each face. Volume processing unit 1106 might utilize the methods and processes described herein to use mesh object edit data 1122 and incorporate mesh edits included in mesh object edit data 1122 with mesh object dataset 1102 to produce a second representation of the mesh object associated with the mesh object dataset 1102, compute a local volume for each face of the second representation of the mesh object, and/or compute a global volume of the plurality of faces of the second representation of the mesh object by aggregating the local volumes for each face together. Volume processing unit 1106 might compute volume using the vertices of the mesh object with corresponding vertices of faces of a bounding object or the reference point (e.g., an origin point of the bounding object), as described herein. However, if the object represented by mesh object dataset 1102 is a closed mesh object, then that mesh object might have its own reference point, which might be used to compute a local volume for each face.

More specifically, volume processing unit 1106 includes a processor 1110 that executes program code 1112 to generate the second representation of the mesh object using the mesh object edit data 1122, compute local volume of faces of the mesh object designated in mesh object edit data 1122 using mesh object data 1114 provided by mesh object data 1107 that is based on mesh object and displayable volume change depiction element parameters 1104 from mesh object dataset 1102, determine any changes in the local volume of the mesh object, and generating a displayable face feature associated with each face of the set of faces of the second representation of the mesh object according to a face feature rule associated with the local volume change for that face. Volume processing unit 1106 might further store displayable face feature and mesh object edits data 1108 to dataset 1102 and update mesh object and displayable face feature parameters 1104 so that the corresponding second representation of the mesh object and the face features might be rendered by renderer 1118 for a visualization of the mesh object with face features that are associated with local volume changes.

For example, volume processing unit 1106 might initiate the process by taking mesh object edit data 1122 with mesh object data 1114 and incorporating mesh object edit data 1122 relative to the mesh object data 1114. The volume processing unit 1106 might also compute the volume data 1116 for the faces of the mesh object selected by the user 1130 and indicated in the mesh object edit data 1122 and update displayable face feature data 1117. Based on the mesh object data 1114, mesh object edit data 1122, volume data 1116 and displayable volume change depiction element data 1117, volume processing unit 1106 might then output displayable face feature and mesh object data 1108, which might include mesh object and displayable face features parameters 1104 stored by dataset 1102 as well as other required data to reproduce the mesh object and face features on faces of the mesh object. Volume processing unit 1106 might then be ready to receive additional mesh object edit data 1122 to repeat the process and update the mesh object and face features on the mesh object. The resulting second representation of the mesh object and face features might be rendered by renderer 1118 and/or output to user 1130 to inspect the results via U/I 1120.

Figure 12:
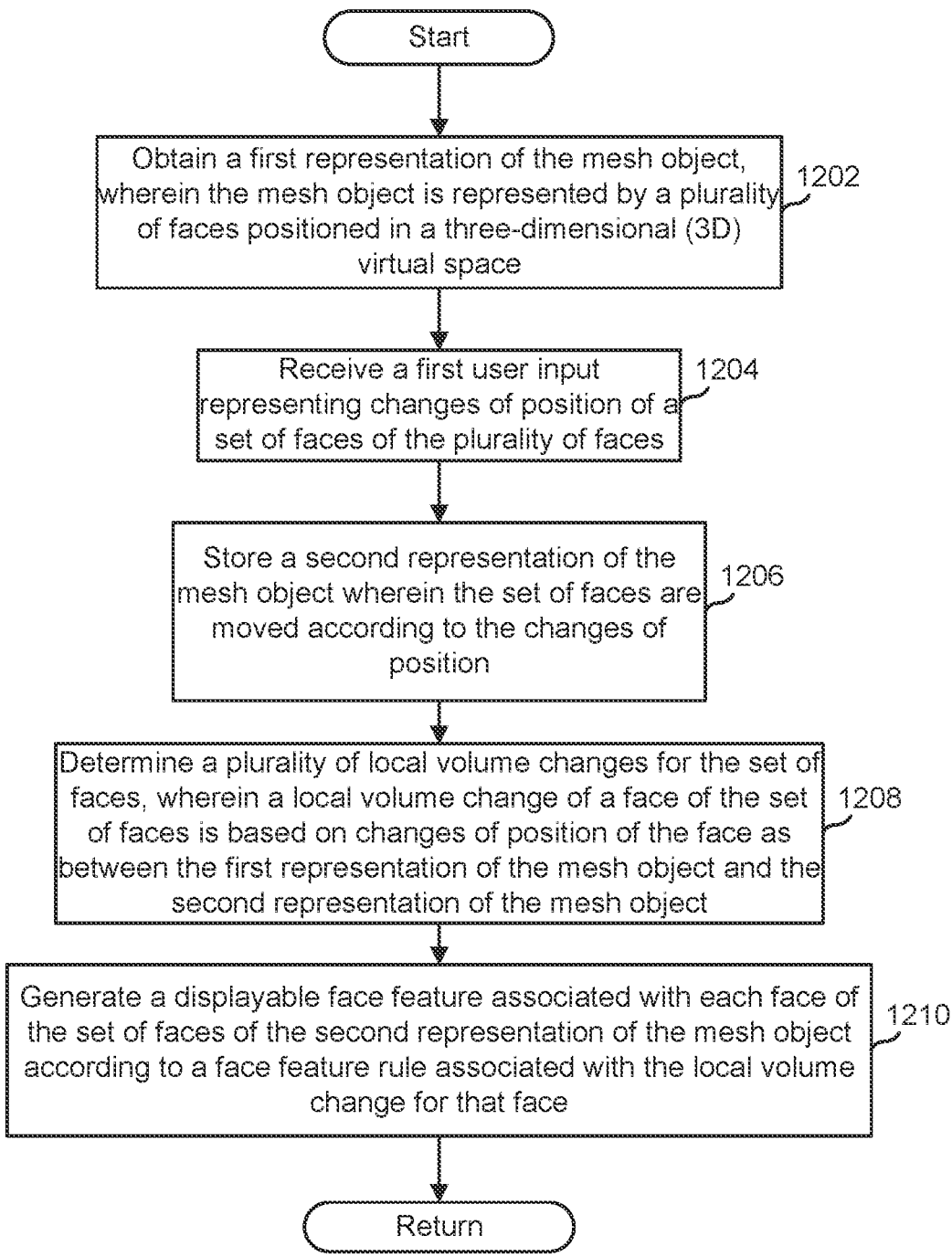
FIG. 12 is a flowchart of a method for generating face features, as might apply to local volume changes of open objects or closed objects and displaying changes as coloration based on degree/type of change.

FIG. 12 is a flowchart illustrating an example of a process 1200 for procedurally generating a representation of a change in a local volume associated with a face of a mesh object, the representation usable in a user interface in accordance with various implementations. Some or all of the process 1200 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 13:
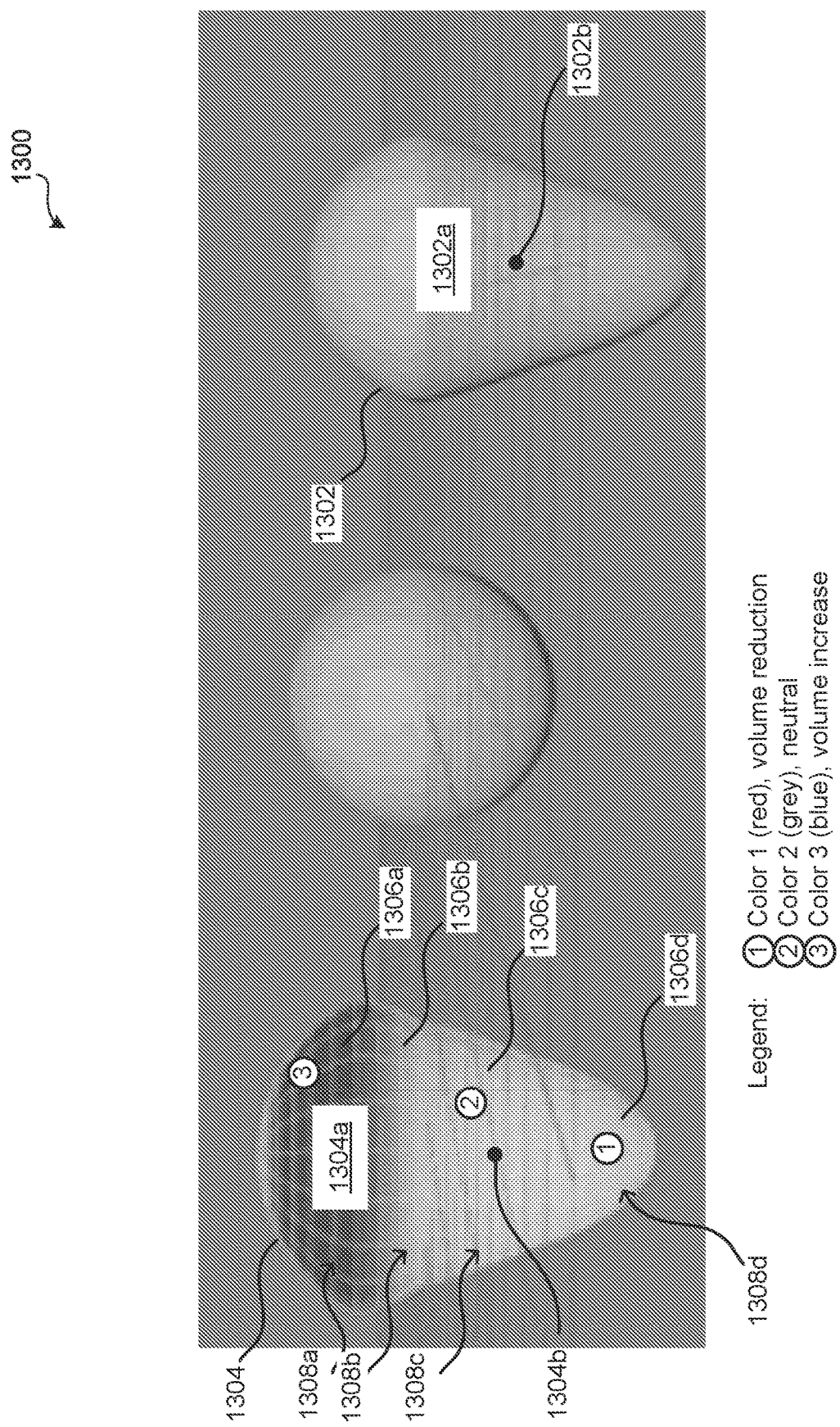
FIG. 13 illustrates a user display that might depict volume gain and volume loss displayed as face features on faces of a virtual object.

For example, some or all of process 1200 may be performed by any suitable system, such as by an application server, by multiple computing devices in a distributed system of a computing resource service provider, or by any electronic computing device such as computer system 1300 of FIG. 13, which may be a member of an animation creation system, such as the animation system 2530 component of the of visual content generation system 2500 depicted in FIG. 25. Process 1200 includes a series of operations where a local volume of faces of the mesh object is computed and a displayable face feature is generated that represents a local volume change for a face of the mesh object.

In step 1202, the system performing process 1200 obtains a first representation of the mesh object. The mesh object may be represented by a plurality of faces positioned in a three-dimensional (3D) virtual space. In an implementation, at step 1202 and with reference to FIG. 13, the system performing process 1200 may obtain an object 1300 that may be provided by mesh object 1302. In the illustrated example of FIG. 13, mesh object 1302 may be a closed mesh defining a global volume 1302a that may be calculated based on local volumes computed using vertices of the faces of mesh object 1302 and an origin point 1302b. However, it is contemplated that process 1200 may be performed on closed meshes or open meshes associated with a volume defined by a bounding object. The mesh object 1302 includes a plurality of faces (not illustrated). Each face includes edges (not illustrated) defined by vertices. With reference to system 900 of FIG. 9, the object 1300 may be rendered mesh object data 902 as a first representation at the user U/I 920 before mesh object edit data 922 is received.

In step 1204 of FIG. 12, the system performing process 1200 may receive a first user input representing changes of position of a set of faces of the plurality of faces. In an implementation, at step 1204 and with reference to system 900 of FIG. 9, the user 930, via the artist/user U/I 920, may input an edit to at least one face of the mesh object 1302 of FIG. 13 (e.g., moving at least one vertex of at least one face to a different position within the 3D virtual space) that causes mesh object edit data 922 to be generated and provided to the volume processing unit 306. For example, and with reference to FIG. 13, user 930 may edit mesh object 1302 to generate mesh object 1304 defining a volume 1304a and including an origin point 1304b.

In step 1206, the system performing process 1200 may store a second representation of the mesh object where the set of faces are moved according to the changes of position. In step 1208, the system performing process 1200 may determine a plurality of local volume changes for the set of faces. A local volume change of a face of the set of faces is based on changes of position of the face as between the first representation of the mesh object and the second representation of the mesh object. In step 1210, the system performing the process 1200 may generate a displayable face feature associated with each face of the set of faces of the second representation of the mesh object according to a face feature rule associated with the local volume change for that face.

In an implementation, at steps 1206, 1208, and 1210, as discussed above in the discussion of FIG. 9, the volume processing unit 906 may use mesh object edit data 922 and mesh object data 914 of the mesh object and displayable face feature parameters 904 associated with mesh object 1302 and the mesh object edit data 922 to generate the mesh object 1304. The volume processing unit 906 may also use the volume data 916 that includes local volume computations for each face of the plurality of faces included in the mesh object 1302 and local volume computation for each face of the plurality of faces included in mesh object 1304 to compute a local volume change for each face of the set of faces as between the mesh object 1302 and mesh object 1304. The volume processing unit 906 may also update displayable face feature data 917 such that face features 1306a, 1306b, 1306c, and/or 1306d are generated on faces included in a set of faces 1308a, 1308b, 1308c, and/or 1308d, respectively. The volume processing unit 906 outputs displayable face feature, mesh object, and volume data 908 displayable to update the mesh object and displayable face feature parameters 904. Renderer 918 may use the mesh object dataset 902 that includes displayable face feature, mesh object, and volume data 908 to display mesh object 1302 (optionally), mesh object 1304, and the displayable face features 1306a, 1306b, 1306c, and/or 1306d representing a value of a change in local volume associated with corresponding faces between mesh object 1302 and mesh object 1304.

In various implementations, the volume processing unit 906 may determine a degree of volume change for each local volume change using the volume data 916. The volume processing unit 906 may also determining a volume degree range of a plurality of volume degree ranges that each degree of volume change for each local volume change satisfies.

For example, set of faces 1308c of mesh object 1302 and 1304 may undergo a ±0-5% volume change (e.g., a first volume degree range), set of faces 1308b of mesh object 1302 and 1304 may undergo a +(5%-10%) volume change (e.g., a second volume degree range), set of faces 1308a may undergo a +(10%-15%) volume change (e.g., a third volume degree range), and set of faces 1308d of mesh object 1302 and 1304 may undergo a −(5%-10%) volume change (e.g., a fourth volume degree range). Each volume degree range may be represented by a different face feature. For example, the first volume degree range may be represented by face feature 1306c (e.g., a first color) on the faces of the first set of faces 1308c that may be the same color as the faces on the reference mesh object 1302, the second volume degree range may be represented by face feature 1306b on the faces of second set of faces 1308b, and the third volume degree range may be represented by a face feature 1306c on the faces of second set of faces 1308c. In a specific example, the first set of faces 1308a may have experienced a net volume gain of 0.1%, and thus the face feature 1306a may be displayed on the first set of faces 1308a, which may be the same as the reference mesh object (e.g., mesh object 1302). The second set of faces 1308b may have experienced a volume gain of 6.1%, and thus the face feature 1306b (e.g., a blue color) may be displayed on the second set of faces 1308. The third set of faces 1308c may have experienced a volume loss of 7.1%, and thus the face feature 1306c (e.g., a blue color) may be displayed on the third set of faces 1308. While the face features are illustrated as "colors" other face features such as, for example, transparency, texture, gradient, and/or any other face feature that may provide a visual of a local volume change of a face of mesh object that would be apparent to one of skill in the art in possession of the present disclosure.

In various implementations, the volume processing unit 906 may receive a selection input of one or more volume degree ranges of the plurality of volume degree ranges to be represented by the face feature. The local volume change represented by displaying the face features includes only the volume changes associated with the one or more volume degree ranges selected by the selection input. For example, the mesh object edit data 922 of FIG. 9 may include the selection input from the user 930 via the artist/user U/I 920. The user 930 may have selected to ignore changes in the first volume degree range while presenting changes in the second volume degree range and the third volume degree range. As such, the face feature 1306a may not be displayed or displayed as a neutral face feature (e.g., not indicating a particular volume change (e.g., a gray color)) while the face feature 1306b and the feature 1306c are displayed. In yet other implementations, the user 930 may make changes to the values of the volume change ranges.

With reference to process 1200, subsequent to the displayable face feature being generated for display, any edits made to the mesh object 1304 may result in volume processing unit 906 receiving those edits and updating face features 1306 according changes in local volume computations for edits to faces. As such, the process 1200 may be repeated based on the second representation of the mesh object (e.g., mesh object 1304) or the first representation of the mesh object (e.g., mesh object 1302). Mesh object 1302 may defined as a reference mesh such that any subsequent change to the mesh object 1304, the computation of the change in local volume of any subsequent mesh object will be calculated using mesh object 1302 rather than mesh object 1304. Note that one or more of the operations performed in steps 1202-1210 may be performed in various orders and combinations, including in parallel. While steps 1202-1210 describe one possible implementation of techniques of the present disclosure, one of skill in the art in possession of the present disclosure will recognize that other implementations are possible.

Figure 14:
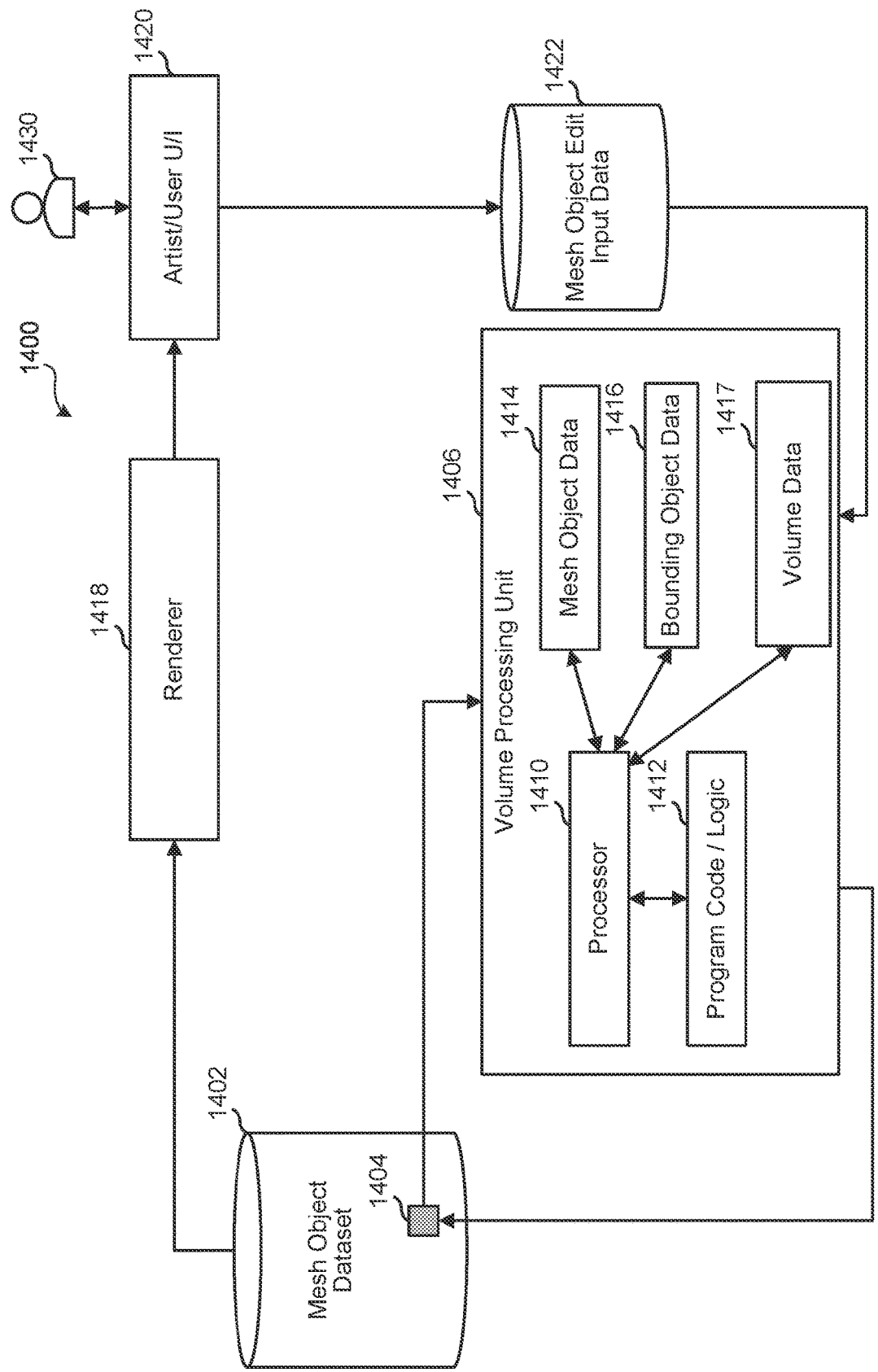
FIG. 14 is a block diagram of a graphics processing system that might be used to compute face feature of faces of a virtual object based on attribute changes.

Referring now to FIG. 14, a system 1400 for generating a displayable face feature for a face of a mesh object where the displayable face feature represents a local attribute change for that face is illustrated. The system includes a mesh object dataset 1402, an attribute processing unit 1406, a renderer 1418, a user interface (UI) 1420, and mesh object edit data 1422.

A user 1440 may interact with the UI 1420 that is displaying an object (e.g., object 100 of FIG. 1) provided by the mesh object dataset 1402 to perform an editing action to a mesh object that defines the object where the editing action creates a deformed mesh object. Mesh object dataset 1402 may store data for mesh objects, such as characters, creatures, inanimate elements, and/or objects. Mesh object dataset 1402 may be loaded with data from a source of an animation, such as a mesh (e.g., an open mesh or a closed mesh) used to define a character, a creature, an inanimate element and/or any other object. Mesh object edit data 1422 may include selections of one or more faces of the mesh object in the mesh object dataset 1402 and changes to the position of one or more vertex of each face. Attribute processing unit 1406 may utilize the methods and processes described herein to take mesh object edit data 1422 and incorporate mesh edits included in mesh object edit data 1422 with mesh object dataset 1402 to produce a second representation of the mesh object associated with the mesh object dataset 1402, and/or compute a local attribute for each face of the second representation of the mesh object. The attribute processing unit 1406 may compute an attribute using the vertices of a face with corresponding vertices of a face of a reference mesh. For example, the attribute processing unit 1406 may determine a shear, a strain, a displacement, and/or any other attribute associated with a face of a mesh object that would be apparent to one of skill in the art in possession of the present disclosure.

More specifically, attribute processing unit 1406 includes a processor 1410 that executes program code 1412 to generate the second representation of the mesh object using the mesh object edit data 1422, compute local attributes associated with faces of the mesh object designated in mesh object edit data 1422 using face data 1414 from mesh object dataset 1402, determine any changes in the local attribute of the faces of mesh object, and generate a displayable face feature associated with each face of the mesh object based on the difference between the local attribute of the first representation of that face and the local attribute of the second representation of that face. Attribute processing unit 1406 may further store displayable face features and mesh object edits data 1408 to dataset 1402 so that the corresponding second representation of the mesh object and the displayable face feature may be rendered by renderer 1418 for a visualization using the mesh object and also visualization of the attribute of the mesh object or local attribute of some or all of the faces of the mesh object. For example, attribute processing unit 1406 may initiate the process by taking mesh object edit data 1422 with face data 1414 and incorporating mesh object edit data 1422 relative to the face data 1414. The attribute processing unit 1406 may also compute the attribute data 1416 for the faces of the mesh object selected by the user 1440 as indicated in the mesh object edit data 1422 and update displayable face feature 1417. Based on the face data 1414, mesh object edit data 1422, attribute data 1416 and displayable face feature 1417, attribute processing unit 1406 may then output displayable face feature, mesh object, and attribute data 1408, which may include mesh object and displayable face feature parameters 1404 stored by dataset 1402 as well as other required data to reproduce the displayable face feature and the mesh object. Attribute processing unit 1406 may then be ready to receive additional mesh object edit data 1422 to repeat the process and update the mesh object and the displayable face feature. The resulting second representation of the mesh object and the face feature may be rendered by renderer 1418 and/or output to user 1440 to inspect the results via the user U/I.

Figure 15:
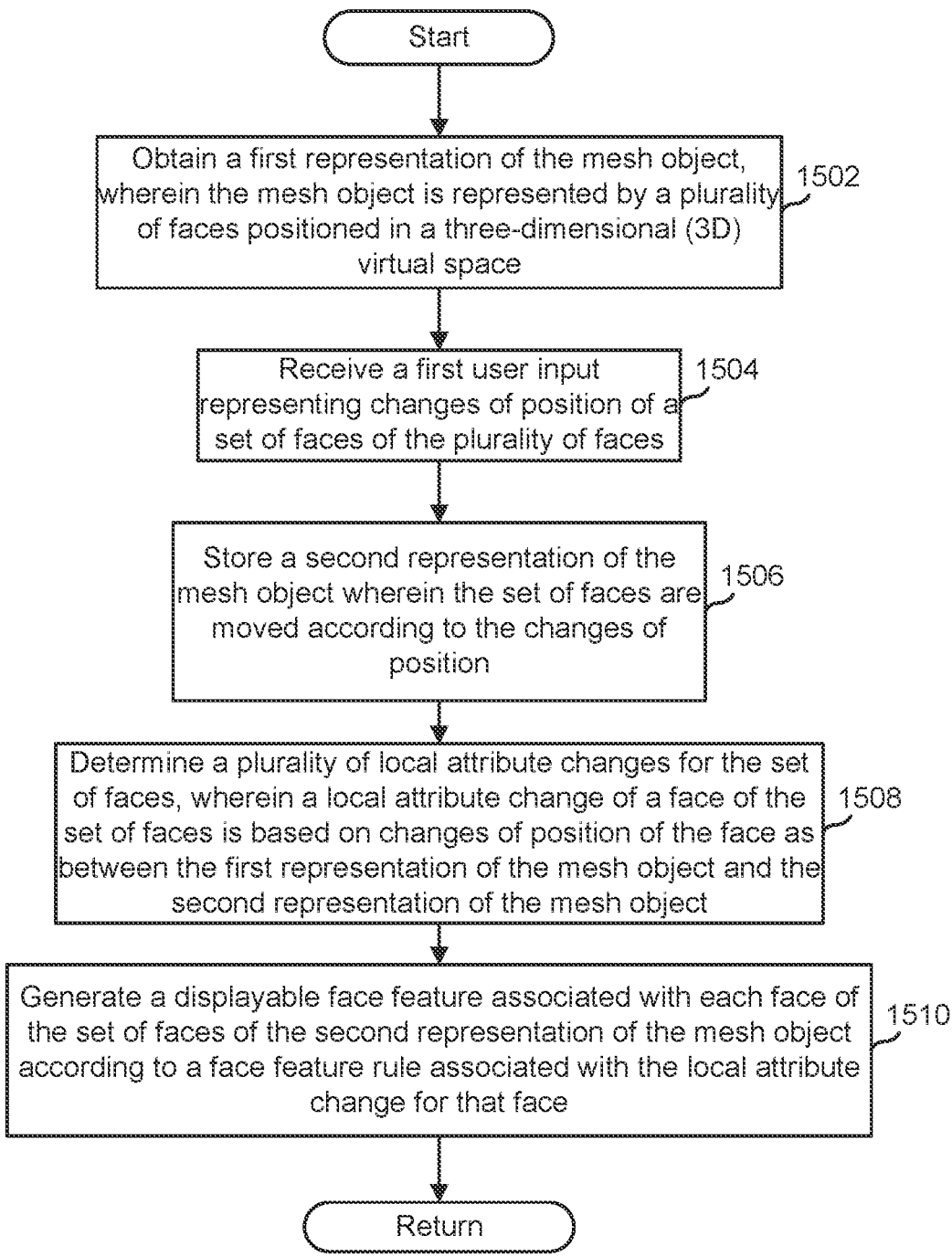
FIG. 15 is a flowchart of a method for illustrating attribute changes as face feature changes.

FIG. 15 is a flowchart illustrating an example of a process 1500 for procedurally generating a representation of a change in a local attribute associated with a face of a mesh object, the representation usable in a user interface in accordance with various implementations. Some or all of the process 1500 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1500 may be performed by any suitable system, such as by an application server, by multiple computing devices in a distributed system of a computing resource service provider, or by any electronic computing device such as computer system 1400 of FIG. 14, which may be a member of an animation creation system, such as the animation system 2530 component of the of visual content generation system 2500 depicted in FIG. 25. Process 1500 includes a series of operations where a local attribute of faces of the mesh object is computed and a displayable face feature is generated that represents a local attribute change for a face of the mesh object.

Figure 16:
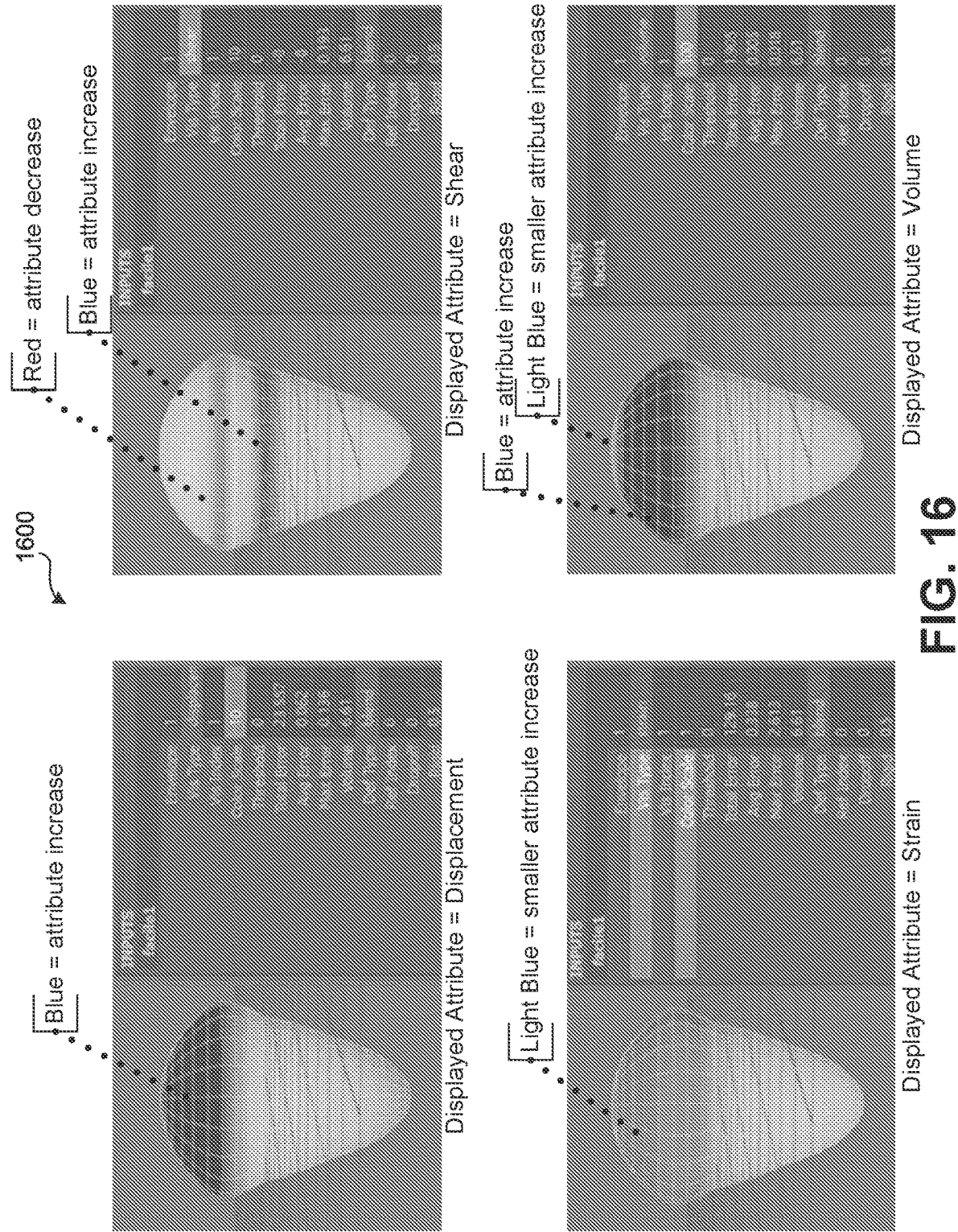
FIG. 16 illustrates attribute changes on a face-by-face basis of a virtual object.

In step 1502, the system performing the process 1500 obtains a first representation of the mesh object. The mesh object may be represented by a plurality of faces positioned in a three-dimensional (3D) virtual space. In an implementation, at step 1502 and with reference to FIG. 16, the system performing the process 1500 may obtain an object 1600 that may be provided by mesh object 1602. In the illustrated example of FIG. 16, mesh object 1602 may be a closed mesh having an origin point 1603. The mesh object 1602 includes a plurality of faces (not illustrated). Each face includes edges (not illustrated) defined by vertices. With reference to system 1400 of FIG. 14, the object 1600 may be rendered mesh object data 1402 as a first representation at the user U/I 1420 before mesh object edit data 1422 is received. The mesh object 1602 may define a global volume 1602*a* that may be calculated based local volumes computed using the vertices of the faces of the mesh object and the origin point 1603. As illustrated in FIG. 16, the object 1600 and mesh object 1602 are displayed in a first Graphical User Interface (GUI) 1601*a*, a second GUI 1601*b*, and a third GUI 1601*c*. As discussed in more detail below, GUIs 1601*a*, 1601*b*, and 1601*c* illustrate face features for different attribute changes based on the same change to the mesh object 1602.

In step 1504 of FIG. 15, the system performing the process 1500 may receive a first user input representing changes of position of a set of faces of the plurality of faces. In an implementation, at step 1504 and with reference to system 1400 of FIG. 14, the user 1430, via the artist/user U/I 1420, may input an edit to at least one face of the mesh object 1602 of FIG. 16 (e.g., moving at least one vertex of at least one face to a different position within the 3D virtual space) that causes mesh object edit data 1422 to be generated and provided to the volume processing unit 306. For example, and with reference to FIG. 16, user 1430 may edit mesh object 1602 to generate mesh object 1604.

In step 1506, the system performing the process 1500 may store a second representation of the mesh object where the set of faces are moved according to the changes of position. In an implementation at step 1508, the system performing the process 1500 may determine a plurality of local attribute changes for the set of faces. A local attribute change of a face of the set of faces is based on changes of position of the face as between the first representation of the mesh object and the second representation of the mesh object. In step 1510, the system performing the process 1500 may generate a displayable face feature associated with each face of the set of faces of the second representation of the mesh object according to a face feature rule associated with the local attribute change for that face.

In an implementation, at steps 1506, 1508, and 1510, as discussed above in the discussion of FIG. 14, the attribute processing unit 1406 may use mesh object edit data 1422 and mesh object data 1414 of the mesh object and displayable face feature parameters 1404 associated with mesh object 1602 and the mesh object edit data 1422 to generate the mesh object 1604. The attribute processing unit 1406 may also use the attribute data 1416 that includes vertices for each face of the plurality of faces included in mesh object 1602 and mesh object 1604 to compute a local attribute change for each face of the set of faces as between the mesh object 1602 and mesh object 1604. For example, and as illustrated in FIG. 16, GUI 1601*a* illustrates a displacement attribute change, GUI 1601*b* illustrates a strain attribute change, and GUI 1601*c* illustrates a shear attribute change. The attribute processing unit 1406 may also update displayable face feature data 1417 such that face feature 1606 is generated. The attribute processing unit 1406 outputs displayable face feature, mesh object, and attribute data 1408 displayable to update the mesh object and displayable face feature parameters 1404. Renderer 1418 may use the mesh object dataset 1402 that includes displayable face feature, mesh object, and attribute data 1408 to display mesh object 1602 (optionally), mesh object 1604, and the displayable face feature 1606 representing a value of a change in a local attribute associated with corresponding faces between mesh object 1602 and mesh object 1604.

In various implementations, the attribute processing unit 1406 may determine a degree of attribute change for each local attribute change using the attribute data 1416. The attribute processing unit 1406 may also determine an attribute degree range of a plurality of attribute degree ranges that each degree of attribute change for each local attribute change satisfies.

For example, a first set of faces 1608*a* of mesh object 1602 and 1604 in GUI 1601*a* may undergo a ±0-5% displacement change (e.g., a first displacement degree range), a second set of faces 1608*b* of mesh object 1602 and 1604 in GUI 1601*a* may undergo a +(10%-15%) displacement change (e.g., a second displacement degree range), and a third set of faces 1608*c* of mesh object 1602 and 1604 may undergo a +(5%-10%) displacement change (e.g., a third displacement degree range). Each displacement degree range may be represented by a different face feature. For example, the first displacement degree range may be represented by a face feature 1606*a* (e.g., a first color) on the faces of the first set of faces 1608*a* that may be the same color as the faces on the reference mesh object 1602, the second displacement degree range may be represented by a face feature 1606*b* on the faces of second set of faces 1608*b*, and the third displacement degree range may be represented by a face feature 1606*c* on the faces of second set of faces 1608*c*. In a specific example, the first set of faces 1608*a* may have experienced a net displacement gain of 0.1%, and thus the face feature 1606*a* may be displayed on the first set of faces 1608*a*, which may be the same as the reference mesh object (e.g., mesh object 1602). The second set of faces 1608*b* may have experienced a displacement gain of 11.1%, and thus the face feature 1606*b* (e.g., a blue color) may be displayed on the second set of faces 1608. The third set of faces 1608*c* may have experienced a displacement gain of 5.1%, and thus the face feature 1606*c* (e.g., a blue color) may be displayed on the third set of faces 1608. Note that the transparency of the face feature 1606*c* is greater than the transparency of face feature 1606*b* to illustrate the degree of displacement while the color represents whether the displacement is positive or negative. As such, a face may include more than one face feature to represent different information to the user.

In the example of displayed by GUI 1601*b*, a first set of faces 1608*a* of mesh object 1602 and 1604 in GUI 1601*b* may undergo a ±0-5% strain change (e.g., a first strain degree range), a second set of faces 1608*b* of mesh object 1602 and 1604 in GUI 1601*b* may undergo a +(10%-15%) strain change (e.g., a second strain degree range), and a third set of faces 1608*c* of mesh object 1602 and 1604 may undergo a −(5%-10%) strain change (e.g., a third strain degree range). Each strain degree range may be represented by a different face feature. For example, the first strain degree range may be represented by a face feature 1606*a* (e.g., a first color) on the faces of the first set of faces 1608*a* that may be the same color as the faces on the reference mesh object 1602, the second strain degree range may be represented by a face feature 1606*b* on the faces of second set of faces 1608*b*, and the third strain degree range may be represented by a face feature 1606*c* on the faces of second set of faces 1608*c*. In a specific example, the first set of faces 1608*a* may have experienced a net strain gain of 0.0%, and thus the face feature 1606*a* may be displayed on the first set of faces 1608*a*, which may be the same as the reference mesh object (e.g., mesh object 1602). The second set of faces 1608*b* may have experienced a strain gain of 10%, and thus the face feature 1606*b* (e.g., a blue color) may be displayed on the second set of faces 1608. The third set of faces 1608c may have experienced a strain loss of 5%, and thus the face feature 1606c (e.g., a red color) may be displayed on the third set of faces 1608. Note that the transparency of the face feature 1606c is greater than the transparency of face feature 1606b to illustrate the degree of strain while the color represents whether the strain is positive or negative.

In the example of displayed by GUI 1601c, a first set of faces 1608a of mesh object 1602 and 1604 in GUI 1601c may undergo a ±0-5% shear change (e.g., a first shear degree range), a second set of faces 1608b of mesh object 1602 and 1604 in GUI 1601c may undergo a +(10%-15%) shear change (e.g., a second shear degree range), and a third set of faces 1608c of mesh object 1602 and 1604 may undergo a −(10%-15%) shear change (e.g., a third shear degree range). Each shear degree range may be represented by a different face feature. For example, the first shear degree range may be represented by a face feature 1606a (e.g., a first color) on the faces of the first set of faces 1608a that may be the same color as the faces on the reference mesh object 1602, the second shear degree range may be represented by a face feature 1606b on the faces of second set of faces 1608b, and the third shear degree range may be represented by a face feature 1606c on the faces of second set of faces 1608c. In a specific example, the first set of faces 1608a may have experienced a net shear gain of 0.0%, and thus the face feature 1606a may be displayed on the first set of faces 1608a, which may be the same as the reference mesh object (e.g., mesh object 1602). The second set of faces 1608b may have experienced a shear gain of 10%, and thus the face feature 1606b (e.g., a blue color) may be displayed on the second set of faces 1608. The third set of faces 1608c may have experienced a shear loss of 12%, and thus the face feature 1606c (e.g., a red color) may be displayed on the third set of faces 1608. Note that the transparency of the face feature 1606c is the same as the transparency of face feature 1606b to illustrate the degree of shear is relatively the same while the color represents whether the shear is positive or negative.

While the face features are illustrated as "colors" and/or "transparency", other face features are contemplated such as, for example, texture, gradient, and/or any other face feature that may provide a visual representation of information related to a local attribute change of a face of mesh object that would be apparent to one of skill in the art in possession of the present disclosure.

In some places herein, vectors and points in an N-dimensional space are labeled with labels in lowercase bold, variables are referred to in UPPERCASE ITALICS, indices (such as in summations) are indicated as single letter italics such as i, j, and k, and functions are referred to as in shape-energy( ). Each of these elements can be instantiated as data structures readable from a memory, presented in a user interface, modified in some instances by a computer process, etc. depending on context.

The geometric attributes for 3D object meshes that can be locally analyzed, interactively visualized and used to deform the mesh might be other than volume. A graphics processing system might take as its input one or more reference meshes $M^r$ and compare a geometry $M^o$ with a reference mesh index. The graphic processing system can compute, in advance and/or in real time, vector values such as $ref_p$ corresponding to a location of a vertex in a 3D space prior to a deformation and $def_p$ corresponding to the location of the vertex in the 3D space after the deformation. Thus, ref can refer to the point in the 3D space from which a vertex is deformed from and def refers to the point to which the vertex is deformed to.

Some geometric attributes that can be computed per face or per vertex might include, for example:

Displacement: One attribute that might be presented is a displacement value. A displacement value might be determined as a magnitude difference between corresponding points, which might be computed as disp-value(p)=$\|def_p-ref_p\|^2$ for some point p in a set of points. The displacement can be parsed into a component of change normal to the mesh and a component in the tangent plane. The normal displacement, dispNorm(p), can be measured as a magnitude difference between corresponding points projected on a vertex normal $N_p$ (typically of the deformed point) and defining dispNorm(p)=$\|def_p-ref_p\| \cdot N_p$, where the "." operator is a dot product operator. A non-squared projected normal displacement as above can be negative, with the sign indicating to the user whether the point is moving out from (+ve) or into (−ve) the surface of the object. A dispNorm$^2$(p) function value can be visualized as a non-negative quantity, similar to displacement. For some uses, it might be useful to sum disp-value(p) over the set of points. In other uses, the set of unaggregated disp-value(p) values might be operated on.

Tangent-Displacement: One attribute that might be presented is a tangent-displacement value corresponding to a magnitude difference in tangent plane that can be computed using the function tan-disp(p)=sqrt($\|def_p-ref_p\|^2$−dispNorm$^2$(p)), or instead $\|def_p-ref_p\|^2$−dispNorm$^2$(p), as a measure similar to displacement. For some uses, it might be useful to sum tan-disp(p) over the set of points. In other uses, the set of unaggregated values for tan-disp(p) might be operated on.

Strain: One attribute that might be presented is a strain value representing a fraction of change in edge length averaged at vertices. A strain value might be computed using the function strain-value(e)=($|def_e|-|ref_e|$)/$|ref_e|$, where $ref_e$ corresponds to an edge length prior to a deformation and $def_e$ corresponds to the edge length after the deformation. For some uses, it might be useful to sum strain-value(p) over the set of points. In other uses, the set of unaggregated strain-value(p) values might be operated on.

Shear: One attribute that might be presented is a shear value representing a change in corresponding face angles averaged at vertices. A shear value might be computed using the function shear-value(p, angle)=$def_{angle}-ref_{angle}$, where $ref_{angle}$ corresponds to an angle at vertex p in the 3D space prior to a deformation and $def_{angle}$ corresponds to the angle at vertex p in the 3D space after the deformation. For some uses, it might be useful to sum the values of strain-value(p) over the set of points. In other uses, the set of unaggregated values for strain-value(p) might be operated on.

Volume: One attribute that might be presented is a volume value representing a change in volume measured as signed face-prism volumes averaged at vertices, such as is described herein.

Other Examples

The processes herein have been described for 3D objects represented using a polygon mesh. Mesh vertices (or edges and faces) provide a natural element to locally represent the attributes such as displacement, strain, shear, and volume, that have been defined using vertices, edges and triangles. However, there are a number of approaches that can be used for representing 3D objects including parametric surface patches, subdivision surfaces, point-clouds and implicit surfaces. Conventional processes for tessellating representations into meshes for real-time display using modern graphics hardware might be used. For example, parametric surface patches can be easily turned into a piecewise-quadrilateral mesh, by sampling points on the surface using the two surface parameters at arbitrary resolution and connecting adjacent samples to form quadrilateral faces (or two triangles). Each level of a subdivision surface is similarly represented by a mesh, that can be subdivided to any desired resolution. Point-clouds can also be turned into a mesh using various interpolation schemes that use a spatial neighborhood of points to build an interpolating or approximating mesh. Implicit functions can be tessellated using techniques such as marching cubes or dual contouring. Processes and apparatus described herein could take into account a common mesh connectivity or topology (the vertices, edges and faces of the reference and deformed meshes are in 1-1 bijective correspondence), to capture the notion of relative local change in the object. Meshing techniques for subdivision and parametric surface patches sampled at arbitrary resolution produce meshes of identical topology and can provide as precise an approximation as desired to object attributes like displacement or volume. An approximate estimate to these attributes could even be computed directly on the control points used to define a parametric or subdivision surface. Visualization and deformation described herein can thus be applied to these other surface representations.

Point-cloud and implicit function tessellation does not always guarantee a matching mesh topology for a deforming point-cloud or implicit function. In such a scenario, a surface parameterization can be used as a measure of local change on the surface. Given tessellations $M^o$ and $M^r$, a common mesh M' of matching topology can be produced whose vertices are the union of $M^o$ and $M^r$, and the edges and faces are re-computed as a 2D Delaunay triangulation of the parameterization of these vertices. The 3D vertex positions of $M'^o$ for vertices originally belonging to $M^o$ remain the same as in $M^o$; for a vertex $v^r$ originally belonging to $M^r$ that parametrically projects to a triangle <i, j, k> in the parameter space of $M^o$, the barycentric co-ordinates for the projection of $v^r$ in this 2D triangle in parameter space is computed and then the 3D position of $v^r$ is defined as a barycentric interpolation of the 3D triangle <i, j, k> in $M^o$. In other words, $M'^o$ has the mesh connectivity of M' and the 3D shape $M^o$. $M'^r$ is defined symmetrically to $M'^o$. Aspects of visualization and deformation described here are can thus be applied to these meshes of matching topology $M'^o$ and $M'^r$. Also, the meshes used to compute visualization, deformation, and display may be different using the above technique to transfer these attributes in parameter space.

For a 3D point-cloud with a fixed set of points, it is also not necessary to explicitly compute a tessellated mesh. Rather the geometric attributes can be estimated directly at the points using known techniques to compute for any point in the cloud, a local neighborhood of points. This neighborhood in turn can be used to define a local ring of triangles around the point, from which all the above-mentioned attributes such as surface normal, edge strain, triangle shear and triangle-based local volume can be computed. These attributed can then be visualized as colors on whatever display scheme is used for the point-cloud, such as splatting.

Optimizing for Shape and Desired Attributes Other than Volume

In addition to visualizing various attributes like displacement, strain, shear etc., the graphics systems described herein can deform an object to attain a target value for other geometric attributes. An overall energy function to be minimized for volume might be expressed as overall-energy(T) =shape-energy(T)+M*vol-energy(T), where M is a parameter to control a trade-off between controlling the shape or the volume, and wherein the vector $T=<t_1, \ldots, t_n>$ defines a multi-linear vertex blend vector that can be expressed as $M^o$ (T)=M+diag(T)D, where D=$M^r$−M. Applying this framework to other attributes can involve using a definition of an alternative function attr-energy(T) that is used in place of the function vol-energy(T).

The graphic system can be configured to operate for a number of example attributes, such as:

(A) Displacement: For this example, displacement might be measured similar to a shape deformation energy represented by def−energy(T)=$(\Sigma_{[i=1\ to\ n]}(t_i*\|d_i\|)^2)$=TD'T$^T$, where D' is an n×n diagonal matrix with diagonal entries $\|d_i\|^2$. As a reminder, $d_i$ is the displacement vector of vertex i from M to $M^r$ (i.e., D=$M^r$−M). In this regard, the values of the functions def-energy(T) and disp-energy(T) (see below) are minimized at opposite extremes of $t_i$ (e.g., $t_i$=0 and $t_1$=1). The quantity disp-energy(T) can be set equal to the computation of the expression $(rdisp-(\Sigma_{[i=1\ to\ n]}((1-t_i)*\|d_i\|)^2))^2$. The quantity rdisp is a target squared displacement, resulting in a degree 4 function in T, which can be minimized by numerical optimization.

(B) Normal-Displacement: For this example, normal displacement might be represented by ndisp−energy(T)= $(rndisp-(\Sigma_{[i=1\ to\ n]}((1-t_i)*(d_i \cdot n_i)))^2$ that represents an overall target of rndisp measuring a vertex displacement normal to the surface from $M^r$. This is a quadratic energy that can minimized by analytically solving a linear function (like for the approximate volume energy).

(C) Tangent-Displacement: For this example, tangent displacement might be represented by ndisp−energy(T)= $(rtdisp-(\Sigma_{[i=1\ to\ n]}((1-t_i)^2*(\|d_i\|^2-(d_i \cdot n_i)^2))))^2$. As with displacement, this is a degree 4 function in T for an overall target square displacement in the tangent plane.

(D) Strain: For this example, strain at an edge $e_{ij}$ (where $e_{ij}=v^r_i-v^r_j$ for some edge between a vertex $v^r_i$ and a vertex $v^r_j$) relative to its value on $M^r$ can be computed according to the function $st_{ij}=(\|e_{ij}-d_i+d_j+t_i*d_i-t_j*d_j\|-\|e_{i,j}\|)/\|e_{ij}\|$. The overall strain energy over the set of edges, E, of the mesh is thus strain−energy(T)=$(rst-\Sigma_{ij}^E st_{ij})^2$.

(E) Shear: For this example, where an angle at a vertex $v^r_i$ is subtended by vertices $v^r_j$ and $v^r_k$, shear can be computed using a dot-product $s^r_{ijk}=(v^r_i-v^r_j)\cdot(v^r_i-V^r_k)$ or $(e_{ij} \cdot e_{ik})$ on $M^r$. The shear relative to this value can be computed using Equation 2.

$$sh_{ijk}=(e_{ij}-d_i+d_j+t_i*d_i-t_j*d_j)\cdot(e_{ik}-d_i+d_k+t_i*d_i-t_k*d_k)- s^r_{ijk} \quad \text{(Eqn. 2)}$$

The overall shear energy over the set, F, of triangles of the mesh is thus as expressed in Equation 3.

$$\text{shear−energy}(T)=(rsh-\Sigma_{[ijk]}^F sh_{ijk})^2 \quad \text{(Eqn. 3)}$$

In special cases, such as when the overall target change of an attribute given by values rdisp, rndisp, rtdisp, rst, and/or rsh is zero, or by devising approximations to the above energy functions, functions that are quadratic in T might be devised that can be minimized analytically or with better numerical efficiency.

Additional Embodiments

In various implementations, the attribute processing unit 1406 may receive a selection input of one or more attribute degree ranges of the plurality of attribute degree ranges to be represented by the face feature. The local attribute change represented by displaying the face features includes only the attribute changes associated with the one or more attribute degree ranges selected by the selection input. For example, the mesh object edit data 1422 of FIG. 14 may include the selection input from the user 1430 via the artist/user U/I 1420. The user 1430 may have selected to ignore changes in the first attribute degree range while presenting changes in the second attribute degree range and the third attribute degree range. As such, the face feature 1606*a* may not be displayed or displayed as a neutral face feature (e.g., not indicating a particular attribute change (e.g., a gray color)) while the face feature 1606*b* and the feature 1606*c* are displayed. In yet other implementations, the user 1430 may make changes to the values of the attribute change ranges.

With reference to process 1500, subsequent to the displayable face feature being generated for display, any edits made to the mesh object 1604 may result in attribute processing unit 1406 receiving those edits and updating face features 1606 according changes in local attribute computations for edits to faces. As such, the process 1500 may be repeated based on the second representation of the mesh object (e.g., mesh object 1604) or the first representation of the mesh object (e.g., mesh object 1602). Mesh object 1602 may defined as a reference mesh such that any subsequent change to the mesh object 1604, the computation of the change in local attribute of any subsequent mesh object will be calculated using mesh object 1602 rather than mesh object 1604. Note that one or more of the operations performed in steps 1502-1510 may be performed in various orders and combinations, including in parallel. While steps 1502-1510 describe one possible implementation of techniques of the present disclosure, one of skill in the art in possession of the present disclosure will recognize that other implementations are possible.

Figure 17:
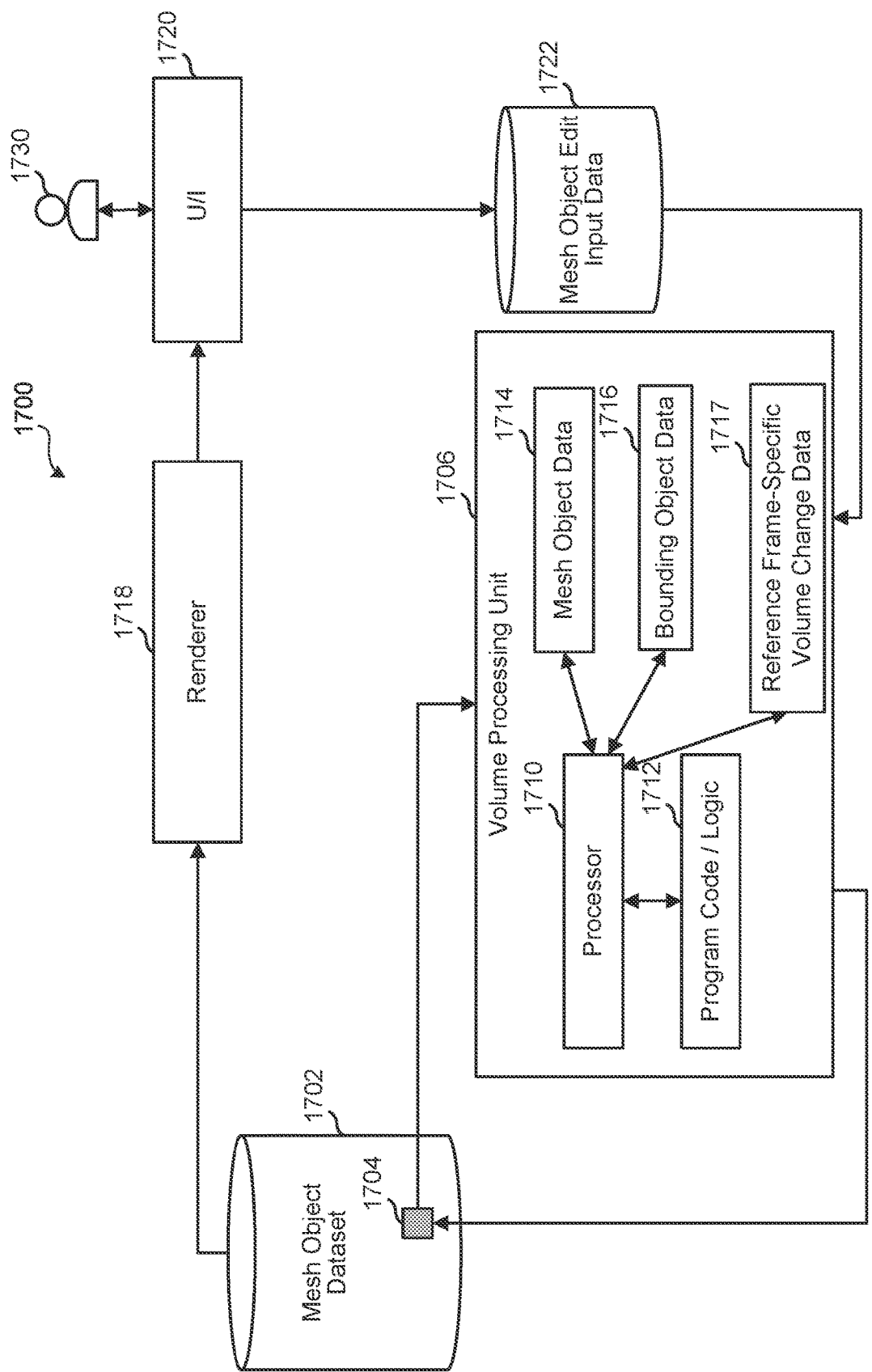
FIG. 17 is a block diagram of a graphics processing system that might be used to compute face features based on volume change or other attributes independent of specified operations, such as rigid translations.

Referring now to FIG. 17, a system 1700 for generating a displayable face feature for a face of a mesh object where the displayable face feature represents a local volume change for that face that accounts for rigid transformations is illustrated. The system includes a mesh object dataset 1702, a volume processing unit 1706, a renderer 1718, a user interface (UI) 1720, and mesh object edit data 1722.

A user 1740 may interact with the UI 1720 that is displaying an object (e.g., object 1002 of FIG. 10) provided by the mesh object dataset 1702 to perform an editing action to a mesh object that defines the object where the editing action creates a deformed mesh object. Mesh object dataset 1702 may store data for mesh objects, such as characters, creatures, inanimate elements and/or other objects. Mesh object dataset 1702 may be loaded with data from a source of an animation, such as a mesh (e.g., an open mesh or a closed mesh) used to define a character, a creature, an inanimate element and/or any other object. Mesh object edit dataset 1722 may include selections of one or more faces of the mesh object in the mesh object dataset 1702 and changes to the position of one or more vertex of each face. Volume processing unit 1706 may utilize the methods and processes described herein to take mesh object edit data 1722 and incorporate mesh edits included in mesh object edit data 1722 with mesh object dataset 1702 to produce a second representation of the mesh object associated with the mesh object dataset 1702, compute a local volume for each face of the second representation of the mesh object, and/or compute a global volume of the plurality of faces of the second representation of the mesh object by aggregating the local volumes together for each face. The mesh object edit data 1722 and/or the mesh object dataset 1702 may include a global reference frame that is used to describe how the mesh object and its features move in the 3D virtual space and a plurality of local reference frames that are each associated with a set of faces of the mesh object. These local reference frames may move with the faces during a rigid transformation and the volumes associated with those faces can be computed using the local reference frame. The volume processing unit 1706 may compute volume using the vertices of the mesh object with corresponding vertices of faces of a bounding object and/or the reference point (e.g., an origin point of the bounding object), as described above in FIGS. 3-5. However, the bounding object or the reference point may be associated with a particular local reference frame that those vertices of the mesh object are associated with. In other implementations, if the object represented by the mesh object dataset 1702 is a closed mesh object, then that mesh object may have several reference points in respective local reference frames, which may be used to compute a local volume for each face in those local reference frames.

More specifically, volume processing unit 1706 includes a processor 1710 that executes program code 1712 to generate the second representation of the mesh object using the mesh object edit data 1722, compute local volume associated with faces of the mesh object designated in mesh object edit data 1722 using face data 1714 from mesh object dataset 1702 and local reference frame data 1715, determine any changes in the local volume of the mesh object, and the generate a displayable face feature associated with each face of the mesh object based on the difference between the local volume of the first representation of that face and the local volume of the second representation of that face. Volume processing unit 1706 may further store displayable face features and mesh object edits data 1708 to dataset 1702 so that the corresponding second representation of the mesh object and the displayable face feature may be rendered by renderer 1718 for a visualization using the mesh object and also visualization of the volume of the mesh object or local volume of some or all of the faces of the mesh object. For example, volume processing unit 1706 may initiate the process by taking mesh object edit data 1722 with face data 1714 and local reference frame data 1715 and incorporating mesh object edit data 1722 relative to the face data 1714. The volume processing unit 1706 may also compute the volume data 1716 for the faces of the mesh object selected by the user 1740 as indicated in the mesh object edit data 1722 and update displayable face feature 1717. Based on the face data 1714, local reference frame data 1715, mesh object edit data 1722, volume data 1716 and displayable volume change depiction element 1717, volume processing unit 1706 may then output displayable face feature, mesh object, and volume data 1708, which may include mesh object and displayable face feature parameters 1704 stored by dataset 1702 as well as other required data to reproduce the displayable face feature and the mesh object. Volume processing unit 1706 may then be ready to receive additional mesh object edit data 1722 to repeat the process and update the mesh object and the displayable face feature. The resulting second representation of the mesh object and the displayable volume change depiction element may be rendered by renderer 1718 and/or output to user 1740 to inspect the results via the user U/I.

Figure 18:
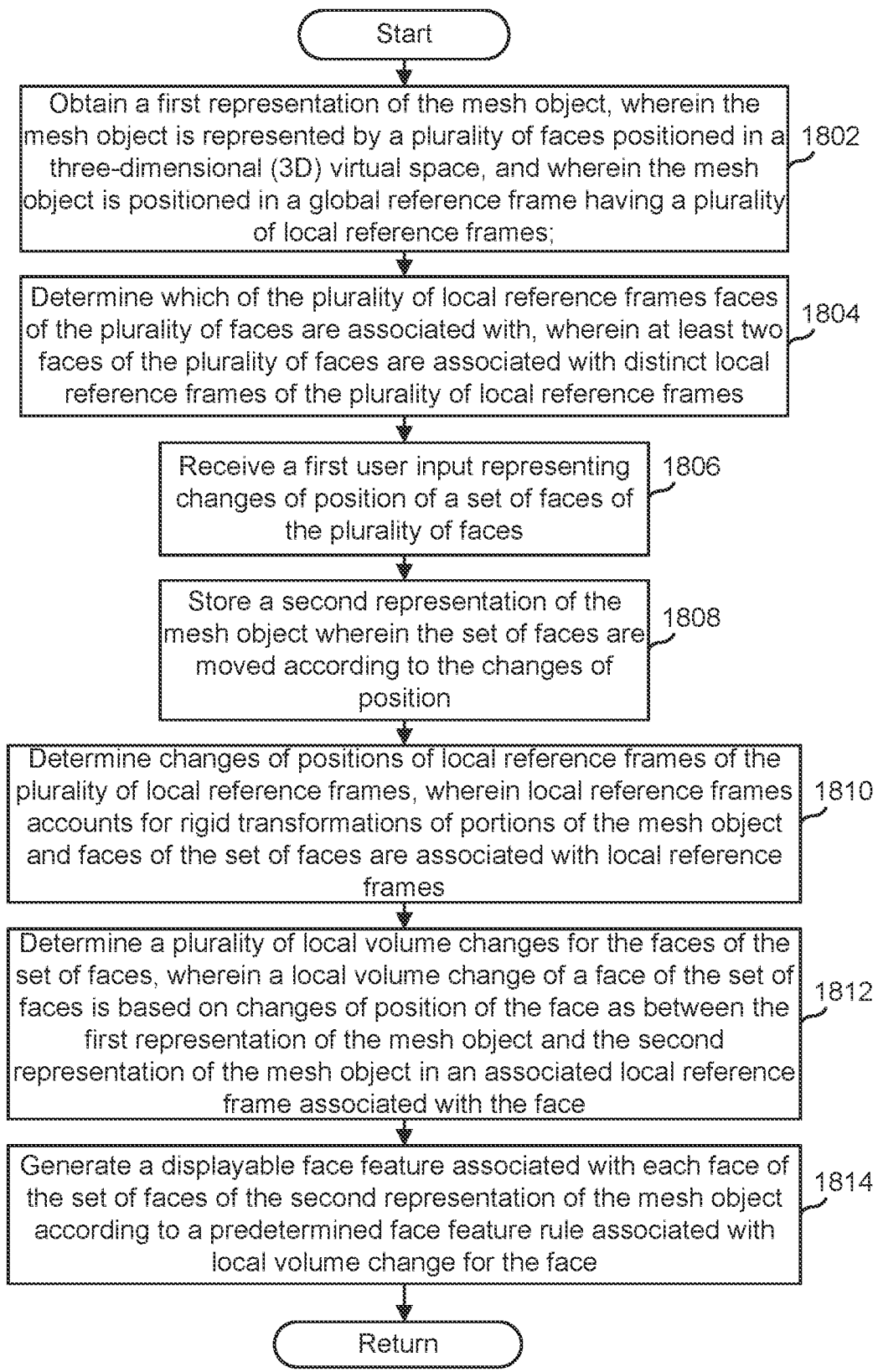
FIG. 18 is a flowchart of a method for generating face features representing local volume changes to open or closed objects and displaying those changes based on degree/type of change independent of specified operations, such as rigid translations.

FIG. 18 is a flowchart illustrating an example of a process 1800 for procedurally generating a representation of a change in a local volume associated with a face of a mesh object using local reference frames to account for rigid transformations of the mesh object, the representation usable in a user interface in accordance with various implementations. Some or all of the process 1800 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1800 may be performed by any suitable system, such as by an application server, by multiple computing devices in a distributed system of a computing resource service provider, or by any electronic computing device such as computer system 1700 of FIG. 17, which may be a member of an animation creation system, such as the animation system 2530 component of the of visual content generation system 2500 depicted in FIG. 25. Process 1800 can include a series of operations where a local volume of faces of the mesh object is computed and a displayable face feature is generated that represents a local volume change for a face of the mesh object.

In various implementations, process 1800 is related to process 1200 depicted in FIG. 12.

Figure 19:
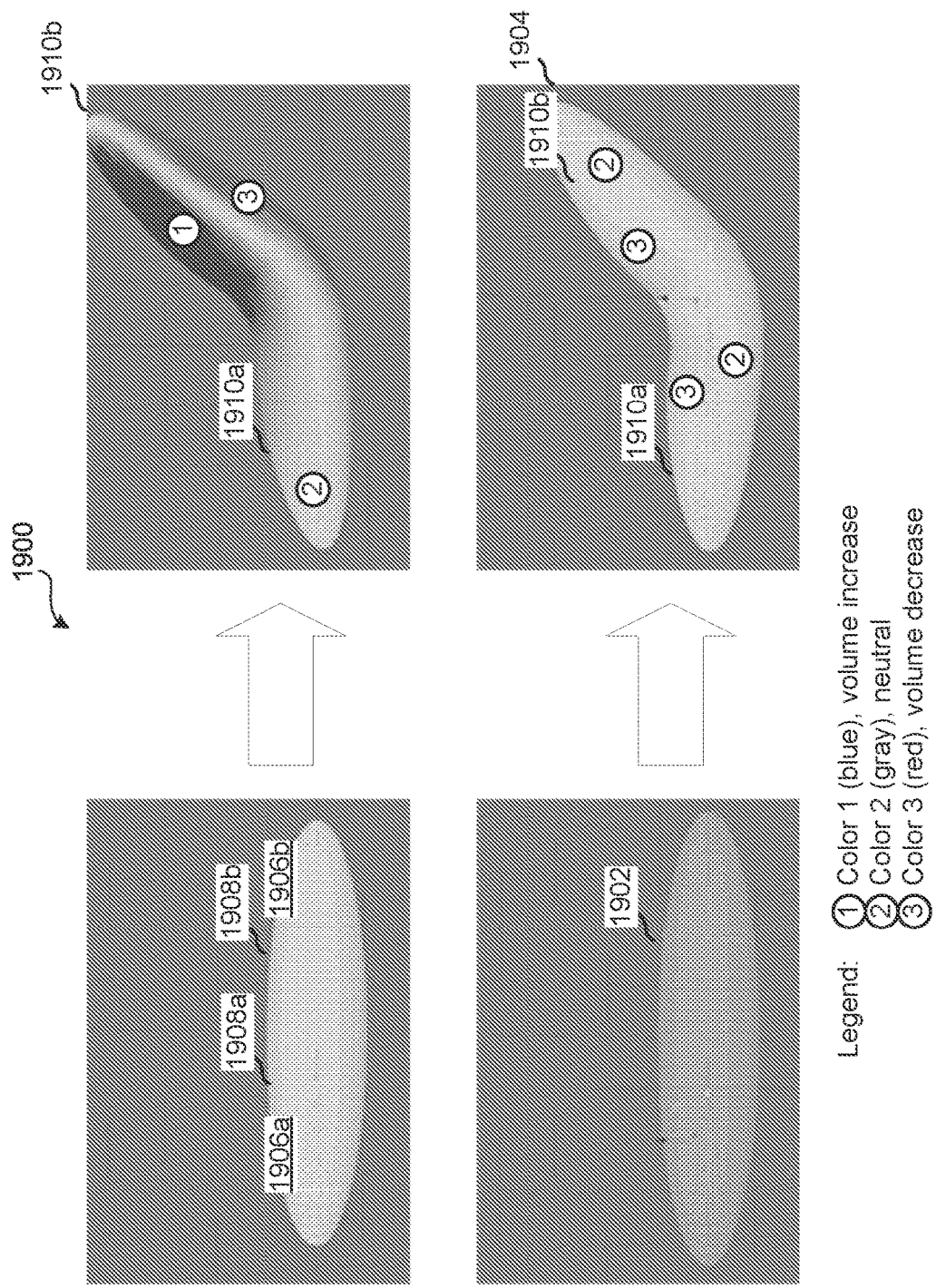
FIG. 19 illustrates display differences for attributes when independent of specified operations, such as rigid translations.

FIG. 19 illustrates display differences for attributes when independent of specified operations, such as rigid translations. In FIG. 19, an implementation of a displayable face features 1908*a* and 1908*b* associated with each face of a set of faces 1906*a* and 1906*b*, respectively, of a second representation of a mesh object after an edit to a first representation of a mesh object according to process 1800 depicted in FIG. 18 is illustrated. As illustrated, a portion 1910*a* of the mesh object "bends" or "rotates" relative to a portion 1910*b*. However, the general shape of the portions remains the same. Because the faces of the mesh object is associated with a global reference point (e.g., an origin point), the volume processing unit 1700 depicted in FIG. 17 that performs process 1800 recognizes a volume gain in the set of faces 1906*a* while recognizing a nearly equal volume loss in the set of faces 1906*b*, as indicated by the displayable face features 1908*a* and 1908*b*, respectively. However, as would be appreciated by a user, those faces in 1906*a* and 1906*b* merely underwent a rigid transformation where the whole portion of 1910*a* moved relative to portion 1910*b* and there was no actual gain or loss in local volume associated with the faces in that portion 1910*b* of mesh object 1904. As such, process 1800 accounts for these rigid transformations using local reference frames to solve the issues presented in FIG. 19.

In step 1802, the system performing the process 1800 obtains a first representation of the mesh object. The mesh object is represented by a plurality of faces positioned in a three-dimensional (3D) virtual space and the mesh object is positioned in a global reference frame having a plurality of local reference frames. In an implementation, at step 1802 and with reference to the lower portion of FIG. 19, a system performing process 1800 may obtain an object that may be provided as a mesh object. In the illustrated example of FIG. 19, the mesh object may be a closed mesh having an origin point. However, it is contemplated that process 1800 may be performed on closed meshes or open meshes that that associated with a volume defined by a bounding object. The mesh object includes a plurality of faces. Each face includes edges (not illustrated) defined by vertices. With reference to system 1700 of FIG. 17, the object may be rendered mesh object data 1702 as a first representation at user U/I 1720 before mesh object edit data 1722 is received. The mesh object may define a global volume that may be calculated based local volumes computed using the vertices of the faces of the mesh object and the origin point. In the illustrated implementation, the origin point may be a global reference frame of the object and the mesh object edit data 1722 may include a plurality of local reference frames that may include a local reference point. The local reference frames may have been defined by the user 1730 prior to process 1800 or during process 1800 (e.g., during or subsequent to step 1802).

In step 1804 of FIG. 18, a system performing process 1800 may determine which of the plurality of local reference frames faces of the plurality of faces are associated with. At least two faces of the plurality of faces are associated with distinct local reference frames of the plurality of local reference frames. In step 1806 of FIG. 18, a system performing process 1800 may receive a first user input representing changes of position of a set of faces of the plurality of faces. In an implementation, at step 1806 and with reference to system 1700 of FIG. 17, user 1730, via artist/user U/I 1720, may input an edit to at least one face of the mesh object of FIG. 19 (e.g., moving at least one vertex of at least one face to a different position within the 3D virtual space) that causes mesh object edit data 1722 to be generated and provided to the volume processing unit 1706. For example, and with reference to FIG. 19, user 1730 may edit the mesh object on the left of FIG. 19 to generate another mesh object on the right of FIG. 19 by bending/rotating portion 1910*a* of the mesh object relative to a portion 1910*b* at the or near the origin point.

In step 1808, a system performing process 1800 may store a second representation of the mesh object where the set of faces are moved according to the changes of position. In step 1810, the system may determine changes of positions of local reference frames of the plurality of local reference frames. The local reference frames accounts for rigid transformations of portions of the mesh object and faces of the set of faces are associated with local reference frames. In step 1812, the system performing the process 1800 may determine a plurality of local volume changes for the faces of the set of faces. The local volume change of a face of the set of faces is based on changes of position of the face as between the first representation of the mesh object and the second representation of the mesh object in an associated local reference frame associated with the face. In step 1814, the system performing the process 1800 may generate a displayable face feature associated with each face of the set of faces of the second representation of the mesh object according to a face feature rule associated with the local volume change for that face.

In some implementations, a face may be associated with multiple local reference frames and the volume change for the face may be computed as a weighted average of the local volume change for the face with respect to its associated local reference frames.

In an implementation, at steps 1808, 1810, 1812, and 1814, as discussed above in the discussion of FIG. 17, the volume processing unit 1706 may use mesh object edit data 1722 and mesh object data 1714 of the mesh object and displayable face feature parameters 1704 associated with the mesh object and the mesh object edit data 1722 to generate another mesh object. Volume processing unit 1706 may also use volume data 1716 that includes local volume computations for each face of the plurality of faces included in the mesh object and local volume computation for each face of the plurality of faces included in a mesh object to compute a local volume change for each face of the set of faces as between the mesh objects. The volume processing unit 1706 may also update displayable face feature data 1717 such that face features 1906a and 1906b are generated. Volume processing unit 1706 outputs displayable face feature, mesh object, and volume data 1708 displayable to update the mesh object and displayable face feature parameters 1704. Renderer 1718 may use the mesh object dataset 1702 that includes displayable face feature, mesh object, and volume data 1708 to display the mesh objects (optionally) and the displayable face features representing a value of a change in local volume associated with corresponding faces between the mesh objects.

In the illustration of FIG. 19, the mesh object in the upper left is transformed into the mesh object in the upper right and faces of the mesh object are colored to reflect face-by-face local volume changes. In a user display, the portion labelled with a circled "1" might be displayed in blue to indicate a volume increase, which would be expected if the local volume is computed based on a face's movement away from a reference point or away from the surface of the object on which the face is a part. In a user display, the portion labelled with a circled "2" might be displayed in a neutral color, such as gray, to indicate little or no volume change, which would be expected if the local volume is computed based on a face's movement away from a reference point or away from the surface of the object on which the face is a part and the face does not move significantly. In a user display, the portion labelled with a circled "3" might be displayed in red to indicate a volume decrease, which would be expected if the local volume is computed based on a face's movement toward a reference point or inward from the surface of the object on which the face is a part.

In the mesh object in the lower left, a plurality of reference frames might be provided and in the mesh object in the lower right, volume changes for faces in portion 1910a are computed relative to a reference point in a reference frame in which portion 1910a does not significantly move, while volume changes for faces in portion 1910b are computed relative to a reference point in a reference frame in which portion 1910b does not significantly move although the two reference frames move relative to each other. Thus, in the image and the lower right the relatively minor volume changes resulting from the mesh object bending are depicted in color "3".

In various implementations, the volume processing unit 1706 may determine a degree of volume change for each local volume change using the volume data 1716. The volume processing unit 1706 may also determining a volume degree range of a plurality of volume degree ranges that each degree of volume change for each local volume change satisfies.

For example, a first set of faces 1908a of a mesh object may undergo a ±0-5% volume change (e.g., a first volume degree range), a second set of faces 1908b of the mesh object may undergo a +(5%-10%) volume change (e.g., a second volume degree range), and a third set of faces 1908c of the mesh object may undergo a −(5%-10%) volume change (e.g., a third volume degree range). Each volume degree range may be represented by a different face feature. For example, the first volume degree range may be represented by a face feature 1906a (e.g., a first color) on the faces of the first set of faces 1908a that may be the same color as the faces on the reference mesh object, the second volume degree range may be represented by a face feature 1906b on the faces of second set of faces 1908b, and the third volume degree range may be represented by a face feature 1906c on the faces of second set of faces 1908c. In a specific example, the first set of faces 1908a may have experienced a net volume gain of 0.1%, and thus the face feature 1906a may be displayed on the first set of faces 1908a, which may be the same as the reference mesh object. The second set of faces 1908b may have experienced a volume gain of 6.1%, and thus the face feature 1906b (e.g., a blue color) may be displayed on the second set of faces 1908. The third set of faces 1908c may have experienced a volume loss of 7.1%, and thus the face feature 1906c (e.g., a blue color) may be displayed on the third set of faces 1908. While the face features are illustrated as "colors" other face features such as, for example, transparency, texture, gradient, and/or any other face feature that may provide a visual of a local volume change of a face of mesh object that would be apparent to one of skill in the art in possession of the present disclosure.

In various implementations, the volume processing unit 1706 may receive a selection input of one or more volume degree ranges of the plurality of volume degree ranges to be represented by the face feature. The local volume change represented by displaying the face features includes only the volume changes associated with the one or more volume degree ranges selected by the selection input. For example, the mesh object edit data 1722 of FIG. 17 may include the selection input from the user 1730 via the artist/user U/I 1720. The user 1730 may have selected to ignore changes in the first volume degree range while presenting changes in the second volume degree range and the third volume degree range. As such, the face feature 1906a may not be displayed or displayed as a neutral face feature (e.g., not indicating a particular volume change (e.g., a gray color)) while the face feature 1906b and the feature 1906c are displayed. In yet other implementations, the user 1730 may make changes to the values of the volume change ranges.

With reference to process 1800, subsequent to the displayable face feature being generated for display, any edits made to the mesh object may result in volume processing unit 1706 receiving those edits and updating face features 1906 according changes in local volume computations for edits to faces. As such, the process 1800 may be repeated based on the second representation of the mesh object (e.g., mesh object 1904) or the first representation of the mesh object (e.g., mesh object 1902). Mesh object 1902 may defined as a reference mesh such that any subsequent change to the mesh object 1904, the computation of the change in local volume of any subsequent mesh object will be calculated using mesh object 1902 rather than mesh object 1904. Note that one or more of the operations performed in steps 1802-1814 may be performed in various orders and combinations, including in parallel. While steps 1802-1814 describe one possible implementation of techniques of the present disclosure, one of skill in the art in possession of the present disclosure will recognize that other implementations are possible.

Figure 20:
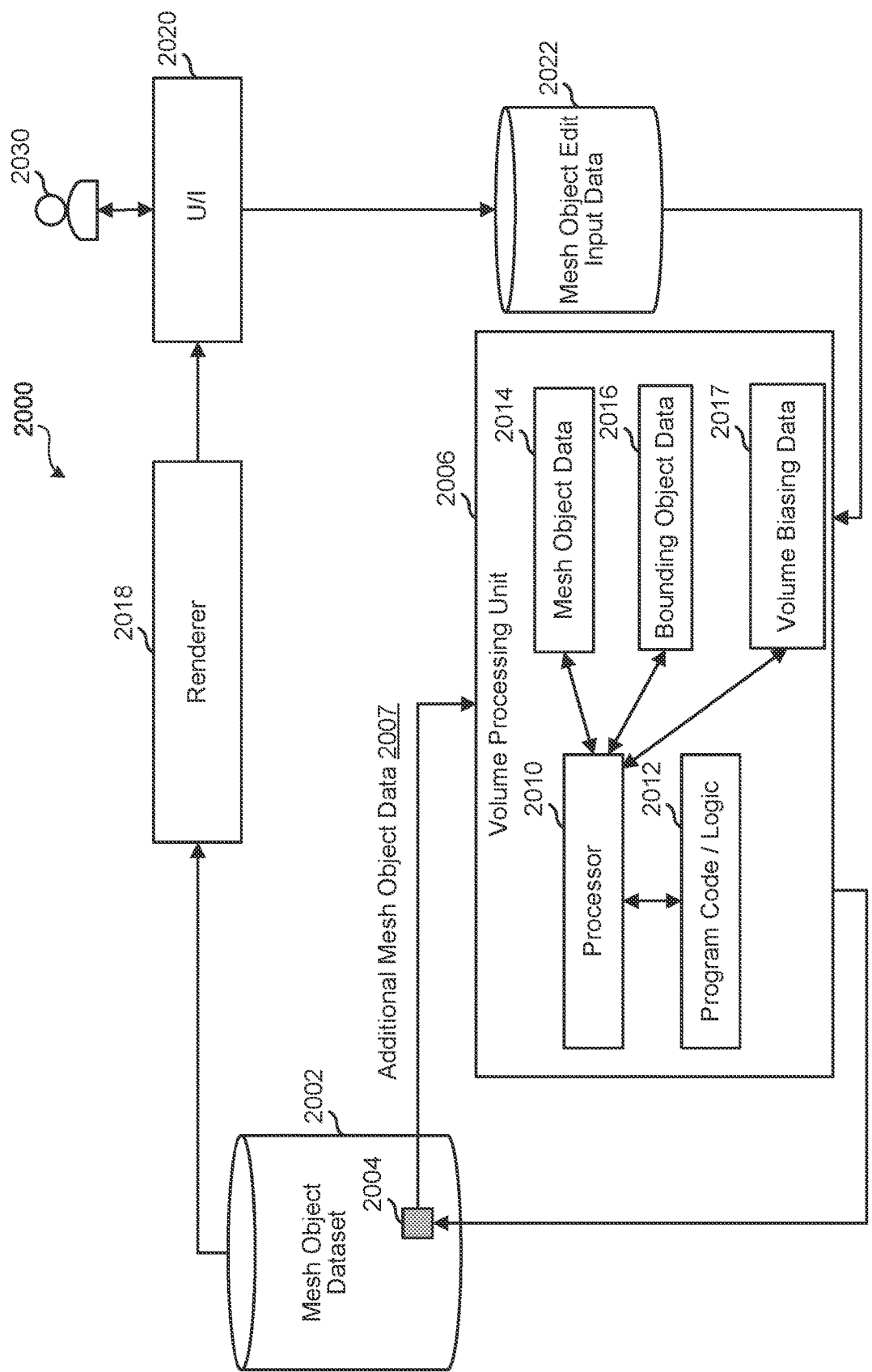
FIG. 20 is a block diagram of a graphics processing system that might be used to compute biasing volume data, as might be used to bias a virtual object being edited, toward to a target volume.

Referring now to FIG. 20, a system 2000 for biasing a set of faces of a plurality of faces associated with a volume of a mesh object to satisfy the volume change threshold is illustrated. The system includes a mesh object dataset 2002, a volume biasing processing unit 2006, a renderer 2018, a user interface (UI) 2020, and mesh object edit data 2022.

A user 2040 may interact with the UI 2020 that is displaying an object (e.g., object 1002 of FIG. 10) provided by the mesh object dataset 2002 to perform an editing action to a mesh object that defines the object where the editing action creates a deformed mesh object. Mesh object dataset 2002 may store data for mesh objects, such as characters, creatures, inanimate elements, and/or objects. Mesh object dataset 2002 may be loaded with data from a source of an animation, such as a mesh (e.g., an open mesh or a closed mesh) used to define a character, a creature, an inanimate element and/or any other object. Mesh object edit dataset 2022 may include selections of one or more faces of the mesh object in the mesh object dataset 2002 and changes to the position of one or more vertex of each face. In some implementations, the mesh object edit data 2022 may include a biasing action that biases the mesh object to a target volume. Volume processing unit 2006 may utilize the methods and processes described herein to take mesh object edit data 2022 and incorporate mesh edits included in mesh object edit data 2022 with mesh object dataset 2002 to produce a second representation of the mesh object associated with the mesh object dataset 2002, compute a local volume for each face of the second representation of the mesh object, and/or compute a global volume of the plurality of faces of the second representation of the mesh object by aggregating the local volumes together for each face. The volume processing unit 2006 may compute volume using the vertices of the mesh object with corresponding vertices of faces of a bounding object or the reference point (e.g., an origin point of the bounding object), as described above in FIGS. 3-5. However, if the object represented by the mesh object dataset 2002 is a closed mesh object, then that mesh object may have its own reference point, which may be used to compute a local volume for each face.

More specifically, volume processing unit 2006 includes a processor 2010 that executes program code 2012 to generate the second representation of the mesh object using the mesh object edit data 2022, compute local volume associated with faces of the mesh object designated in mesh object edit data 2022 using face data 2014 from mesh object dataset 2002, determine any changes in the local volume of the mesh object, and the generate a displayable face feature associated with each face of the mesh object based on the difference between the local volume of the first representation of that face and the local volume of the second representation of that face. Volume processing unit 2006 may further store displayable face features and mesh object edits data 2008 to dataset 2002 so that the corresponding second representation of the mesh object and the displayable face feature may be rendered by renderer 2018 for a visualization using the mesh object and also visualization of the volume of the mesh object or local volume of some or all of the faces of the mesh object. For example, volume processing unit 2006 may initiate the process by taking mesh object edit data 2022 with face data 2014 and incorporating mesh object edit data 2022 relative to the face data 2014. The volume processing unit 2006 may also compute the volume data 2016 for the faces of the mesh object selected by the user 2040 as indicated in the mesh object edit data 2022 and update volume biasing data 2017. Based on the face data 2014, mesh object edit data 2022, volume data 2016 and volume biasing data 2017, volume processing unit 2006 may then output displayable face feature, mesh object, and volume data 2008, which may include mesh object and displayable face feature parameters 2004 stored by dataset 2002 as well as other required data to reproduce the displayable face feature and the mesh object. Volume processing unit 2006 may then be ready to receive additional mesh object edit data 2007 to repeat the process and update the mesh object and the displayable face feature. The resulting second representation of the mesh object and the displayable face feature may be rendered by renderer 2018 and/or output to user 2040 to inspect the results via the user U/I 2030.

In some implementations, there is a first representation, which can then be biased toward a second representation, or from a second representation after manual edits are made to a third representation that using automatic biasing.

Figure 21:
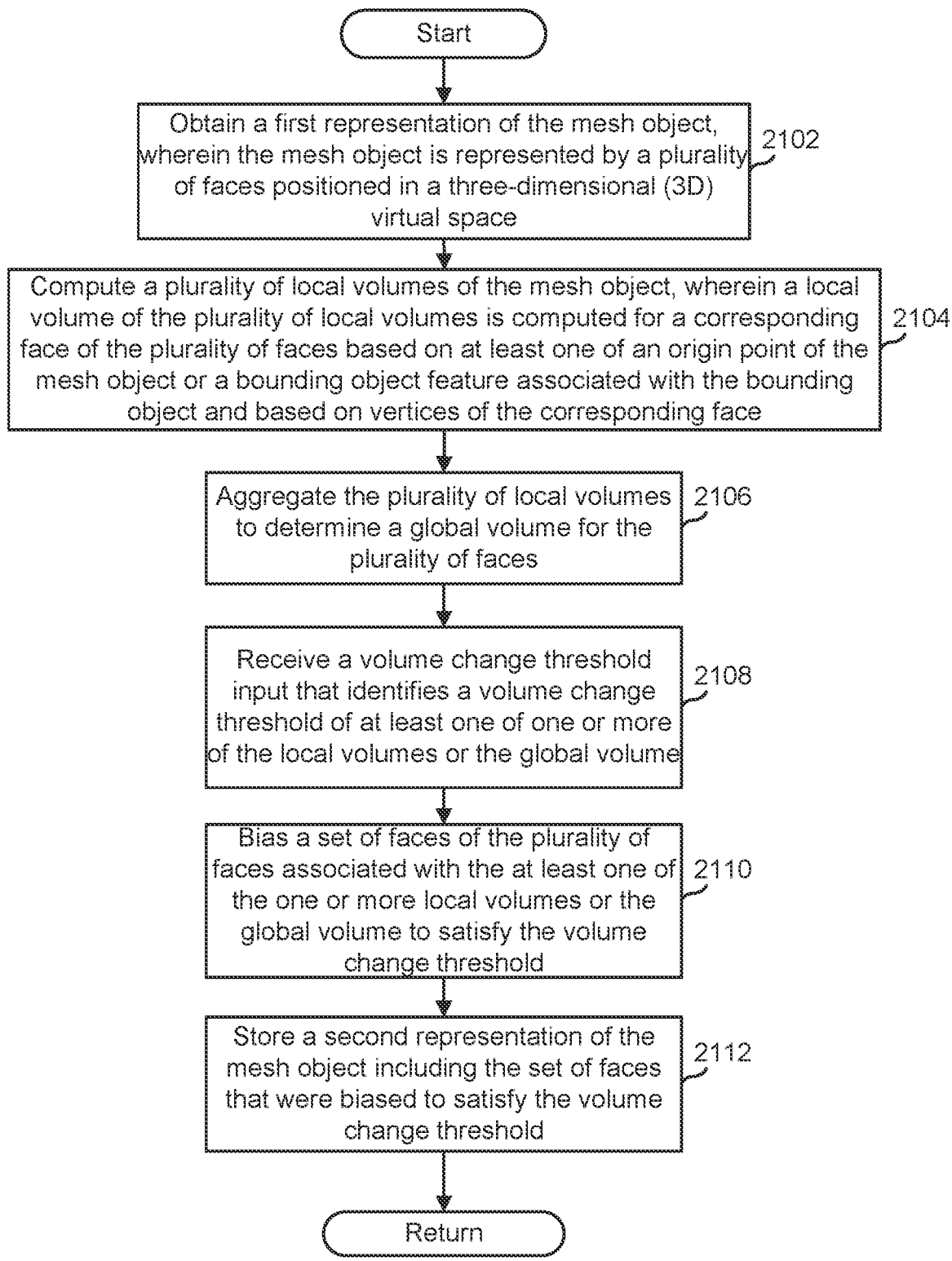
FIG. 21 is a flowchart of a method for illustrating to biasing a volume to a target volume.

FIG. 21 is a flowchart illustrating an example of a process 2100 for procedurally obtaining a desired volume change of a mesh object, the representation usable in a user interface in accordance with various implementations. Some or all of the process 2100 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 2100 may be performed by any suitable system, such as by an application server, by multiple computing devices in a distributed system of a computing resource service provider, or by any electronic computing device such as computer system 2000 of FIG. 20, which may be a member of an animation creation system, such as the animation system 2530 component of the of visual content generation system 2500 depicted in FIG. 25. Process 2100 includes a series of operations where a local volume of faces of the mesh object is computed and a displayable face feature is generated that represents a local volume change for a face of the mesh object.

In step 2102, the system performing the process 2100 obtains a first representation of the mesh object. The mesh object may be represented by a plurality of faces positioned in a three-dimensional (3D) virtual space. In an implementation, at step 2102 and with reference to FIG. 22, the system performing the process 2100 may obtain an object 2200 that may be provided by mesh object 2202. In the illustrated example of FIG. 22, mesh object 2202 may be a closed mesh having an origin point 2203. However, it is contemplated that process 2100 may be performed on closed meshes or open meshes that that associated with a volume defined by a bounding object. The mesh object 2202 includes a plurality of faces (not illustrated). Each face includes edges (not illustrated) defined by vertices. With reference to system 2000 of FIG. 20, the object 2200 may be rendered mesh object data 2002 as a first representation at the user U/I 2020 before mesh object edit data 2022 is received. The mesh object 2202 may define a global volume 2202a that may be calculated based local volumes computed using the vertices of the faces of the mesh object and the origin point 2203.

In step 2104 of FIG. 21, the system performing the process 2100 may compute a plurality of local volumes of the mesh object. The local volume of the plurality of local volumes is computed for a corresponding face of the plurality of faces based on at least one of an origin point of the mesh object or a bounding object feature associated with the bounding object and based on vertices of the corresponding face. In an implementation, at step 406 and with reference to FIG. 20 and FIG. 22, the volume processing unit 306 may compute a plurality of local volumes included in the volume biasing data 2017 using the mesh object data 2014 associated with mesh object 502 and the bounding object data 316 associated with the bounding object 2212. A local volume of the plurality of local volumes is computed for a corresponding face of the plurality of faces of the mesh object 2202 based on a bounding object feature associated with the bounding object and based on vertices of the corresponding face. For example, the volume processing unit 2006 may compute the local volume associated with each face of the mesh object 2202. Using Equation 1 above, the volume processing unit 2006 may use the vertices of each face in the mesh object 2202 and an origin point 2203 or a bounding object origin point of a bounding object or any other bounding object feature to compute the local volume of for each face of the mesh object 2202. In other implementations, the local volume may only be determined for selected faces of the mesh object 2202. For example, the volume processing unit 2206 may only determine local volumes of faces of the mesh object 2202 that are intersected by the bounding object or some other selection tool. In other implementations, the mesh object edit data 2022 may include a selection of faces of the mesh object 2202 for which local volumes are to be determined. The selection may be made by the user 2030 via the artist/user U/I 2020.

In step 2106, the system performing the process 2100 may aggregate the plurality of local volumes to determine a global volume for the plurality of faces. In an implementation, at step 2106 and with reference to FIG. 20, the volume processing unit 2006 may aggregate the plurality of local volumes to determine a global volume (e.g., total volume) for the plurality of faces of the mesh object. The global volume may be provided in the volume biasing data 2017. The global volume and the plurality of local volumes may be provided in the bounding object, a mesh object, and volume data.

In step 2108, the system performing the process 2100 may receive a volume change threshold input that identifies a volume change threshold of at least one of one or more of the local volumes or the global volume.

In step 2110, the system performing the process 2100 may bias a set of faces of the plurality of faces associated with the at least one of the one or more local volumes or the global volume to satisfy the volume change threshold.

In step 2112, the system performing the process 2100 may store a second representation of the mesh object including the set of faces that were biased to satisfy the volume change threshold.

In other variations, energy and minimization equations might be used for computing various other attributes. As illustrated in FIG. 16, equations for change of strain between edges, for example, might be used instead of local volume values. Other examples include shear.

Figure 22:
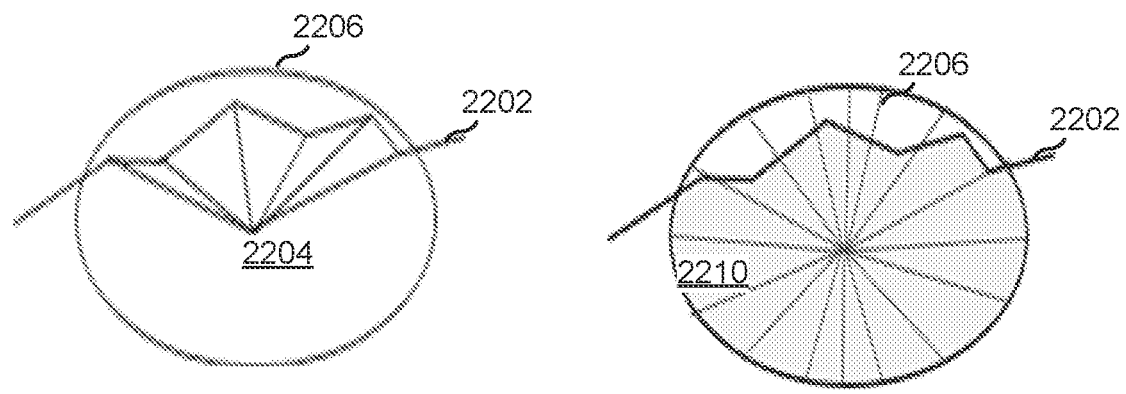
FIG. 22 illustrates a local volume bounded by a 3D object mesh and a bounding sphere.

FIG. 22 illustrates a local volume bounded by a 3D object mesh and a bounding sphere. As illustrated there, an object mesh 2202 might be defined and each face defining a tetrahedron with respect to a reference point 2204. While object mesh 2202 might be an open mesh, a bounding sphere 2206 might be defined in accordance space of object mesh 2202. Then, using bounding sphere 2206 to form an enclosing volume, a volume 2210 could be defined for object mesh 2202. Then, when object mesh 2202 is edited, volume changes could be relative to volume 2210.

Figure 23:
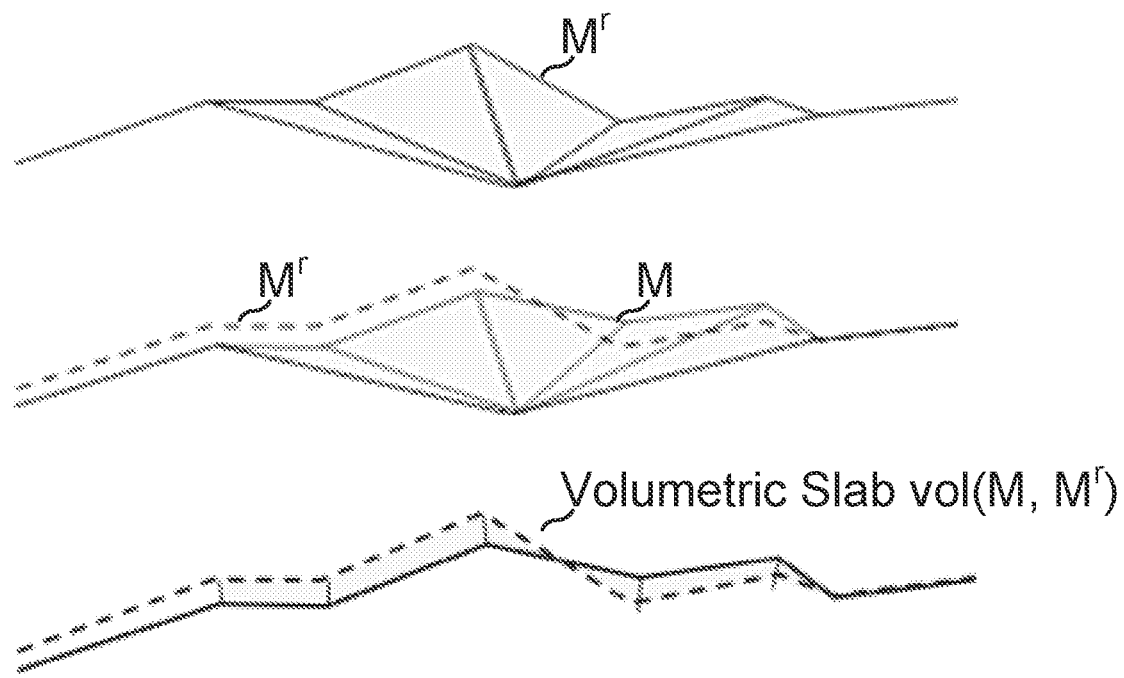
FIG. 23 illustrates a volume change computed as a difference in volume and as a volumetric slab.

FIG. 23 illustrates a volume change computed as a difference in volume and as a volumetric slab, as might be used in the context shown in FIG. 22. As shown there, suppose an object has a set of faces—in this case formed as an open mesh, but it need not be open and need not be a mesh –M'. Suppose further that the mesh is edited to be mesh M. Local volume changes could be computed based on position changes of faces of the mesh and the total volume change could be computed as a volume (positive, negative, or a combination) of a volumetric slab vol(M, M') as depicted in FIG. 23.

Figure 24:
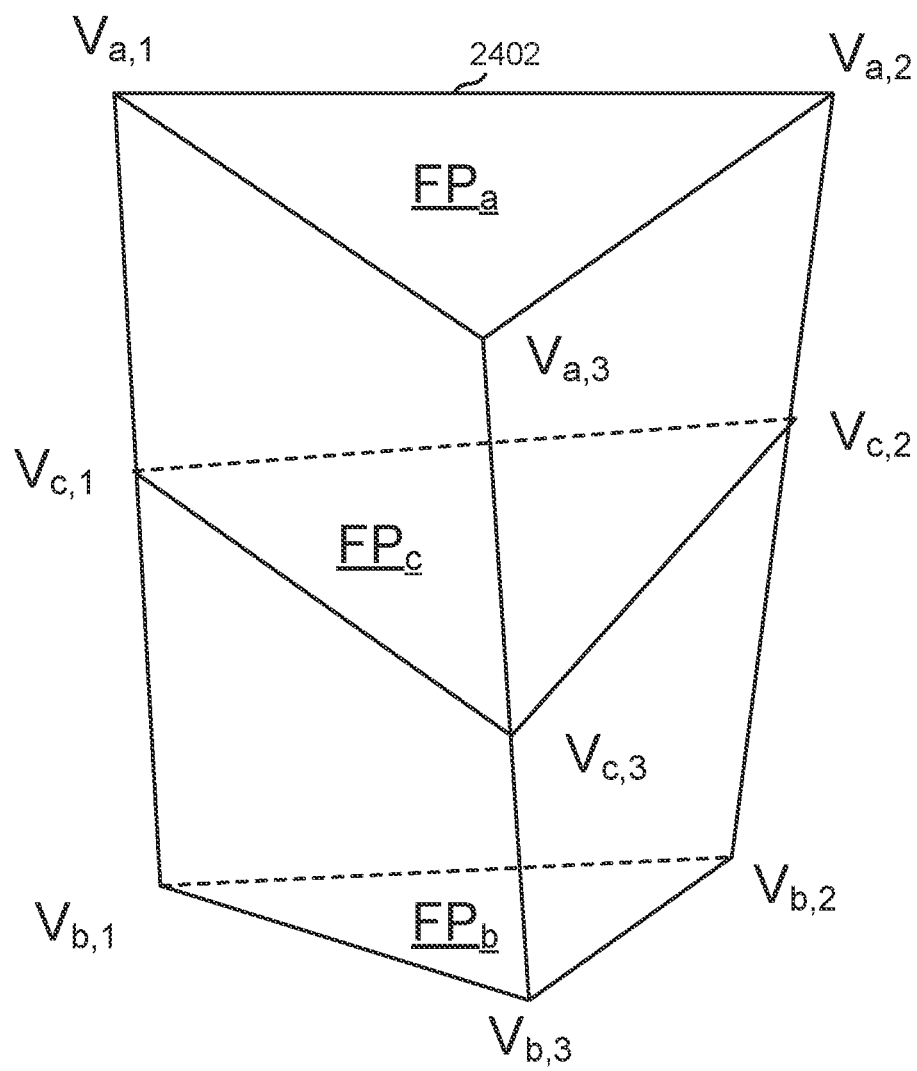
FIG. 24 illustrates how a volume might be computed for a local volume bounded between one of two corresponding faces and an interpolated face.

FIG. 24 illustrates how a volume might be computed for a local volume bounded between one of two corresponding faces and an interpolated face. A shape 2402 is defined by a one position of a face, $FP_a$, and another position of the face, $FP_b$. The face in position $FP_1$ is defined by three vertices, $v_{a,1}$, $v_{a,2}$, and $v_{a,3}$, whereas the face in position $FP_b$ is defined by another three vertices, $v_{b,1}$, $v_{b,2}$, and $v_{b,3}$. In some implementations, an interpolated face, $FP_c$, defined by vertices, $v_{c,1}$, $v_{c,2}$, and $v_{c,3}$ can be computed using some interpolation function of the vertices of the other two faces, such as functions that provide that the interpolated face vertices are on lines between corresponding vertices of the other two faces, e.g., that $v_{a,i}$, $v_{b,i}$, and $v_{b,i}$ are collinear for i in {1, 2, 3}.

As illustrated in FIG. 24, shape 2402 can be divided into tetrahedrons and volumes determined as between any two of the faces, or other methods could be used to determine volumes swept out by moving from one face to another. The volume could represent the change in local volume for the face that moved among those face positions. The functions that move the vertices can be linear or nonlinear functions.

Note that, in the context of describing disclosed implementations, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

As one skilled in the art will appreciate in light of this disclosure, certain implementations may be capable of achieving certain advantages, including some or all of the following: Techniques described and suggested in the present disclosure are necessarily rooted in computer technology in order to overcome problems specifically arising in computer graphics of computing volumes, displaying degrees of volume and other attribute changes associated with faces of a mesh object, depicting a global volume changes, biasing a mesh object to a desired volume change, and accounting for rigid transformations when displaying volume edits associated with faces of a mesh object.

FIG. 25 illustrates an example visual content generation system 2500 as might be used to generate imagery in the form of still images and/or video sequences of images. Visual content generation system 2500 might generate imagery of live action scenes, computer generated scenes, or a combination thereof. In a practical system, users are provided with tools that allow them to specify, at high levels and low levels where necessary, what is to go into that imagery. For example, a user might be an animation artist and might use visual content generation system 2500 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by visual content generation system 2500 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution. Images might or might not be stored in a certain structured format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other implementations, pixel values are data structures and a pixel value can be associated with a pixel and can be a scalar value, a vector, or another data structure associated with a corresponding pixel. That pixel value might include color values, or not, and might include depth values, alpha values, weight values, object identifiers or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some implementations, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 25, a live action capture system 2502 captures a live scene that plays out on a stage 2504. Live action capture system 2502 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 2506(1) and 2506(2) capture the scene, while in some systems, there might be other sensor(s) 2508 that capture information from the live scene (e.g., infrared cameras, infrared sensors, motion capture ("mo-cap") detectors, etc.). On stage 2504, there might be human actors, animal actors, inanimate objects, background objects, and possibly an object such as a green screen 2510 that is designed to be captured in a live scene recording in such a way that it is easily overlaid with computer-generated imagery. Stage 2504 might also contain objects that serve as fiducials, such as fiducials 2512(1)-(3), that might be used post-capture to determine where an object was during capture. A live action scene might be illuminated by one or more lights, such as an overhead light 2514.

During or following the capture of a live action scene, live action capture system 2502 might output live action footage to a live action footage storage 2520. A live action processing system 2522 might process live action footage to generate data about that live action footage and store that data into a live action metadata storage 2524. Live action processing system 2522 might include computer processing capabilities, image processing capabilities, one or more processors, program code storage for storing program instructions executable by the one or more processors, as well as user input devices and user output devices, not all of which are shown. Live action processing system 2522 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 2514, as that might be useful in post-processing to match computer-generated lighting on objects that are computer-generated and overlaid on the live action footage. Live action processing system 2522 might operate autonomously, perhaps based on predetermined program instructions, to generate and output the live action metadata upon receiving and inputting the live action footage. The live action footage can be camera-captured data as well as data from other sensors.

An animation creation system 2530 is another part of visual content generation system 2500. Animation creation system 2530 might include computer processing capabilities, image processing capabilities, one or more processors, program code storage for storing program instructions executable by the one or more processors, as well as user input devices and user output devices, not all of which are shown. Animation creation system 2530 might be used by animation artists, managers, and others to specify details, perhaps programmatically and/or interactively, of imagery to be generated. From user input and data from a database or other data source, indicated as a data store 2532, animation creation system 2530 might generate and output data representing objects (e.g., a horse, a human, a ball, a teapot, a cloud, a light source, a texture, etc.) to an object storage 2534, generate and output data representing a scene into a scene description storage 2536, and/or generate and output data representing animation sequences to an animation sequence storage 2538.

Scene data might indicate locations of objects and other visual elements, values of their parameters, lighting, camera location, camera view plane, and other details that a rendering engine 2550 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 2530 might be interactive, allowing a user to read in animation sequences, scene descriptions, object details, etc. and edit those, possibly returning them to storage to update or replace existing data. As an example, an operator might read in objects from object storage into a baking processor 2542 that would transform those objects into simpler forms and return those to object storage 2534 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from data store 2532 might be used to drive object presentation. For example, if an artist is creating an animation of a spaceship passing over the surface of the Earth, instead of manually drawing or specifying a coastline, the artist might specify that animation creation system 2530 is to read data from data store 2532 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 2544 might read in live action metadata, such as data representing movements and positions of body parts of a live actor during a live action scene. Animation driver generator 2544 might generate corresponding animation parameters to be stored in animation sequence storage 2538 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 2522. Animation driver generator 2544 might convert that movement data into specifications of how joints of an articulated CGI character are to move over time.

A rendering engine 2550 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 2550 might include computer processing capabilities, image processing capabilities, one or more processors, program code storage for storing program instructions executable by the one or more processors, as well as user input devices and user output devices, not all of which are shown.

Visual content generation system 2500 can also include a merging system 2560 that merges live footage with animated content. The live footage might be obtained and input by reading from live action footage storage 2520 to obtain live action footage, by reading from live action metadata storage 2524 to obtain details such as presumed segmentation in captured images segmenting objects in a live action scene from their background (perhaps aided by the fact that green screen 2510 was part of the live action scene), and by obtaining CGI imagery from rendering engine 2550.

A merging system 2560 might also read data from rulesets for merging/combining storage 2562. A very simple example of a rule in a ruleset might be "obtain a full image including a two-dimensional pixel array from live footage, obtain a full image including a two-dimensional pixel array from rendering engine 2550, and output an image where each pixel is a corresponding pixel from rendering engine 2550 when the corresponding pixel in the live footage is a specific color of green, otherwise output a pixel value from the corresponding pixel in the live footage."

Merging system 2560 might include computer processing capabilities, image processing capabilities, one or more processors, program code storage for storing program instructions executable by the one or more processors, as well as user input devices and user output devices, not all of which are shown. Merging system 2560 might operate autonomously, following programming instructions, or might have a user interface or programmatic interface over which an operator can control a merging process. In some implementations, an operator can specify parameter values to use in a merging process and/or might specify specific tweaks to be made to an output of merging system 2560, such as modifying boundaries of segmented objects, inserting blurs to smooth out imperfections, or adding other effects. Based on its inputs, merging system 2560 can output an image to be stored in a static image storage 2570 and/or a sequence of images in the form of video to be stored in an animated/combined video storage 2572.

Thus, as described, visual content generation system 2500 can be used to generate video that combines live action with computer-generated animation using various components and tools, some of which are described in more detail herein. While visual content generation system 2500 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one implementation, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

One implementation might include a carrier medium carrying image data or other data having details generated using the methods described herein. The carrier medium can comprise any medium suitable for carrying the image data or other data, including a storage medium, e.g., solid-state memory, an optical disk or a magnetic disk, or a transient medium, e.g., a signal carrying the image data such as a signal transmitted over a network, a digital signal, a radio frequency signal, an acoustic signal, an optical signal or an electrical signal.

Figure 26:
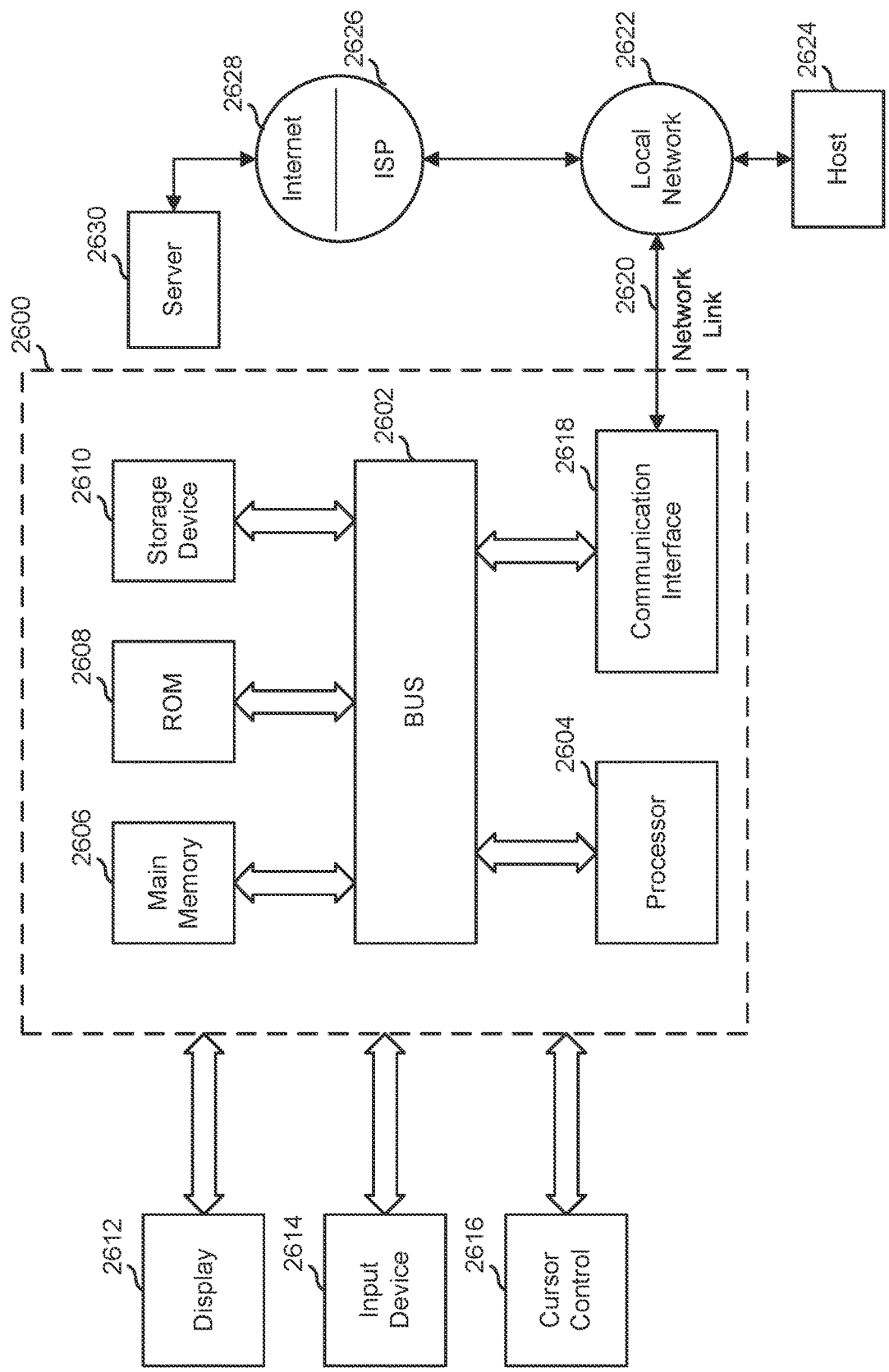
FIG. 26 is a block diagram illustrating an example computer system upon which computer systems of the system illustrated in various figures may be implemented.

FIG. 26 is a block diagram that illustrates a computer system 2600 upon which the computer systems of the systems described herein and/or visual content generation system 2500 (see FIG. 25) may be implemented. Computer system 2600 includes a bus 2602 or other communication mechanism for communicating information, and a processor 2604 coupled with bus 2602 for processing information. Processor 2604 may be, for example, a general-purpose microprocessor.

Computer system 2600 also includes a main memory 2606, such as a random-access memory (RAM) or other dynamic storage device, coupled to bus 2602 for storing information and instructions to be executed by processor 2604. Main memory 2606 may also be used for storing temporary variables or other intermediate information during execution of instructions to be executed by processor 2604. Such instructions, when stored in non-transitory storage media accessible to processor 2604, render computer system 2600 into a special-purpose machine that is customized to perform the operations specified in the instructions.

Computer system 2600 further includes a read only memory (ROM) 2608 or other static storage device coupled to bus 2602 for storing static information and instructions for processor 2604. A storage device 2610, such as a magnetic disk or optical disk, is provided and coupled to bus 2602 for storing information and instructions.

Computer system 2600 may be coupled via bus 2602 to a display 2612, such as a computer monitor, for displaying information to a computer user. An input device 2614, including alphanumeric and other keys, is coupled to bus 2602 for communicating information and command selections to processor 2604. Another type of user input device is a cursor control 2616, such as a mouse, a trackball, or cursor direction keys for communicating direction information and command selections to processor 2604 and for controlling cursor movement on display 2612. This input device typically has two degrees of freedom in two axes, a first axis (e.g., x) and a second axis (e.g., y), that allows the device to specify positions in a plane.

Computer system 2600 may implement the techniques described herein using customized hard-wired logic, one or more ASICs or FPGAs, firmware and/or program logic which in combination with the computer system causes or programs computer system 2600 to be a special-purpose machine. According to one implementation, the techniques herein are performed by computer system 2600 in response to processor 2604 executing one or more sequences of one or more instructions contained in main memory 2606. Such instructions may be read into main memory 2606 from another storage medium, such as storage device 2610. Execution of the sequences of instructions contained in main memory 2606 causes processor 2604 to perform the process steps described herein. In alternative implementations, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 2610. Volatile media includes dynamic memory, such as main memory 2606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 2602. Transmission media can also take the form of acoustic or light waves, such as those generated during radio-wave and infra-red data communications.

Various forms of media may be involved in carrying one or more sequences of one or more instructions to processor 2604 for execution. For example, the instructions may initially be carried on a magnetic disk or solid-state drive of a remote computer. The remote computer can load the instructions into its dynamic memory and send the instructions over a network connection. A modem or network interface local to computer system 2600 can receive the data.

Bus 2602 carries the data to main memory 2606, from which processor 2604 retrieves and executes the instructions. The instructions received by main memory 2606 may optionally be stored on storage device 2610 either before or after execution by processor 2604.

Computer system 2600 also includes a communication interface 2618 coupled to bus 2602. Communication interface 2618 provides a two-way data communication coupling to a network link 2620 that is connected to a local network 2622. For example, communication interface 2618 may be a network card, a modem, a cable modem, or a satellite modem to provide a data communication connection to a corresponding type of telephone line or communications line. Wireless links may also be implemented. In any such implementation, communication interface 2618 sends and receives electrical, electromagnetic, or optical signals that carry digital data streams representing various types of information.

Network link 2620 typically provides data communication through one or more networks to other data devices. For example, network link 2620 may provide a connection through local network 2622 to a host computer 2624 or to data equipment operated by an Internet Service Provider (ISP) 2626. ISP 2626 in turn provides data communication services through the world-wide packet data communication network now commonly referred to as the "Internet" 2628. Local network 2622 and Internet 2628 both use electrical, electromagnetic, or optical signals that carry digital data streams. The signals through the various networks and the signals on network link 2620 and through communication interface 2618, which carry the digital data to and from computer system 2600, are example forms of transmission media.

Computer system 2600 can send messages and receive data, including program code, through the network(s), network link 2620, and communication interface 2618. In the Internet example, a server 2630 might transmit a requested code for an application program through the Internet 2628, ISP 2626, local network 2622, and communication interface 2618. The received code may be executed by processor 2604 as it is received, and/or stored in storage device 2610, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain implementations require at least one of A, at least one of B and at least one of C each to be present.

The use of examples, or exemplary language (e.g., "such as") provided herein, is intended merely to better illuminate implementations of the invention and does not pose a limitation on the scope of the invention unless otherwise claimed. No language in the specification should be construed as indicating any non-claimed element as essential to the practice of the invention.

In the foregoing specification, implementations of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further implementations can be envisioned to one of ordinary skill in the art after reading this disclosure. In other implementations, combinations or sub-combinations of the above-disclosed invention can be advantageously made. The example arrangements of components are shown for purposes of illustration and combinations, additions, re-arrangements, and the like are contemplated in alternative implementations of the present invention. Thus, while the invention has been described with respect to exemplary implementations, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for providing visualization for a change in a volume of a virtual object, the representation usable in a user interface, wherein the virtual object is represented by a set of polygonal faces having vertices and edges, the computer-implemented method comprising:
   obtaining a first representation of the virtual object, wherein the virtual object is represented by a surface positioned in a three-dimensional (3D) virtual space;
   receiving a bounding object input that defines a bounding object relative to the 3D virtual space;
   computing a plurality of local volumes of the virtual object, wherein a local volume of the plurality of local volumes is computed for geometry at least one corresponding face of the set of polygonal faces based on a bounding object feature associated with the bounding object and based on at least some vertices of the corresponding face;

aggregating at least some of the plurality of local volumes to determine a global volume for the set of polygonal faces; and providing for display of a first visual indicator representing a value of the global volume.

2. The computer-implemented method of claim 1, wherein the virtual object is represented by an open mesh that does not enclose a portion of the 3D virtual space.

3. The computer-implemented method of claim 1, wherein the virtual object is represented by a closed mesh that defines an interior space of the 3D virtual space, wherein a size of the interior space corresponds to the global volume.

4. The computer-implemented method of claim 1, further comprising:

receiving a selection input that selects a selected subset of the set of polygonal faces for which local volumes are to be computed and thereby included in the global volume.

5. The computer-implemented method of claim 1, wherein the bounding object feature is a reference point in the 3D virtual space.

6. The computer-implemented method of claim 1, wherein the bounding object feature is a surface of the bounding object.

7. The computer-implemented method of claim 1, wherein the bounding object is a reference virtual object of the virtual object and the local volume of the corresponding face is defined by the corresponding face, a corresponding bounding face of the reference virtual object, and a distance between vertices of the corresponding face and corresponding vertices of the reference virtual object.

8. The computer-implemented method of claim 7, wherein the global volume represents a change in the volume of the virtual object respective to the reference virtual object.

9. A non-transitory computer-readable storage medium storing instructions, which when executed by at least one processor of a computer system, causes the computer system to carry out the computer-implemented method of claim 1.

10. A computer-readable medium carrying instructions, which when executed by at least one processor of a computer system, causes the computer system to carry out the computer-implemented method of claim 1.

11. A carrier medium carrying image data that includes volume information generated according to the computer-implemented method of claim 1.

12. A computer system for use in a visualization generating system for computing a volume of a virtual object, the computer system comprising:

at least one processor; and a computer-readable medium storing instructions, which when executed by the at least one processor, causes the computer system to perform operations comprising:

obtaining a first representation of the virtual object, wherein the virtual object is represented by a set of polygonal faces positioned in a three-dimensional (3D) virtual space;

receiving a bounding object input that defines a bounding object relative to the 3D virtual space;

computing a plurality of local volumes of the virtual object, wherein a local volume of the plurality of local volumes is computed for a corresponding face of the set of polygonal faces based on a bounding object feature associated with the bounding object and based on vertices of the corresponding face;

aggregating the plurality of local volumes to determine a global volume for the set of polygonal faces; and providing for display of a first visual indicator representing a value of the global volume.

13. The computer system of claim 12, wherein the virtual object is an open mesh that does not enclose a portion of the 3D virtual space.

14. The computer system of claim 12, wherein the virtual object is a closed mesh that defines an interior space of the 3D virtual space, wherein a size of the interior space corresponds to the global volume.

15. The computer system of claim 12, wherein the operations further comprise:

receiving a selection input that selects a selected subset of the set of polygonal faces for which local volumes are to be computed and thereby included in the global volume.

16. The computer system of claim 12, wherein the bounding object feature is a reference point in the 3D virtual space.

17. The computer system of claim 12, wherein the bounding object feature is a surface of the bounding object.

18. The computer system of claim 12, wherein the bounding object is a reference virtual object of the virtual object and the local volume of the corresponding face is defined by the corresponding face, a corresponding bounding face of the reference virtual object, and a distance between vertices of the corresponding face and corresponding vertices of the reference virtual object.

19. The computer system of claim 18, wherein the global volume represents a change in the volume of the virtual object respective to the reference virtual object.

\* \* \* \* \*